United States Patent [19]

Schneider et al.

[11] Patent Number: 5,161,116
[45] Date of Patent: Nov. 3, 1992

[54] SYSTEM FOR EVALUATING THE PERFORMANCE OF A LARGE SCALE PROGRAMMABLE MACHINE CAPABLE OF HAVING A PLURALITY OF TERMINALS ATTACHED THERETO

[75] Inventors: J. Wayne Schneider; K. Brook Richan, both of Provo; Richard K. Wilson, Orem, all of Utah

[73] Assignee: Dynix, Provo, Utah

[21] Appl. No.: 316,375

[22] Filed: Feb. 27, 1989

[51] Int. Cl.$^5$ .............................. G06F 15/20
[52] U.S. Cl. ........................ 364/551.01; 395/500
[58] Field of Search .......... 364/200, 900, 550, 551.01; 395/500

[56] References Cited

U.S. PATENT DOCUMENTS

| | | | |
|---|---|---|---|
| 4,091,448 | 5/1978 | Clausing | 364/200 |
| 4,377,852 | 3/1983 | Thompson | 364/900 |
| 4,516,216 | 5/1985 | Armstrong | 375/39 X |
| 4,802,164 | 1/1989 | Fukuoda | 364/200 |
| 4,849,879 | 7/1989 | Chinnaswamy et al. | 364/200 |
| 5,062,055 | 10/1991 | Chinnaswamy et al. | 364/200 |

OTHER PUBLICATIONS

Aug. 1979 Federal Procurement Request RTE Log Analyses.

Primary Examiner—Parshotam S. Lall
Assistant Examiner—Edward R. Cosimano
Attorney, Agent, or Firm—Workman Nydegger Jensen

[57] ABSTRACT

A robot system for evaluating the performance of a host computer system which has a plurality of host communication ports connectable to a corresponding plurality of user terminals. Prior to placing the host computer system into service with the user terminals, the robot system is used to emulate the user terminals and to emulate predefined computing tasks input to the host computer system for the user terminals. The master CPU in turn is connected to the plurality of smaller slave CPU's. The smaller slave CPU's are connected to the communication ports of the host computer system. Each of the slave CPU's emulate several user terminals by inputting various computing tasks to the host computer system. Input of the computing tasks to the host computer system by the slaves CPU's is coordinated at the terminal of the master CPU by a single operator, who also monitors at that terminal the host computer system's elapsed time for performing each computing tasks so as to thereby assess the performance of the host computer system.

10 Claims, 4 Drawing Sheets

SYSTEM FOR EVALUATING THE PERFORMANCE OF A LARGE SCALE PROGRAMMABLE MACHINE CAPABLE OF HAVING A PLURALITY OF TERMINALS ATTACHED THERETO

BACKGROUND

A. The Field of the Invention

The present invention is directed to systems for evaluating the performance of large scale programmable machines capable of having a plurality of terminals connected thereto. More particularly, the present invention is directed to a method and a system, referred to in the art as a robot, which emulates the actions of human operators and is used for evaluating the performance of large scale multi-user host computer systems.

B. The Background Art

As modern society has come to rely more and more upon the use of programmable machines such as digital computers for business, governmental, scientific, and other applications, the variety of available hardware and software has increased dramatically. For example, only a few years ago an organization looking to acquire a high performance computer system would have had to choose from only a few vendors. As use of digital computers has proliferated throughout society, the number of vendors providing hardware has also rapidly expanded.

With the number of possible choices always on the increase, purchasers of large scale computer systems have come to feel an urgent need to determine whether a particular configuration of computer system hardware will perform as specified. Very often, such large scale computer systems are used in organizations where a plurality of terminals, which may include devices such as video terminals, keyboards, bar code readers, and other devices, provide communication with the CPU of the computer system. In such situations, measuring the period of time between when a user, such as a human operator using a bar code reader, inputs information to the CPU and the time required by the CPU to provide an appropriate response is extremely important.

Not only does the response time effect the number of transactions which can be handled over a specified period, and thus the profitability or efficiency of the organization, but long delays between inputting required information and receiving appropriate responses causes dissatisfaction and aggravation to the human users of the system at each terminal.

Since the acquisition of a large scale computer system is a major capital item in any organization, the area of computer performance evaluation has received increasing attention in recent years. By utilizing computer performance evaluation techniques before purchase of a large scale computer system, it is hoped that the large scale computer system which is chosen can provide the best performance at the lowest possible cost.

Moreover, computer performance evaluation techniques are also used by both hardware and software vendors to satisfy contractual and customer requirements that the computer system performs at its minimum specifications before the customer takes delivery. Thus, there has been an effort in the art to provide computer performance evaluation systems and techniques to test the performance of hardware, software, and combinations thereof.

Vendors of computer hardware often times provide potential customers with specifications indicating that a particular configuration of some large scale computer system will carry out "X million instructions per second (MIPS)" or some other criteria of computing speed and power. Unfortunately, such specifications provide little reliable information concerning the performance of a large scale computer system having many, perhaps hundreds or thousands of communication ports, each having a terminal connected thereto and also requiring an interface with peripheral devices such as magnetic disc drives and other devices.

The economic incentives of being able to accurately predict whether a combination of computer hardware and software will perform as specified has lead to the development of various approaches and techniques to carrying out computer performance evaluations.

The performance of computers is a function of many interrelated considerations, including the programming tools available, the size of the problem to be solved, the algorithm used to solve the problem, the computer operating system's efficiency, and the architecture of the computer. Generally, three approaches are used to conduct a computer performance evaluation (CPE). These three approaches include: (1) simulations; (2) benchmark testing; and (3) monitoring.

Simulations are a technique of performance evaluation whereby a large scale computer system to be tested is simulated using software programs. When utilizing simulations, it is necessary that both hardware and software functions be simulated by the simulation program. Thus, a program code must be written to simulate functions such as magnetic disc input/output, terminal input/output, data base handling, operating system's functions, and application program functions.

Unfortunately, the use of simulation techniques requires that the simulation accurately quantify the performance of each of the components in the large scale computer system being simulated. Without such accurate quantifications, attempts to predict the large scale computer system performance under actual operating conditions becomes impossible. Thus, disadvantageously, a great deal of effort must be spent by programmers to create a simulation program for each computer system to be evaluated. It will be appreciated that if a potential customer desired to estimate the likely performance of ten different large scale computer systems available from different vendors, the amount expended in creating ten different simulation programs (one for each potential computer system) may far outweigh the benefits which come from carrying out the performance evaluation. Moreover, the inherent inaccuracies and uncertainties involved in simulations is ever present.

Another computer performance evaluation technique is referred to as benchmark testing. Benchmark testing utilizes a group of computer programs (sometimes referred to as a suite) to test specific performance capabilities of the host computer system. In benchmark testing, it is very important to define what exactly is being tested by each of the computer programs. Significantly, more often than not, benchmark test programs evaluate the quality of the programming code in which they are written rather than the performance of the host computer on which they run.

In a multi-user environment, three main factors that effect transaction throughput are: (1) multi-programming level, (2) data sharing among simultaneous transactions, and (3) the transaction mix. In a benchmark evaluation, it is possible to develop statistics on multi-user capability of a host computer system by running a series of data base inquiries in a single user mode and then again in a multi-user mode. The results of such benchmark testing can then be extrapolated to estimate the performance of the complete system with all terminals in place and operational. For example, benchmark programs may evaluate the difference in performance of the host computer system when the number of users increases from one to ten. The difference in performance may then be extrapolated to estimate the performance of the host computer system when 100 users are placed on a system.

Unfortunately, such extrapolation seldom provides an accurate picture of host computer system performance under actual operating conditions. For example, benchmark testing results when using only a few users cannot be extrapolated to predict the performance of the host computer system when a full load of 400, 600, or more, user terminals are added to the system. This is due to the fact that many computer systems perform well up to a particular work load with their performance dropping rapidly as that particular work load is exceeded. Thus, benchmark computer performance evaluation techniques, while more desirable than simulation testing, have major drawbacks and disadvantages when an accurate prediction of host computer system performance under actual operating conditions is expected.

The inadequacy of other methods of computer performance evaluation has lead to the development of various techniques for monitoring a large scale host computer system under actual operating conditions. For example, a user determining which computer system to acquire, or the configuration of computer system after a particular vendor has been selected, would, in one form of monitoring testing, actually assemble the complete host computer system with all peripheral terminal devices attached thereto, for example 600 user terminals, and load the CPU with actual application programs and data and have all 600 terminals being used as if under actual operating conditions.

Some forms of computer performance evaluation monitoring testing require hardware and/or software which has been specifically developed for a particular computer system in order to measure the transaction throughput which occurs under actual operating conditions. Disadvantageously, the costs of such hardware and/or software for monitoring transactions through the computer system under actual operating conditions is prohibitive for users evaluating computer systems before purchasing the same.

Moreover, it will be appreciated that organizing a monitoring test under actual operating conditions is a major logistical feat when a large number of terminals are involved. While the loading of data and application programs into a host computer system is a relatively simple procedure (since the applications programs and data will change relatively little from machine to machine), the connecting of 600 terminals to the CPU and coordinating the 600 human operators for the duration of the evaluation session is an immense task. Moreover, since human operators are used to input information, the input rate at which information is given to the host computer system cannot be accurately controlled.

It will be appreciated that monitoring tests of a large scale host computer system having a large number of terminals connected thereto (e.g., 100-1000 terminals) under actual operating conditions is a very time consuming and expensive task. While such monitoring tests produce evaluations which justify a high degree of confidence therein, the costs and difficulty of performing such monitoring tests make the alternative one which is seldom carried out.

As will be appreciated from the foregoing, it would be considered an advance in the art to provide a system for efficiently evaluating the performance of a large scale multi-user computer system. It would also be an advance in the art to provide a system for carrying out computer system evaluation monitoring more efficiently than previously possible. It would be a further advance in the art to provide computer performance efficiency monitoring system which may be particularly adapted for use with a changing number of communication ports which are active on the host computer system. It would be a still further advance in the art to provide a computer performance evaluation system which is readily transported from one location to another and set up for use.

Still another advance in the art would be to provide a system for computer performance evaluation monitoring under full load conditions without requiring human operators or terminal devices being associated with the host computer. It would be a further advance in the art to provide a system for computer performance evaluation monitoring which allows monitoring tests to be accurately repeated. It would be still another advance in the art to provide a system for computer performance evaluation monitoring that can be used with a large number of different host computer systems with little modification.

It would be yet another advance in the art to provide a system for carrying out computer performance evaluation monitoring tests that is cost efficient to use on host computers from a variety of vendors. It would also be an advance in the art to provide a system for computer performance evaluation monitoring which can vary the timing at which transactions are presented to the host computer system as well accurately vary the transaction rate. It would be still another advance in the art to provide a computer performance evaluation monitoring system which records the time taken to complete each transaction.

OBJECTS AND BRIEF SUMMARY OF THE INVENTION

In view of the foregoing difficulties and drawbacks found in the prior state of the art, it is a primary object of the present invention to provide an efficient system and method for carrying out computer performance evaluation monitoring of a large scale, multi-user, computer system.

It is another object of the present invention to provide a system for computer performance evaluation monitoring which records the time taken by the host computer system for completing each transaction.

It is another object of the present invention to provide a computer performance evaluation system and method which can readily vary the type of transactions and also the transaction rate from one monitoring test to another.

It is yet another object of the present invention to provide a computer performance evaluation system which can be adapted to carry out monitoring of any number of particular host computer systems efficiently.

It is still another object of the present invention to provide a computer performance evaluation monitoring system which may be readily adapted to test varying numbers of communication ports on a host computer system.

It is another object of the present invention to provide a system for computer performance evaluation monitoring of a host computer system operating under full load but without requiring a plurality of actual terminal devices and human operators to operate the same.

It is still another object of the present invention to provide a computer performance evaluation monitoring system which allows a monitoring test to be repeatedly carried out.

It is a still further object of the present invention to provide a computer performance evaluation monitoring system and method which can be used with a variety of different host computer systems while requiring little modification.

These and other objects of the present invention will become more apparent during an examination of this disclosure and during the practice of the invention.

The present invention includes a system and method for carrying out monitoring of a host computer system so that a computer performance evaluation may be made of the host computer system. Embodiments of the present invention emulate a plurality of operational terminals so that the monitoring test is carried out as if under actual operating conditions for the host computer system. The system of the present invention is modular so that less monitoring test hardware is required as the number of active communication ports on the host computer system decreases. Since the present invention allows computer performance evaluations to be conducted under conditions which are equivalent to actual operating conditions, full confidence may be placed in the test results.

The present invention is ideally suited for evaluating the performance of a large scale host computer system having a large number of host communication ports each being capable of communicating with a terminal. The system of the present invention includes a plurality of processing devices, central processing units (CPUs), or other computing devices. The use of a plurality of CPUs provides modularity and allows the system to be scaled to the size (number of host communication ports) of the host computer system rather than requiring a large scale computer system to test another large scale computer system as was the case in the prior state of the art.

Each CPU in the embodiment of the present invention is provided with a plurality of communication ports which comprise one embodiment of a port means. The port means, or CPU communication ports, are connected to the CPU's internal parallel bus. Means is also provided for individually connecting the communication ports to the host communication ports in the system. By the communication paths established between the plurality of CPUs and the host computer system, the appropriate CPU carries out steps which sends requests to the host computer system to execute identifiable tasks and the appropriate CPU also inputs data required by the host computer system. Thus, the signals received by the host CPU appear as if they originated from a terminal and a human operator.

One CPU is preferably designated to coordinate the operation of the other CPUs. In many situations it is advantageous to use a master-slave relationship among the CPUs where the master CPU is provided with additional computational power allowing the slave CPUs to be less expensive and less powerful devices. A means for measuring the time between when the information is input to the host computer system and when an expected response is received by the appropriate CPU is provided in the embodiments of the invention. Preferably the time required for each transaction is recorded and the information on the timing of all the transactions is later analyzed to provide important information for use in improving the performance of the host computer system.

The method of the present invention includes loading the host computer system with the application program and the accompanying data as if the host computer system were to be used in the final application. Various script programs are prepared to run on the CPUs which will cause the CPUs to generate signals emulating the signals which would be generated by a terminal connected to the host computer system as if the terminal were operated by a human operator. Advantageously, various data pools are created from the data which accompanies the application programs run on the host computer system. A data pool is created for each type of task carried out by the application program. The data pools contain the data which would be input if the host computer system were actually installed and human operators were present at a plurality of terminals. The data pools are accessible by each of the CPUs. Each script program run by the CPUs requests that a certain task or transaction be carried out by the host computer system and thus requires access to only one or a few of the data pools. In the described embodiment, all of the data pools and script programs reside on the master CPU and may be accessed by any of the slave CPUs.

All of the scripts carrying out the same task or transaction access data from the same data pool in the order that the data appears in the data pool.

Since the data is withdrawn from the data pool in linear order, and the data pools are created from the actual data loaded into the host computer system, a test may be halted at any time and the proper data item used when the test resumes. Since each data pool contains data required by only one type of script program, any number of similar script programs may share the same data pool. Thus, if the number of host communication ports is increased from 100 to 600, it is generally only necessary to provide enough data for the script programs and, if desired, vary some of the script parameters of the programs. Most advantageously, in most circumstances the script programs for each task remain the same as the number of active host communication ports increases and the same data pools may be used. As will be appreciated, the method of the present invention avoids the impractical task of creating customized script programs when a large number of active host communication ports must be accommodated.

Thus, the present invention provides great advantages not heretofore known in the computer performance evaluation field, including an economically implemented system and method for monitoring a large scale multi-user host computer system.

DETAILED DESCRIPTION OF THE PRESENTLY PREFERRED EMBODIMENT

Figure 1:
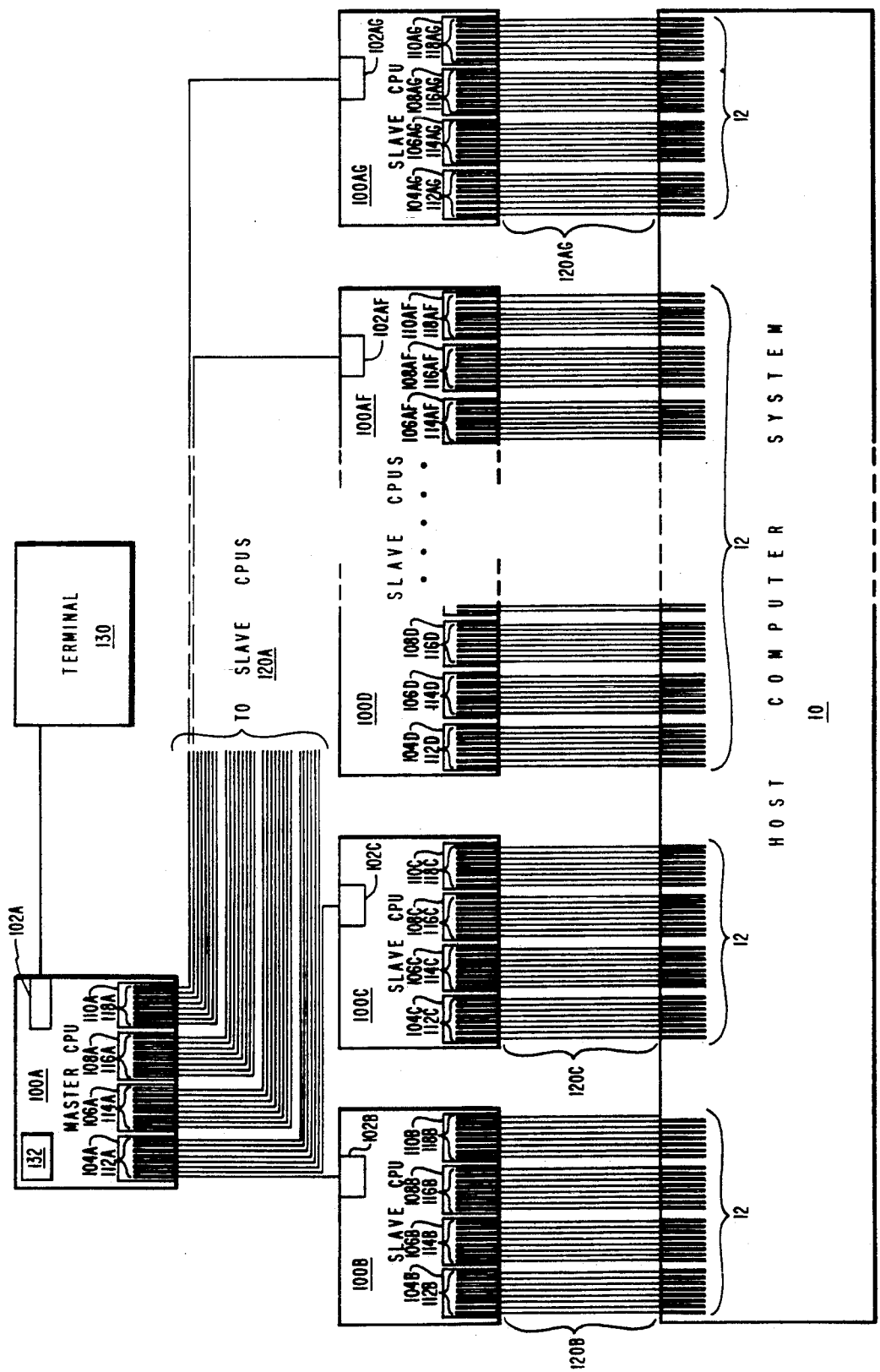
FIG. 1 is a simplified block diagram showing the presently preferred embodiment of the system of the present invention.

In the description which follows, reference will be made to the accompanying drawings wherein like structures are provided with like reference numerals. Furthermore, it should be understood that the following description and the accompanying drawings merely set forth the presently preferred best known mode for carrying out the present invention and thus the disclosure of the invention contained herein should be considered only as exemplary since the invention may be represented in many embodiments other than those described herein.

A. Overview

As mentioned previously, the most accurate technique for carrying out computer performance evaluations is to monitor the host computer system under actual operating conditions. As mentioned, it is previously known to utilize both software and hardware monitors while the host computer system is actually being used after it has been installed.

As will be readily appreciated, previously available software or hardware monitoring techniques are impractical since they require actual assembly of the complete host computer system and a full complement of human operators to carry out the monitoring test. Even when the cost of assembly of the complete host computer system is justified, since human operators are used, repeatedly and accurately varying the load placed on the host computer system from test to test becomes impossible. In order to overcome the drawbacks of previously known hardware and software monitoring techniques, monitoring techniques utilizing a digital computer as a robot were developed.

A robot is a device which automates a monitoring test. The robot replaces various terminals and their accompanying human operators. Advantageously, the use of another digital computer to carry out a monitoring test on a host computer system allows the test parameters to be accurately controlled and the host computer system's performance to be accurately measured.

Unfortunately, previously available computer performance evaluation monitoring robots all shared several common disadvantages. Among these disadvantages was the generally recognized belief in the industry that a monitoring robot must be of equal or greater capabilities and power compared to the host computer system to be tested. Thus, in order to test a large scale host computer system with 600 communication ports, it was necessary to use another large scale computer system with 600 communication ports. As will be readily understood, the cost of acquiring a large scale computer for a monitoring test in many cases is prohibitive.

Moreover, another drawback of the previously available monitoring robots is that a robot which was designed to be used with one particular vendor's host computer system is incompatible with another vendor's host computer system. Still further, even when the use of another large scale computer to test the host computer system is justified, the creation of program code for scripts for each one of a varying number of active communication ports was a laborious and time-consuming procedure.

As will be more fully appreciated hereafter, the present invention overcomes the disadvantages and drawbacks of the previously available systems and methods for carrying out computer performance evaluation using a monitoring robot.

B. The Presently Preferred System Embodiment of the Present Invention

As will be appreciated, computer performance evaluation monitoring techniques have application in many different circumstances. One such circumstance is when a host computer system is being selected for use in an automated library system.

A large library may have six hundred or more terminals located in one or more buildings. Some of the terminals are used by staff to perform functions such as checking out or checking in materials. Alternatively, many of the terminals are used by patrons performing searches to identify which materials they want to obtain. In both cases, the human users desire to experience as little delay as possible between inputting a request to a terminal and receiving back the requested information. Thus, it is important to carry out a computer performance evaluation before accepting a particular host computer system configuration to be certain that the response time and transaction rates are acceptable while keeping expenditures for acquiring the host computer system as low as possible.

Represented in FIG. 1 is a block diagram showing the configuration of the presently preferred robot monitoring system of the present invention. Most advantageously, the embodiment represented in FIG. 1 allows a large scale host computer system 10 to be monitored using a plurality of smaller processing devices or CPUs 100A-100AG. This feature allows the monitoring robot to be much less expensive than using a large scale computer to monitor another large scale computer. Even further, the use of a plurality of smaller CPUs provides modularity clearly not available when another large scale computer system is used to monitor a large scale host computer system having many active communication ports.

While monitoring a host computer system having a large number of ports may require 20 smaller CPUs of the type represented in FIG. 1, the CPUs represented in FIG. 1 may also be divided into two groups and be used to monitor two different host computer systems having, for example, only 220 communication ports each. Thus, the system of the present invention provides a flexible monitoring system which can be implemented at a much lower cost than previous attempts where one large scale computer was required to monitor another large scale computer.

As shown in FIG. 1, the presently preferred system embodiment includes a plurality of processing devices, or CPUs 100A-100AG, arranged in a master-slave relationship. As will be understood more fully soon, the master-slave relationship is not essential to carrying out the inventive concepts taught herein but is presently preferred to reduce hardware costs by concentrating computing power in the master CPU 100A while using less powerful and less expensive slave CPUs 100B-10-0AG.

In the embodiment represented in FIG. 1, it is preferred that the master CPU device 100A be one which is available from Everex Computer Systems of Fremont, Calif. having the following attributes:

Model: Everex STEP 286/16
RAM: 1 Megabyte
Nonvolatile Memory: 40 Megabyte Magnetic Fixed Disk Drive & 5.25 inch Floppy Disk Drive
Peripherals: One each of: any standard serial COM port, monitor, and keyboard.

Each of the slave CPUs 100B-100AG may also be identical to the master CPU 100A except that the fixed disk drive, the keyboard, and the monitor may be omitted from the slave CPUs 100B-100 AG in order to reduce the cost and the bulk of the embodiment. It will be understood that each of the CPUs 100A-100AG is provided with an internal paralell communication path or bus, which is not explicitly represented in FIG. 1, to which devices such as communication ports may be connected.

Those skilled in the art will appreciate that the above specified CPUs are substantially equivalent to an IBM PC/AT computer and that while the specified CPUs are preferred, other equivalent machines could be adapted for use in the illustrated embodiment. It will be further appreciated that the speed of operation of the CPUs is an important criteria in determining whether a particular CPU will perform adequately. Also, as the speed of operation of such devices increases, it may be possible to reduce the number of CPUs necessary to test a host computer system having a constant number of active communication ports.

While the arrangement represented in FIG. 1 is preferred, it is to be understood that the inventive concepts of the present invention may be carried out utilizing a plurality of CPUs which are arranged in other than a master-slave relationship.

Importantly, the robot monitoring system represented in FIG. 1 must include a communication path, generally a cable connection represented at 120B-120AG, to each host communication port. In order to provide communication paths between the master CPU 100A and the slave CPUs 100B-100AG, four serial interface cards 104A-110A are installed in the master CPU 100A. Each serial interface card 104A-110A provides eight serial ports (designated at 112A-118A). Each of the serial ports is connected to the COM ports 102B-102AG of the slave CPUs 100B-100AG by way of cables 120A. Likewise, each of the slave CPUs 100B-100AG is provided with four serial interface cards (represented at 104-110 in each of the CPUs 100A-100AG) to allow connection with up to 1024 host communication ports (represented at 12 in FIG. 1). The serial interface cards 104-110 are preferably those available from GTEK, Inc. of Bay St. Louis, Mo., Model PCSS-8TX serial interface card. Each of the PCSS-8TX serial interface cards provides eight serial communication ports as represented in FIG. 1. Each of the communication ports (112-118) allows the CPU, with appropriate software discussed later herein, to communicate with another device, i.e., another CPU or the host computer system 10.

As can be seen in FIG. 1, the master communication ports (represented at 112A, 114A, 116A, and 118A) are connected to the COM communication ports 102B-102AG on the slave CPUs 100B-100AG. Thus, the master CPU 100A can coordinate the operation of up to 32 slave CPUs 100B-100AG. In turn, each of the slave CPUs 100B-100AG are provided with four serial interface cards (112, 114, 116, and 118) which allow each slave CPU 100B-100AG to handle a maximum of 32 communication ports (112, 114, 116, and 118). The communication ports on each slave CPU may be referred to as "remote" communication ports since they appear as remote communication ports to the host computer system. Thus, each slave CPU 100B-100AG may be connected to 32 host communication ports 12 allowing the represented embodiment to emulate up to 1024 terminals.

It is preferred that the standard RS-232 communications protocol be used at all communication ports. While a communication protocol other than the standard RS-232 protocol could be used, use of such a standard serial protocol allows standard modular telephone jacks and cords to be used to interconnect the communication ports to one another.

In the embodiment illustrated in FIG. 1, the master CPU 100A carries out the task of recording the time required for each transaction and also coordinates the functions of all the slave CPUs 100B-100AG. For example, one function of the master CPU 100A is to ensure that the operation of all of the slave CPUs 100B-100AG is initially synchronized. Communication from the master CPU 100A is preferably received by each slave CPU 100B-100AG by a standard COM port 102B-102AG provided at each slave CPU as is well known in the art.

Also represented in FIG. 1 is a terminal 130, such as one available from Wyse Technology of San Jose, Calif., Model 50, which may be used for real time monitoring of transactions and to examine the operation of the embodiment as will be more fully explained hereinafter. The terminal 130 is connected to the master CPU by way of the COM port 102A on the master CPU 100A. Most advantageously, the master CPU 100A and its method of operation as described hereinafter function as a means for logically connecting the terminal 130 to any one of the host communication ports and also allow the results of the monitoring session to be viewed as the session progresses and to be analyzed immediately thereafter.

The arrangement of the CPUs 100A-100AG represented in FIG. 1 are properly referred to as a computer performance evaluation robot. Since the robot can take the place of a large number of terminals and their accompanying human operators, a monitoring test may be carried out much more easily. Moreover, the confidence placed in the monitoring test results obtained using the present invention may be the same or greater than if human operators were used.

C. The Presently Preferred Method of Operation of the Embodiments of the Present Invention Using the system illustrated in FIG. 1, computer performance evaluations can be carried out while the host computer system performs under virtually the same conditions as actual operating conditions. One embodiment of the method of the present invention which allows such an accurate emulation of actual operating conditions is contained in the programming code represented in Appendices A-H. It will be understood that the programming code contained in Appendices A-H is merely representative of the steps to be carried out and other programming code may also be used to implement the inventive concepts taught herein.

The programming code modules found in Appendices A-H provide the instructions necessary to adapt the system of the present invention described herein to perform as a monitoring robot for a large number of host computer systems. Appendix G provides scripting language definitions and a sample script to carry out the present invention on a host computer system which is to serve as the hardware for a library automation system. Those familiar with the operation of a library will understand that an automated library system will generally include the following transactions:

Circulation Transactions:
  Patron Record Update
  Check In
  Check Out
Searching Transactions:
  Key Word Search
  Authority Search
  Indirect Search
  Alpha Title Search
Cataloging Transactions:
  Bibliographic Record Update
  Item Record Update
Acquisition Transactions:
  Ordering
  Receiving The presently preferred embodiment described herein is well adapted to monitor a host computer system capable of carrying out the above-listed transactions utilizing an automated literary system such as those available from Dynix, Inc., of Provo, Utah. It will be appreciated, however, that many other types of multi-user host computer systems may also be monitored using the embodiment and the inventive concepts expressed herein.

Significantly, in order to accurately emulate actual operating conditions, the embodiments of the present invention allow the rate at which transactions are presented to the host computer system to be varied from task to task as well as vary the rate at which characters are input to the host computer system (i.e., vary the typing speed). As an examination of the appendices will reveal, such changes may be made by merely altering some parameters in the scripts previously prepared to carry out a task or transaction. Importantly, in contrast to the previously available techniques, the script programming code remains substantially unaltered as parameters are changed or additional communication ports are assigned to carry out the script.

As will be readily appreciated by those skilled in the art, before a monitoring session is begun, the application software and the database, for example, a library automation program and database, are loaded into the host computer system 10. Also, each communication port of the slave CPUs 100A-100AG are assigned a task which causes one of several transactions to be carried out at that communication port.

Figures 2, 3:
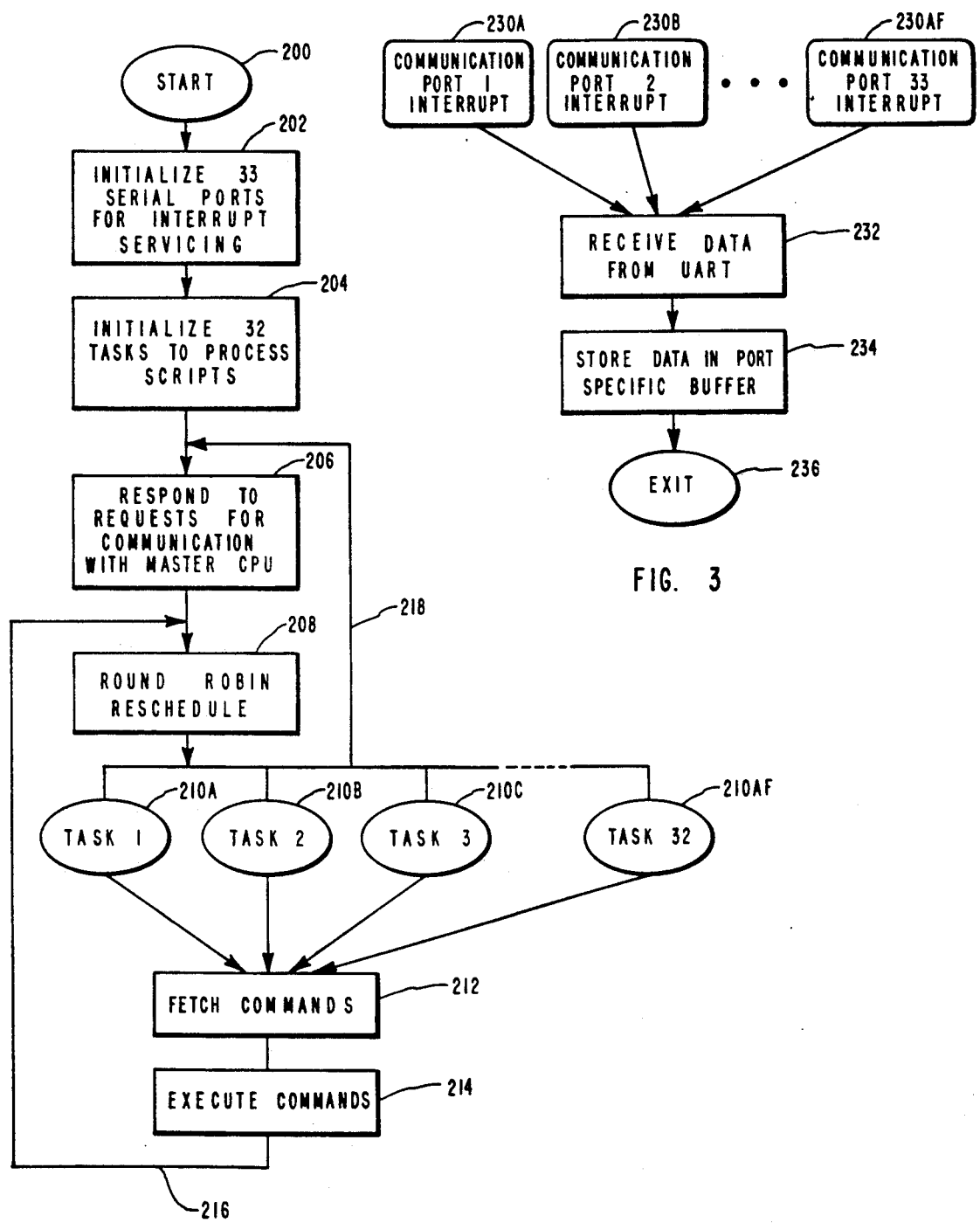
FIG. 2 is a high level flow chart representing the steps carried out by the slave CPUs represented in FIG. 1.
FIG. 3 is a high level flow chart representing the steps carried out during communications with the communication ports associated with the CPUs represented in FIG. 1.

FIG. 2 is a flow chart showing the high level organization of the steps carried out by the program code utilized by the slave CPUs 100A-100AG and appended hereto. Beginning at start 200 in the flow chart of FIG. 2, upon power up or reboot, the 33 serial communication ports (COM ports 102 and ports 112, 114, 116, and 118) provided on each slave CPU 100B-100AG are initialized for interrupt servicing as indicated at step 202.

It will be appreciated that more or fewer than 33 serial communication ports may be associated with each CPU according to the present invention. It is, however, preferred to utilize one COM port of each slave CPU 100B-100AG for communication with the master CPU 100A and that the remaining 32 communication ports (112, 114, 116, and 118) be connected to the host communication ports 12. Further, it will be appreciated that communication techniques, such as a network, could be used to allow communication between each of the CPUs.

As represented at step 204 in FIG. 2, 32 tasks are initialized to appear at one of the 32 communication ports (112, 114, 116, and 118), each of which will process one terminal session. This approach emulates the actual conditions generally found in many host computer systems such as a library automation system. For example, one terminal will be assigned to circulation transactions (patron record update, check in, check out) while another terminal will be assigned to searching transactions (key word search, authority search, indirect search, and alpha title search). In this way, each of the communication ports on the slave CPUs can appear to the host computer system as if it is a terminal carrying out a particular task. Also, if the host computer system is provided with a number of active communication ports which is not an even multiple of 32, fewer than 32 tasks may be initialized at step 204.

In the embodiment described herein, the master CPU 100A is provided with enough memory to be able to store the time required to complete each transaction. Such memory preferably includes a fixed disk drive 132 as represented in FIG. 1. Furthermore, the master CPU 100A coordinates the functioning of the slave CPUs 100B-100AG by giving instructions and also providing data for the CPUs as the scripts are processed. Thus, as represented at step 206, the slave CPUs 100B-100AG respond to requests for communication with the master CPU 100A.

As represented at step 208, each slave CPU reschedules which of the 32 tasks 210A-210AF will be carried out next. When it is a particular task's turn for execution, the appropriate commands are fetched as shown at step 212, and the command is then executed as represented at step 214. The tasks are again rescheduled (as shown at 216) and the process continues until the monitoring session is completed. However, as mentioned, as each task is rescheduled, the data necessary to execute the command (e.g., data representing a patron's identification and the bar code numbers needed for a check out transaction) is obtained from the master CPU as represented at 218.

FIG. 3 is a high level flow chart representing the organization of the interrupt routines for the CPU communication ports (112, 114, 116, and 118) on each slave CPU 100B-100AG. As shown in FIG. 3, as an interrupt from each communication port is received (steps 230A-230AF), the slave CPU receives the data from the UART (Universal Asynchronous Receiver/Transmitter) provided at the serial communication port as shown at step 232. The data is then stored in a port specific buffer within the memory of the slave CPU (step 234) and the slave CPU waits until the next interrupt is received as shown at 236.

Figure 4:
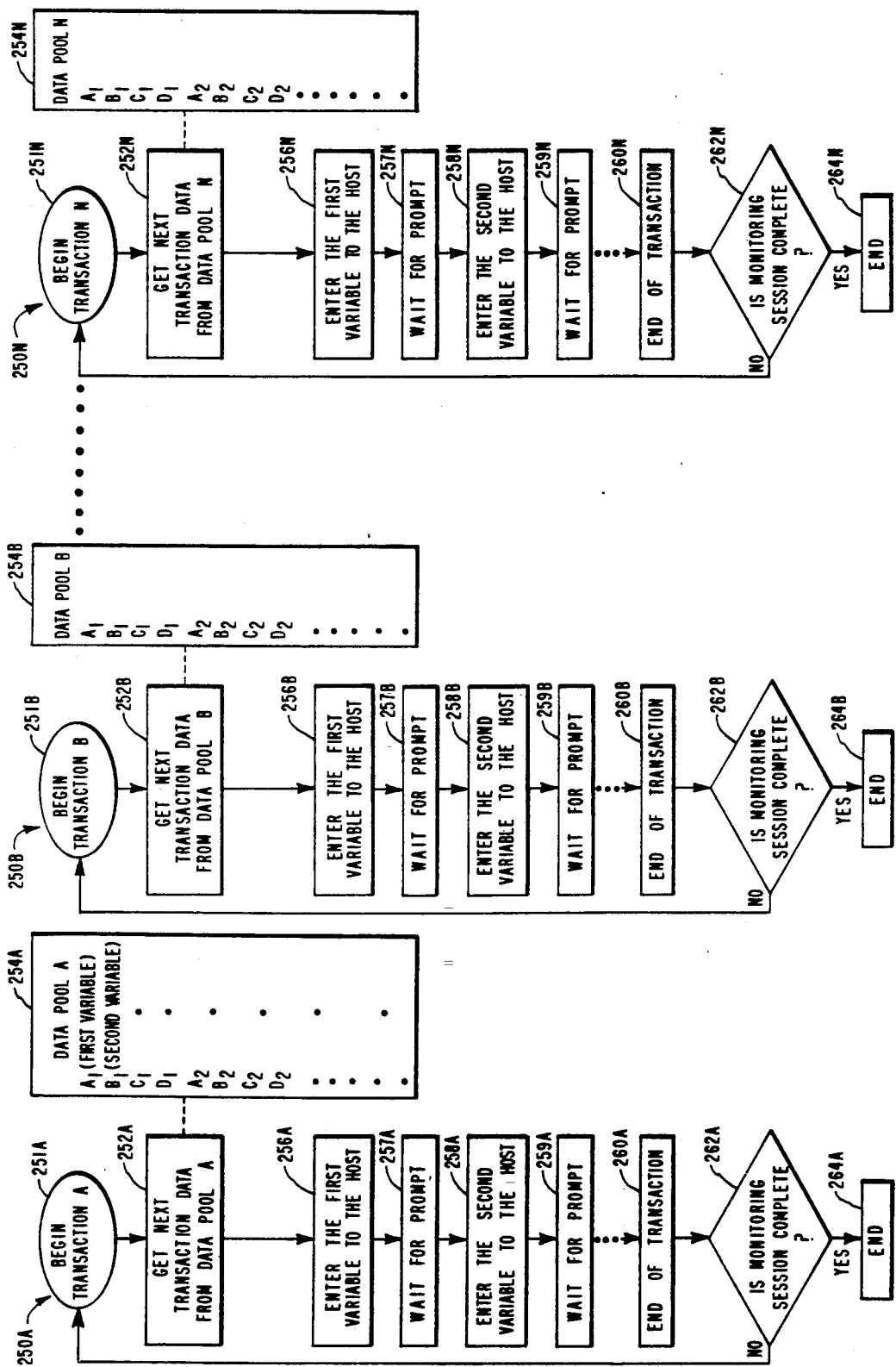
FIG. 4 is a high level flow chart representing the steps carried out during execution of a transaction between an embodiment of the present invention and a host computer system.

Importantly, as shown in FIG. 4, the data needed to carry out a task, such as a check out transaction, is not integral with the scripts. Represented in FIG. 4 is a plurality of scripts each carrying out one type of transaction.

FIG. 4 schematically represents a series of different transactions that may be carried out using the system and method of the present invention. The series of transactions are generally designated by the capital letters A, B, and so forth through any desired number of transactions as represented by the letter N. The steps of each transaction are designated by the numbered steps, and the number of each step is followed by the letter designation of the transaction to which that step pertains. Thus, for example, transaction A begins at step 251A, transaction B begins at step 251B and so forth.

Each of transactions A-N begins at the step represented at 251A-251N in FIG. 4. When data is required, the data is retrieved from the appropriate data pool (254A-254N). Each of the data pools used in a monitoring session is generated from the database which is loaded into the host computer system so that the transactions carried out are the same as those which would be under actual operating conditions.

As represented at step 256A-256N, a first variable is entered into the host computer system. The variable is retrieved from the appropriate data poll as indicated at data pool 254A. Once the variables have been entered, the transaction waits for a prompt, or some other appropriate response, to be returned from the host computer system as represented at steps 257A-257N. It is the period of time between entering the variable and receiving the prompt that is measured to determine the response time of the host computer system. The steps of entering another (second) variable 258A-258N and waiting for another prompt 259A-259N are repeatedly carried out. After the last prompt is received from the host computer system, the transaction ends as represented at step 260A-260N. If the monitoring session is complete (step 262A-262N) then the process ends (step 264A-264N). If not, the transaction is begun again.

By using the described data pool arrangement, when the number of active communication ports on the host computer system is changed it is not necessary to make any major revisions to any of the scripts, but it is only necessary to make other easily carried out changes. Thus, the laborious task of rewriting lengthy scripts with data embedded therein, as required by previously available methods and systems, is avoided. Moreover, the present invention allows the embodiment described herein to halt and resume a monitoring session when desired. These and other advances inherent in the present invention allow computer performance evaluation monitoring to be carried out much more efficiently than previously possible.

Figure 5:
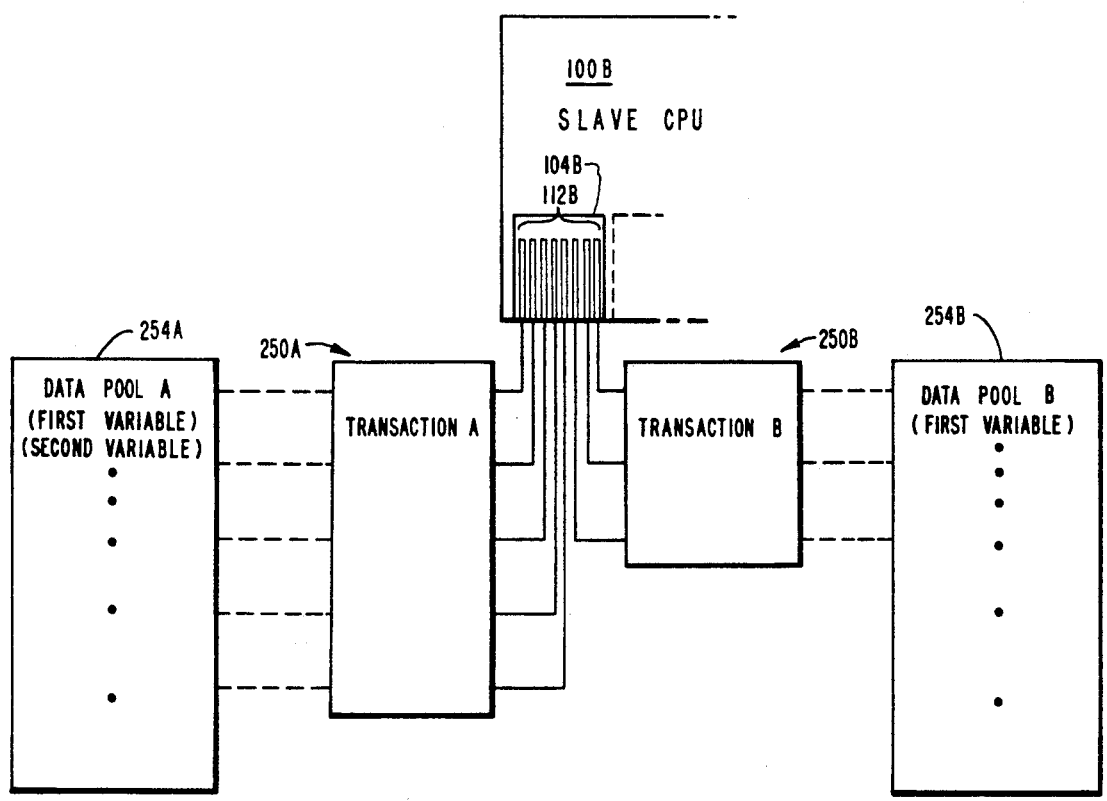
FIG. 5 is a diagram representing one possible allocation of tasks among some of the communication ports shown in FIG. 1.

Reference will next be made to FIG. 5 which is a diagram representing one possible allocation of tasks among some of the communication ports shown in FIG. 1. In FIG. 5, slave CPU 100B with the serial interface card 104B having eight serial communication ports is illustrated. FIG. 5 shows that five communication ports have been allocated to carry out transaction A 250A which derive their data from data pool A 254A. Also shown in FIG. 5 are three other communication ports allocated to carry out transaction B 250B and which all derive their data from data pool B 254B.

Significantly, means is also provided in the system and method of operation of the present invention to allow the transactions to have different parameters (e.g., transaction rate and typing speed) on each communication port. Moreover, changing, adding, or deleting the allocation of transactions may be easily accomplished (either as the number of active host communication ports changes or remains the same) since the scripts reside on the master CPU in the described embodiment and the necessary instructions are communicated to the slave CPUs. In this way, the system embodiment and portions of the programming code contained herein together function as a means for selectively increasing and decreasing the number of active host communication ports which may be monitored.

Provided below is a brief summary of the functioning of each portion of programming code contained in Appendices A-H. It will be appreciated that the programming code attached hereto is specifically written for use on the previously described system and contains modules for statistical analysis of the results of a monitoring session as well as other desirable features. Thus, the code attached hereto must be considered as only exemplary of the present invention since many different hardware configurations and software architectures can be used to carry out the present invention.

The source code contained in the appendices attached hereto is written in the Microsoft C (version 5) programming language (except for assembly language routines where noted) which is well known to those skilled in the art. Thus, appropriate provision for running such programs on the previously described hardware can be made by those possessing skill in the art.

Appendix A
Title: Update Session I/O
Code Module: US.C
The code module (US.C) continued in Appendix A is used to describe the host computer system to be tested and also to set the parameters that control the test session. This code module is used prior to running a test session.

Among the items that describe the host computer system to be tested are:
NAME;
MEMORY SIZE;
DISK SIZE;
DATABASE SIZE;
DATE;
TIME; and
REMARKS Included among the control parameters are:
SESSION LENGTH;
TYPING SPEED;
THINK-TIME DELAYS;
SCRIPT PACING; and
the mix of SCRIPTS among the slave CPU ports Appendix B
Title: Master Program
Code Module: MP.C
This code module runs on the master CPU. Using the SESSION.ID parameter created by the US.C module, this module loads the slave CPUs with the appropriate scripts and then starts the slaves processing the scripts. During a session this module records on the master CPU fixed disk the transaction timings made by the slaves and also provides a central location for storing the status reports of all the slave communication reports.

Appendix C
  Title: Slave Program
  Code Modules:
    SP.C
    SPN.C
    TASK.C
    TESTPORT.C
    TIMER.C
    TRAFFIC.C
    TRANS_IT.C
    SERIAL.H
    SP.H
    SP_DATA.H
    SP_GDATA.H
    DISPLAY.ASM
    DISPLAY.C
    DO_SCRIP.C
    GET_SCR.C
    IO.C
    MAKEDATA.C
    MEM.C
    OBEY.C
    REDUCE.C
    SLAVE.C
    SLEEP.C
    SP_DATA.C
    SP_GDATA.C
    SP_SETUP.C
    RDN.C The SP.C code module runs on each of the slave CPUs and executes the scripts assigned to each of the ports as the master CPU directs. The principal functions of the SP.C code module is to output commands to the host computer system, watch for prompts returned by the host computer system (indicating an appropriate response has been completely delivered, and time the period between the command being output to receipt of the prompt). The other code modules listed in Appendix C are associated with the SP.C module or are code modules desirable to include during the operation of the slave CPU and/or the master CPU.

Appendix D
  Title: Task Scheduler and Serial Driver
  Code Modules: TASK.ASM and SERIAL.ASM These two assembly language routines are used by both the Master Program and the Slave Program to handle the operation of the serial ports and to provide task scheduling.

Appendix E
  Title: Summary Statistics
  Code Module: SS.C

The SS.C module provides some statistical analysis of the timing data collected by the Master Program and converts the files containing the timing information into a format suitable for further analysis.

Appendix F
  Title: Diagnostic Software
  Code Module: WORM.C

The WORM.C code module is used to diagnose hardware problems in both the slave CPUs and the master CPU. Desirably, this code module allows either an internal or external loopback to be performed on any serial port. It can also be used to logically connect a terminal to any port on the host computer system under test.

Appendix G
  Title: Script Definitions, Code Modules: SCRIPT.INC
  AUTHOR.ASM (sample script)

The SCRIPT.INC module contains the definitions of the scripting language used with the described embodiment. The AUTHOR.ASM module is included as an example of a sample script.

Appendix H
  Title: Miscellaneous
  Code Modules:
    SPKR.C
    T.C
    WHATCOM.C
    MK.BAT
    SP1L.BAT
    SPL.BAT
    SPNL.BAT
    SP.DAT
    MENUNIND.H
    SES_FILE.H
    SPN.LNK
    MENUWIND.C
    SP1.C
    TUNES.C The code modules included in Appendix H are miscellaneous modules which are helpful when performing functions such as compiling, linking, or maintaining the programming code.

D. Conclusion

In view of the foregoing, it will be appreciated that the present invention provides an efficient system and method for carrying out computer performance evaluation monitoring of a large scale, multi-user, host computer system.

The present invention also provides a system and method for computer performance evaluation which records the time taken by the host computer for completing each transaction and also easily allows for varying the type of transactions and also the transaction rate from one monitoring session to another. The present invention also represents an advance over the previously available systems and methods in that it may be readily adapted for use with a wide variety of host computer systems as well as with various numbers of communication ports on a host computer system. Importantly, the present invention provides computer performance evaluation monitoring sessions which accurately show the performance of the host computer system under actual operating conditions as well as providing monitoring sessions which can be repeatably reproduced again and again if necessary.

The invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

APPENDIX A

Title: Update Session I/O
    Code Module: US.C

US.C

```
/****** us.c

Update session ID files

Rnolling Stone
K. Brook Richan
(C) 1988 Dynix, Inc.

******/ include "ses_file.h"
include "menuwind.h"
#include <bscreens.h>
#include <bkeybrd.h>
#include <string.h>
#include <stdlib.h>
include <stdio.h> define FALSE 0
define TRUE  1
#define DEAD  254
#define UNUSED 255
#define DDLabelwidth 15

/*** G L O B A L S ***/

SessionID si;
int     si_updated; /* false if si not changed, true if changed */
char    si_dflt[80],si_fname[80];
FILE    *si_file;

char    scp_dflt[80];

int     terms[MaxTransType]; /* number of terminals for each trans type */
int     port_page;

/* which window is visible*/
enum    shown (none_shown,desc_shown,trans_shown,port_shown) w_shown;

MENU    masterM,descM,transM,portM;
WINDOW  descW,transW,portW;

/*** E N D   G L O B A L S ***/

DisplayMyWindow(WINDOW *myW, enum shown my_shown)
{
    if (w_shown != my_shown) (
        if      (w_shown == desc_shown)  RemoveWindow(&descW);
        else if (w_shown == trans_shown) RemoveWindow(&transW);
        else if (w_shown == port_shown)  RemoveWindow(&portW);
    )
    DisplayWindow(myW);
    w_shown = my_shown;
}

/****/
/**** Description window display stuff ****/
/****/
```

```c
DDLabel(int row, char *label)
{
    WriteWindow(&descw,row,DDLabelWidth-strlen(label),WHITE|INTENSITY,label);
}

DDStrData(int row, char *data)
{
char *d, *none = "(none)";

if (*data=='\0') d = none;
    else d = data;
    ClearRect(&descw,row,DDLabelWidth+2,1,78-(DDLabelWidth+2));
    WriteWindow(&descw,row,DDLabelWidth+2,WHITE,d);
}

DDIntData(int row, int data)
{
char s[20];

itoa(data,s,10);
    DDStrData(row,s);
}

DescLabels()
{
    DDLabel(0, "Machine Name");
    DDLabel(1, "Memory Size");
    DDLabel(2, "Disk Size");
    DDLabel(3, "Data Base Size");
    DDLabel(4, "Session Date");
    DDLabel(5, "Session Time");
    DDLabel(6, "Remark");
    DDLabel(7, "N Terminals");
    DDLabel(8, "N Trans. Types");
    DDLabel(9, "Think Time");
    DDLabel(10,"Char Throttle");
    DDLabel(11,"Timeout Value");
}

DescPaint()
{
    DDStrData(0, si.machinename);
    DDStrData(1, si.memorysize);
    DDStrData(2, si.disksize);
    DDStrData(3, si.databasesize);
    DDStrData(4, si.date);
    DDStrData(5, si.time);
    DDStrData(6, si.comment);
    DDIntData(7, si.nterminals);
    DDIntData(8, si.ntranstype);
    DDIntData(9, si.thinktime);
    DDIntData(10,si.charthrottle);
    DDIntData(11,si.timeout);
}

/****/
/**** Transaction window display stuff ****/
/****/

TransRowCol(int tnum, int *row, int *col)
{
    *row = (tnum%7)+1;
    *col = (tnum/7)*25;
```

```
}

DTData(int tnum)
{
int row,col;
char data[10];

TransRowCol(tnum,&row,&col);
    ClearRect(&transW,row,col+5,1,20);
    WriteWindow(&transW,row,col+8,WHITE,si.filename[tnum]);
    itoa(si.transExpRate[tnum],data,10);
    WriteWindow(&transW,row,col+17-strlen(data),WHITE,data);
    itoa(si.maxTransactions[tnum],data,10);
    WriteWindow(&transW,row,col+23-strlen(data),WHITE,data);
}

TranLabels()
{
char *heading = "   TranType  Rate Max #";
char label[3];
int i,row,col;

WriteWindow(&transW,0, 0,WHITE|INTENSITY,heading);
    WriteWindow(&transW,0,25,WHITE|INTENSITY,heading);
    WriteWindow(&transW,0,50,WHITE|INTENSITY,heading);
    label[1]='.'; label[2]='\0';
    for (i=0; i<MaxTransType; i++) {
        label[0]='A'+i;
        TransRowCol(i,&row,&col);
        WriteWindow(&transW,row,col,WHITE|INTENSITY,label);
    }
}

TransPaint()
{
int i;

ClearRect(&transW,1, 3,7,20);
    ClearRect(&transW,1,28,7,20);
    ClearRect(&transW,1,53,7,20);
    for (i=0; i<si.ntranstype; i++) DTData(i);
}

/****/
/**** Port window display stuff ****/
/****/ int DPCountBad()
/* return the number of dead ports */
{
int i,transtype,nbad;

nbad = 0;
    for (i=0; i<MaxTerminal; i++) {
        if (si.termmap[i]==DEAD) nbad++;
    }
    return (nbad);
}

DPCount()
/* set the array 'terms' to no. of terminals for each trans type */
{
int i,transtype;
```

```
        for (i=0; i<si.ntranstype; i++) terms[i]=0;
        for (i=0; i<MaxTerminal; i++) {
            transtype = si.termmap[i];
            if (transtype<si.ntranstype) terms[transtype]++;
        }
}

DPNTerm(int showlabel)
{
char s[5];

if (showlabel) WriteWindow(&portW,11,61,WHITE|INTENSITY,"N Terminals:");
    ClearRect(&portW,11,74,1,3);
    itoa(si.nterminals,s,10);
    WriteWindow(&portW,11,77-strlen(s),WHITE,s);
}

DPTransData(int transnum)
{
int perc,tnum;

char s[5];

if (((port_page==0 && transnum<10) ||
         (port_page==1 && transnum>=10))
            &&
            (transnum<si.ntranstype)) {
        ClearRect(&portW,(transnum%10)+1,71,1,7);
        itoa(terms[transnum],s,10);
        WriteWindow(&portW,(transnum%10)+1,74-strlen(s),WHITE,s);
        if (si.nterminals==0)
            perc=0;
        else
            perc = ((long)terms[transnum]*(long)100)/(long)si.nterminals;
        itoa(perc,s,10);
        WriteWindow(&portW,(transnum%10)+1,78-strlen(s),WHITE,s);
    }
}

DPTrans(int page)
/* page = 0 for first page, 1 for second page of trans types */
{
int i,perc,tnum;
char *letter=":.",s[5];

port_page = page;
    ClearRect(&portW,1,60,10,18);
    for (i=0; i<10; i++) {
        tnum = i + (page*10);
        letter[0]='A'+tnum;
        WriteWindow(&portW,i+1,60,WHITE|INTENSITY,letter);
        if (tnum<si.ntranstype) {
            WriteWindow(&portW,i+1,62,WHITE,si.filename[tnum]);
            DPTransData(tnum);
        }
    }
}

DPTerminals()
{
int row,col,i,j;
unsigned char transtype;
char line[60];
```

```
    /* ClearRect(&portW,1,4,12,54); */
    i=0;
    for (row=0; row<12; row++) {
        col=0;
        for (j=0; j<50; j++) {
            transtype = si.termmap[i++];
            if (j>0 && j%10==0) line[col++]=' ';
            if (transtype==UNUSED) line[col++]='.';
            else if (transtype==DEAD) line[col++]='X';
            else line[col++]='A'+transtype;

}
        line[col]='\0';
        WriteWindow(&portW,row+1,4,WHITE,line);
    }
}

PortLabels()
{
char *numstr="000:";
int i;

for (i=0; i<12; i++) {
        if (i%2) numstr[1]='5'; else numstr[1]='0';
        numstr[0]='0'+(i/2);
        WriteWindow(&portW,i+1,0,WHITE|INTENSITY,numstr);
    }
    WriteWindow(&portW,0,62,WHITE|INTENSITY,"TRANTYPE  #    %");
}

PortPaint()
{
    DPCount();
    DPTrans(0);
    DPTerminals();
    DPNTerm(TRUE);
}

/****/
/**** Auxiliary routines ****/
/****/

InitData()
{
    memset(&si,0,sizeof(SessionID)); /* zero out si */
    memset(si.termmap,UNUSED,MaxTerminal);
    si_updated = FALSE;
}

InitDisplay()
{
    DescLabels();
    DescPaint();
    TranLabels();
    PortLabels();
    PortPaint();
} int DiscardChanges()
/* return TRUE if nothing changed, or if changed and user says ok */
```

```
{
char ans[3];

if (si_updated) {
        DialogPrompt("Throw away changes?","no",ans,3);
        if (toupper(ans[0])!='Y') {
            DialogMsg("Choose 'Save'");
            return(FALSE);
        }
    }
    return(TRUE);
}

DUStr(int row, char *prompt, char *data, int size)
{
char newdata[300];

DialogPrompt(prompt,data,newdata,size);
    if (strcmp(data,newdata)!=0) {
        strcpy(data,newdata);
        DDStrData(row,data);
        si_updated = TRUE;
    }
}

DUInt(int row, char *prompt, short *data)
{
char datastr[6],newdatastr[6];
int  newdata;

itoa(*data,datastr,10);
    DialogPrompt(prompt,datastr,newdatastr,sizeof(newdatastr));
    newdata = atoi(newdatastr);
    if (newdata!=*data) {
        *data = newdata;
        DDIntData(row,newdata);
        si_updated = TRUE;
    }
} int TranLtrToNum(char ch)
/* convert letter A..T to 0..19. return -1 if not in ntranstype range */
{
    ch = toupper(ch);
    if (('A'<=ch) && (ch<=('A'+si.ntranstype-1))) return(ch-'A');
    else return(-1);
}

TUUpd(int tnum)
{
int  newdata,row,col;

char datastr[10],newdatastr[6];

TransRowCol(tnum,&row,&col);
        /* highlight letter */
        AttribRect(&transW,row,col,1,2,BLACK,WHITE);
        itoa(si.transExpRate[tnum],datastr,10);
        DialogPrompt("Transaction expected rate, in clock ticks",datastr,
                    newdatastr,sizeof(newdatastr));
        newdata = atoi(newdatastr);
        if (newdata!=si.transExpRate[tnum]) {
            si.transExpRate[tnum] = newdata;
```

```
        si_updated = TRUE;
        DTData(tnum);
    }
    itoa(si.maxTransactions[tnum].datastr,10);
    DialogPrompt("Maximum transactions for session, 0 = unlimited".datastr,
                newdatastr,sizeof(newdatastr));
    newdata = atoi(newdatastr);
    if (newdata!=si.maxTransactions[tnum]) {
        si.maxTransactions[tnum] = newdata;
        si_updated = TRUE;
        DTData(tnum);
    }
    AttribRect(&transW,row,col,1,2,WHITE|INTENSITY,BLACK);
}

TUChange()
{
char letter[1];
int tnum;

DialogPrompt("Letter of transaction to change","",letter,1);
    tnum = TranLtrToNum(letter[0]);
    if (tnum==-1) {
        DialogMsg(" -- not a proper letter");
        return;
    }
    TUUpd(tnum);
}

TUAdd()
{
char fname[80],*from,*to,ch;
int i;

if (si.ntranstype)=MaxTransType) {
        DialogMsg(" -- transaction table is filled to the brim");
        return;
    }
    GetFileName("Name of Script file",scp_dflt,fname);
    if (fname[0]=='\0') {
        DialogMsg(" -- no script found or chosen");
        return;
    }
    /* back up to end of path, if any */
    for (i=strlen(fname)-1;
         i>=0 && fname[i]!=':' && fname[i]!='\\';
         i--);
    /* copy file name (minus the extension) */
    from = fname+i+1;
    to = si.filename[si.ntranstype];
    while ((*from!='\0') && (*from!='.')) {
        ch = *from++;
        *to++ = toupper(ch);
    }
    *to = '\0';
    /* check for already in table */
    for (i=0;
        i(si.ntranstype &&
        strcmp(si.filename[si.ntranstype],si.filename[i])!=0;
        i++);
    if (i(si.ntranstype) {
        DialogMsg(" -- that script is already in the table");
        return;
    }
    si.transExpRate[si.ntranstype] = 0;
```

```
    si.maxTransactions[si.ntranstype] = 0;
    DTData(si.ntranstype);
    TUUpd(si.ntranstype);
    si.ntranstype++;
    si_updated = TRUE;
    DDIntData(8, si.ntranstype);
}

TUDelete()
{
char letter[1];
int i,tnum;

DialogPrompt("Letter of transaction to delete","",letter,1);
    tnum = TranLtrToNum(letter[0]);
    if (tnum==-1) {
        DialogMsg(" -- not a proper letter");
        return;
    }
    /* remove from array, slide everything else forward */
    si.ntranstype--;
    for (i=tnum; i<si.ntranstype; i++) {
        strcpy(si.filename[i],si.filename[i+1]);
        si.maxTransactions[i] = si.maxTransactions[i+1];
        si.transExpRate[i] = si.transExpRate[i+1];
    }
    TransPaint();
    DDIntData(8, si.ntranstype);
    /* remove from terminal map, alter everything above, change nterminals */
    for (i=0; i<MaxTerminal; i++) {
        if (si.termmap[i]==tnum) {
            si.nterminals--;
            si.termmap[i]=UNUSED;
        }
        else if (si.termmap[i]>tnum && si.termmap[i]<MaxTransType)
            si.termmap[i]--;
    }
    DDIntData(7, si.nterminals);
    si_updated = TRUE;
}

PURowCol(int pos, int *row, int *col)
{
    *row = (pos/50) + 1;
    *col = (pos%50)+4+((pos%50)/10);
}

PUPos(int pos)
{
int row,col;
char s[5];

PURowCol(pos,&row,&col);
    CursorOff(&portW);
    ClearRect(&portW,12,74,1,3);
    itoa(pos,s,10);
    WriteWindow(&portW,12,77-strlen(s),WHITE,s);
    WriteWindow(&portW,row,col,-1,"");
    CursorOn(&portW);
}

PUWrite(int pos, char ch)
```

```
{
int row,col;
char s[2];

PURowCol(pos,&row,&col);
    s[0]=ch; s[1]='\0';
    WriteWindow(&portW,row,col,-1,s);
}

PUUnused(int termno)
{
int oldtrans;

oldtrans = si.termmap[termno];
    si.termmap[termno] = UNUSED; /* unused */
    if (oldtrans<si.ntranstype) {
        terms[oldtrans]--;
        si.nterminals--;
        si_updated = TRUE;
    }
}

PUAdd(int termno, int transtype)
{
    si.termmap[termno] = transtype;
    terms[transtype]++;
    si.nterminals++;
    si_updated = TRUE;
}

PUEdit()
{
int done,curpos,newpos,updtdisp,chrdy,key,transtype,i,oldnterm;
char ch;

if (si.ntranstype==0) {
        DialogMsg(" -- number of trans types is zero. Enter trans types first.");
        return;
    }
    DialogMsg("Use arrow keys, tabs, (PgDn), or transaction letter (a,b,...),\n'.' = dead port, '.' = unused port, <Esc> = quit");
    WriteWindow(&portW,12,61,WHITE|INTENSITY,"Crsr Port #:");
    curpos = 0;
    PUPos(curpos);
    done = FALSE;
    while (!done) {
        updtdisp = FALSE;
        newpos = curpos;
        oldnterm = si.nterminals;
        ch = kbgetkey(&key);
        ch = toupper(ch);
        if      (key==72) newpos-=50;    /* up arrow */
        else if (key==77) newpos++;      /* right arrow */
        else if (key==75) newpos--;      /* left arrow */
        else if (key==80) newpos+=50;    /* down arrow */
        else if (ch==9)   newpos+=10;    /* tab */
        else if (key==15) newpos-=10;    /* back tab */
        else if (key==115) newpos-=10;   /* control left arrow */
        else if (key==116) newpos+=10;   /* control right arrow */
        else if (ch==8)   newpos--;      /* backspace */
        else if (key==81) {              /* PgDn */
            DPTrans(1-port_page);
            PUPos(curpos);
```

```
            }
            else if ('A'<=ch && ch<('A'+si.ntranstype) { /* trans */
                PUUnused(curpos);
                PUAdd(curpos,ch-'A');
                PUWrite(curpos,ch);
                newpos++;
                updtdisp = TRUE;
            }
            else if (ch=='X') { /* dead port */

PUUnused(curpos);
                si.termmap[curpos] = DEAD;
                PUWrite(curpos,ch);
                updtdisp = TRUE;
                newpos++;
            }
            else if (ch=='.') { /* unused port */
                PUUnused(curpos);
                PUWrite(curpos,ch);
                updtdisp = TRUE;
                newpos++;
            }
            else if (ch==27) done = TRUE;
            if (updtdisp) {
                CursorOff(&portW);
                for (i=port_page*10; i<port_page*10+10; i++)
                    DPTransData(i);
                if (oldnterm!=si.nterminals) DPNTerm(FALSE);
                CursorOn(&portW);
            }
            curpos = (newpos+MaxTerminal) % MaxTerminal;
            PUPos(curpos);
    } /* end while */
    ClearRect(&portW,12,61,1,16);
    DialogRemove();
    CursorOff(&portW);
}

PUTermNum()
{
char letter[1];
int i,tnum;
char datastr[6],newdatastr[6];
int  newdata;

if (si.ntranstype==0) {
        DialogMsg(" -- number of trans types is zero. Enter trans types first.");
        return;
    }
    DialogPrompt("Letter of transaction","",letter,1);
    tnum = TranLtrToNum(letter[0]);
    if (tnum==-1) {
        DialogMsg(" -- not a proper letter");
        return;
    }
    itoa(terms[tnum],datastr,10);
    DialogPrompt("How many terminals",datastr,newdatastr,sizeof(newdatastr));
    newdata = atoi(newdatastr);
    if (newdata==terms[tnum]) return;
    if (si.nterminals+newdata-terms[tnum]>MaxTerminal-DPCountBad()) {
        DialogMsg(" -- exceeds maximum allowed terminals");
        return;
    }
    for (i=0; i<MaxTerminal; i++) {
```

```
            if (s1.termmap[i]==tnum) {
                PUUnused(i);
                PUWrite(i,'.');
            }
        }
        for (i=0; (i<MaxTerminal) && (newdata>0); i++) {
            if (s1.termmap[i]==UNUSED) {
                PUAdd(i,tnum);
                PUWrite(i,'A'+tnum);
                newdata--;
            }
        }
    DPTrans(port_page);
    DPNTerm(FALSE);
}

PUAlter()
{
int i,j,tnum,nterm;
char datastr[6],newdatastr[6];
int  newdata;
float ratio;
int  newterms[MaxTransType];

if (s1.nterminals==0) {
        DialogMsg(" -- number of terminals is zero. Enter numbers first.");
        return;
    }
    if (s1.ntranstype==0) {
        DialogMsg(" -- number of trans types is zero. Enter trans types first.");
        return;
    }
    itoa(s1.nterminals,datastr,10);
    DialogPrompt("Change total number of terminals to",datastr,newdatastr,sizeof(newda
tastr));
    newdata = atoi(newdatastr);
    if (newdata==s1.nterminals) return;
    if (newdata>MaxTerminal-DPCountBad()) {
        DialogMsg(" -- exceeds maximum allowed terminals");
        return;
    }
    for (i=0; i<s1.ntranstype; i++) newterms[i] = terms[i];
    ratio = (float)newdata/(float)s1.nterminals;
    for (i=0; i<MaxTerminal; i++) {
        if (s1.termmap[i]!=DEAD) {
            PUUnused(i);
            PUWrite(i,'.');
        }
    }
    i = 0;
    for (j=0; j<s1.ntranstype; j++) {
        nterm = ratio*((float)newterms[j])+0.5;
        while (nterm>0 && i<MaxTerminal) {
            if (s1.termmap[i]!=DEAD) {

PUAdd(i,j);
                PUWrite(i,'A'+j);
                nterm--;
            }
            i++;
        }
    }
    DPTrans(port_page);
    DPNTerm(FALSE);
}
```

```
/****/
/**** Main routines ****/
/****/

LoadFile()
{
    if (DiscardChanges()==FALSE) return;
    GetFileName("Name of Session ID file",si_dflt,si_fname);
    if (*si_fname=='\0') { DialogMsg(" -- no file loaded");    return;   }
    si_file = fopen(si_fname,"rb");
    if (si_file==NULL) {DialogMsg(" -- can not open file"); return; }
    fread(&si,sizeof(SessionID),1,si_file);
    fclose(si_file);
    si_updated = FALSE;
    DescPaint();
    TransPaint();
    PortPaint();
    DialogMsg("Loaded");
}

SaveFile()
{
    DialogPrompt("Name of Session ID file",si_fname,si_fname,
            sizeof(si_fname));
    if (*si_fname=='\0') {DialogMsg(" -- no file saved"); return; }
    DialogMsg("Saving...");
    si_file = fopen(si_fname,"wb");
    if (si_file==NULL) {DialogMsg(" -- can not create file"); return; }
    fwrite(&si,sizeof(SessionID),1,si_file);
    fclose(si_file);
    DialogMsg("Saved");
    si_updated = FALSE;
}

InitCommand()
{
    if (DiscardChanges()==FALSE) return;
    InitData();
    InitDisplay();
    TransPaint();
    DialogMsg("Zhe data, she's ah zappahrooed");

}

DescUpdate()
{
char cmd;

DisplayMyWindow(&descW,desc_shown);
    descM.lastColumn = 0;
    DisplayMenu(&descM);
    cmd = ' ';
    while (cmd != 'Q') {
        cmd = GetMenu(&descM);
        DialogRemove();
        if      (cmd == 'N')
          DUStr(0,"Name of machine",si.machinename,
            sizeof(si.machinename));
        else if (cmd == 'M')
          DUStr(1,"Size of machine's memory",si.memorysize,
            sizeof(si.memorysize));
        else if (cmd == 'D')
          DUStr(2,"Size of machine's disk",si.disksize,
            sizeof(si.disksize));
        else if (cmd == 'F')
```

```
            DUStr(8,"Size of the data base",si.databasesize,
               sizeof(si.databasesize));
         else if (cmd == 'R')
            DUStr(6,"General remark about session",si.comment,
               sizeof(si.comment));
         else if (cmd == 'O')
            DUInt(9,"Inter-operation think time, in clock ticks",&si.thinktime);
         else if (cmd == 'C')
            DUInt(10,"Inter-character wait time, in clock ticks",&si.charthrottle);
         else if (cmd == 'T')
            DUInt(11,"Time to wait before signaling 'timeout', in clock ticks",
               &si.timeout);
      }
      RemoveMenu(&descM);
}

TransUpdate()
{
char cmd;

DisplayMyWindow(&transW,trans_shown);
      transM.lastColumn = 0;
      DisplayMenu(&transM);
      cmd = ' ';
      while (cmd != 'Q') {
         cmd = GetMenu(&transM);
         DialogRemove();
         if      (cmd == 'A') TUAdd();
         else if (cmd == 'C') TUChange();
         else if (cmd == 'D') TUDelete();
      }
      RemoveMenu(&transM);
}

PortUpdate()
{
char cmd;

DisplayMyWindow(&portW,port_shown);
      PortPaint();
      portM.lastColumn = 0;
      DisplayMenu(&portM);
      cmd = ' ';
      while (cmd != 'Q') {
         cmd = GetMenu(&portM);
         DialogRemove();
         if      (cmd == 'E') PUEdit();
         else if (cmd == 'T') PUTermNum();
         else if (cmd == 'A') PUAlter();
         else if (cmd == 'N') DPTrans(1-port_page);
      }
      RemoveMenu(&transM);
      DDIntData(7, si.nterminals);
} main()
{
      char cmd;
      int cur_off,cur_row,cur_col,cur_high,cur_low;

scpclr(); /* clear screen */

/* save state of cursor */
      cur_off = sccurst(&cur_row,&cur_col,&cur_high,&cur_low);
```

```c
/* initialize data */
InitMenuWind();
strcpy(si_dflt,"*.ID");
si_fname[0] = '\0';
strcpy(scp_dflt,"*.SCP");
w_shown = none_shown;

/* make menus */
MakeMenu(&masterM,
    "Load:Load a session ID file",
    "Description:Update session description fields",
    "Transactions:Update transaction table",
    "Ports:Update port table",
    "Save:Save a session ID file",
    "Init:Initialize session ID data to nulls",
    "Quit",
    "");
MakeMenu(&descM, "Name:Machine name being tested",
    "Memory:Memory size of machine",
    "Disk:Total disk size",
    "Files:Data base size",
    "Remark:Any ol' thing ya wanna say",
    "Oper think:Inter-operation think time",
    "Char wait:Inter-character wait time",
    "Timeout:Time to wait before signaling inactivity",
    "Quit",
    "");
MakeMenu(&transM,
    "Add:Add a transaction type",
    "Change:Change transaction rate and max trans",
    "Delete:Delete a transaction type",
    "Quit",
    "");
MakeMenu(&portM,
    "Edit:Modify the table directly",
    "Terminals:Set the number of terminals for each transaction",
    "Alter:Change total terminals, maintain same percentages",
    "Next:Next page of transaction types",
    "Quit",
    "");

/* make windows */
MakeWindow(&descW,12,78," Session Description ",7,1);
MakeWindow(&transW,8,78," Transaction Types ",7,3);
MakeWindow(&portW,13,78," Port to Transaction Map ",7,1);

InitData();
InitDisplay();

/* the main loop */
DisplayMyWindow(&descW,desc_shown);
cmd = ' ';
DisplayMenu(&masterM);
while(cmd != 'Q') {
    cmd = GetMenu(&masterM);
    DialogRemove();
    if      (cmd=='L') LoadFile();
    else if (cmd=='S') SaveFile();
    else if (cmd=='I') InitCommand();
    else if (cmd=='D') {
        RemoveMenu(&masterM);
        DescUpdate();
        DisplayMenu(&masterM);
    }
    else if (cmd=='T') {
        RemoveMenu(&masterM);
```

```
        TransUpdate();
        DisplayMenu(&masterM);
    }
    else if (cmd=='P') {
        RemoveMenu(&masterM);
        PortUpdate();

DisplayMenu(&masterM);
        }
        else if (cmd=='Q') if (DiscardChanges()==FALSE) cmd=' ';
    }

/* restore cursor */
    scpclr(); /* clear screen */
    sccurset(cur_row,cur_col);
    scpgcur(cur_off,cur_high,cur_low,CUR_NO_ADJUST);
}
```

APPENDIX B

Title: Master Program
Code Module: MP.C

MP.C

```
/*      Master Processor
        (C) copyright 1988 Dynix, Inc.
        written by: J. Wayne Schneider
        date:       26 July 1988

This program controls the slaves in the RHOBOT network.
*/ define FALSE   0
define TRUE    ~FALSE include <bios.h>
include <stdio.h>
#include <io.h>
#include <malloc.h>

FILE *stream;
long length;
char *message_buff;
char *message[5][10];
char *rx_buffer;

main() {
    int i,t,numread;
    char *mp;

stream = fopen("ID.DAT","rb");
    if (stream == NULL) {
        puts("Can't open the ID.DAT file!");
        exit(2);
        }
    length = filelength(fileno(stream));
    if ((length == -1L) || (length > 32767L)) {
        puts("File size out of range!");
        exit(3);
        }
    message_buff = malloc((int)length);
    if (message_buff == NULL) {
        puts("Not enough memory for messages!");
        exit(4);
        }
```

```
    numread = fread(message_buff,1,(int)length,stream);
    if(numread != (int)length) {
        puts("Error reading ID.DAT file!");
        exit(5);
        }
    mp = message_buff;
    do {
        switch (*(mp++))    {
            case 1:     i=0;break;
            case 10:    i=1;break;
            case 17:    i=2;break;
            default:    continue;
            }
        t = *(mp++);
        message[i][t] = mp;
        while(*(mp++) != NULL);
        }
    while (mp < (message_buff + numread));

serial_init(1,9600,0x03,0x0B,0x1);
    rx_buffer=malloc(2048);
    if (rx_buffer == NULL) {
        puts("Not enough memory for rx_buffer!");
        exit(6);
        }
    serial_init_interrupt(4,rx_buffer,2048,1);
    do process(); while (TRUE);
    serial_int_release(4);
    } int process() {
    int t;
    unsigned char c;

if (chkbuf())
        {
        c = sgetc();
        switch(c)
            {
            case  1:    printf("PROCESS %s\n",message[0][sgetchar()]);break;

case 10:    printf("REPORT %s\n",message[1][sgetchar()]);break;

default:    printf("char is %i\n",c);break;
            }
        } if (kbhit()) {
        getchar();
        }
    } int sgetchar() {
    while(!chkbuf()) reschedule();
    return sgetc();
    } int reschedule() {}
```

APPENDIX C

Title: Slave Program
Code Modules: SP.C
SPN.C
TASK.C
TESTPORT.C
TIMER.C

```
TRAFFIC.C
TRANS_IT.C
SP.H
SP_DATA.H
SP_GDATA.H
DISPLAY.ASM
DISPLAY.C
INTERUPT.ASM
DO_SCRIP.C
GET_SCRIP.C
IO.C
MAKEDATA.C
MEM.C
OBEY.C
REDUCE.C
SLAVE.C
SLEEP.C
SP_DATA.C
SP_GDATA.C
SP_SETUP.C
RND.C
```

SP.C

```
/***********************************************************************

Slave Processor for the RHOBOT (C) copyright 1988 Lynix, Inc.
        written by: J. Wayne Schneider
            date:   1 September 1988

Memory model is COMPACT

This program has no output to the screen.  All commands must
    come in from COM1.  All output goes to COM1 as well.  The
    serial ports 20-27, 30-37, 40-47, 50-57 are used for host
    script processing.  (numbers are octal)

This program does not even require a data file for initialization.
    That implies that it must test the com ports to see which ones
    are working.  We will assume we always have 32.  Any that are
    not working or don't exist will be flagged as bad and not used.

Internally, we address the ports in octal as 20 through 57.
    For all reporting, we reference them as 0 through 31.  These numbers
    also coincide with the 'task_id' that is controlling the port.

***********************************************************************/ include <stdio.h>
include <malloc.h>
include <string.h> include "sp.h"
include "\rhobot\sp_data.h"
#include "sp_gdata.h"
#include "\rhobot\serial.h"
#include "task.h"

/***********************************************************************
                        constants
***********************************************************************/ int const MASTER_PORT = 1;              /* com port to master */
```

```
/**********************************************************************
                        procedure prototypes
**********************************************************************/ void read_command_line(int,char *[]);
void hardware_setup(void);
void initiate_script_tasks(void);
void traffic_packets(void);
void clean_up(void);

/**********************************************************************
                        MAIN PROCEDURE
**********************************************************************/ main(argc,argv)
    int argc;
    char *argv[];
    {
    read_command_line(argc,argv);     /* get number_of_ports from com line */
    hardware_setup();                 /* fixup clock & COM1 which MUST work */
    initiate_script_tasks();          /* do all the task startup stuff */
    reschedule();                     /* let everyone init com port */
    traffic_packets();                /* traffic packets between mstr/slv */
    clean_up();                       /* shut it all down for clean stop */
    }

/********************************************************************** procedure HARDWARE_SETUP

The clock tick counter must be set to zero for our purposes.
COM1 is tested with an internal loopback. It MUST work or we can't go on.
If it fails, we will display an error message and give a sad tune.
If it succeeds, we clear the display and give a cheerful tune.
We also must initialize the com port and it's interrupt.

**********************************************************************/ void hardware_setup()
    {
    char far *rx_buffer;

/*  timer_init();               */    /* run timer int at 20hz */ while (test_port(MASTER_PORT))     /* test the port */
        {
        display("COM1 BAD");
        sad_tune();
        }
    display(signature);                /* clear the display */
    chirrup_tune();

rx_buffer=_fmalloc(RX_BUFFER_SIZE); /* init the port */
    if (rx_buffer == NULL)
        {
        display("_fmalloc");
        exit(1);
        } serial_init(MASTER_PORT,
                9600,
                _8_DATA,
                DTR|RTS|OUT2,
                ERDAI,
                rx_buffer,RX_BUFFER_SIZE,0);

serial_init_interrupt(MASTER_PORT,0);
    }
```

```
/****************************************************************
                    procedure READ_COMMAND_LINE The command line is checked for argument. There can be none, one, or two
arguments. One argument would be a signature to display in the
front panel. The other argument would be numeric and represent the
number of ports to utilize. The default port count is 32 and the default
signature is blank. Either argument can appear in either position.

****************************************************************/ void read_command_line(argc,argv)
    int argc;
    char *argv[];
    {
    int i=0;
    char buff[9];

switch (argc)
        {
        case 1: break;                  /* no argument given */ default:                        /* two or more arguments given */
            {
            i = atoi(argv[2]);
            if (i != 0)
                {
                signature = argv[1];
                break;
                }
            else
                signature = argv[2];
            }                           /* fall thru to get arg 1 */ case 2:                         /* one argument given */
            {
            i = atoi(argv[1]);
            if (i == 0)
                signature = argv[1];
            }
        } if ( (i >= 1) && (i <= 32) )
        {
        number_of_ports = i;
        sprintf(buff,"%2d PORTS",i);
        display(buff);
        sleep(20);
        } display(signature);                 /* set display to default */
    }
/****************************************************************
                    procedure INITIATE_SCRIPT_TASKS Allocate stack space and set up all of the task control blocks for the
script processing tasks. We also set ourselves up as a task and determine
the maximum stack size based on the number of ports.

****************************************************************/ void initiate_script_tasks()
    {
    int i;
    char near *stack_ptr;
```

```
    unsigned stack_size;

/* stack size is near heap space divided by ports.  Less 2 for overhead
       and forced to an even number
    */
    stack_size = ((_memavl() / number_of_ports) - 2) & 0xFFFE;

first_task(&tcb[32]);                    /* init ourselves as a task */ for (i=0;i<number_of_ports;i++)          /* now init the other tasks */
        {
        stack_ptr = _nmalloc(stack_size);    /* get a new stack */
        if (stack_ptr == NULL)
            {
            display("_nmalloc");
            tcb[i].task_status = TASK_STATUS_EXIT;
            continue;
            }
        create_task(&tcb[i],stack_ptr,stack_size,slave,1);
        }
    }

/******************************************************************* procedure CLEAN_UP

Fix up the necessary things before we exit.  Those things are the clock
and the serial interrupts.

********************************************************************/ void clean_up()
    {
    int i;

/* timer_undo(); */                              /* fix the clock */
    serial_init_interrupt(MASTER_PORT,1);   /* serial interrupts */
    for(i=0;i<number_of_ports;i++)
        serial_init_interrupt(i+017,1);
    }

RND.C
/* Rand_norm( mod , type);
   Generate a random number of 'type' % mod+1;

If type == 1 we get a uniform distribution;
   If type == 4 we get a normal distrubtion (bell curve);

One is added to the 'mod' so the value returned is 0 <= r <= mod.

(C) copyright 1988 Dynix, Inc.
   written by: J. Wayne Schneider
        date:  29 August 1988
*/ include "sp.h"
include <stdlib.h> int rand_norm(mod,type)
    int mod;
    int type;
    {
    int i;
    long sum=0;
    for (i=0;i<type;i++)
        sum += rand() % (mod + 1);
    return sum/type;
    }
```

SPN.C

```
/*      Script Processor for N ports without a master (C) copyright 1988 Dynix, Inc.
        written by: J. Wayne Schneider
        date:       4 September 1988

SPN n script_file_name [script_arguments...] [<data_filename]

This program reads the script file specified on the command line
and processes it on "n" ports. Data entry can be specified with redirection,
<data_filename. A string argument may be passed to the script processor to
be recognized as ARG1, ARG2, ... ARG7. The ports must be PCSS-8 ports.

*/ define TASK_STATUS_EXIT   0x80 include <bios.h>
include <conio.h>
#include <malloc.h>
include <stdio.h>
include <bscreens.h> include "sp.h"
include "sp_data.h"
#include "sp_gdata.h"
#include "ses_file.h"

struct t_str gtrans;

struct {
    char far *next;
    char far *stack;
    int stack_limit;
    int task_status;
    }
    tcb[33];

long length;
char *script;
char **targv;

int task(int);

main(argc,argv)
    int argc;
    char *argv[];
    {
    int i,j,number_of_ports, flag;
    unsigned stack_size, stack_ptr;

trans_init(>rans,&global);

if (argc < 3) {
        puts("Specify a count & script file to process!");
    puts("SPN n script_file_name [script_arguments...] [<data_filename]");
    exit(1);
    } number_of_ports = atoi(argv[1]);

script = get_script(argv[2],&length,op_io_msg);

scpclr();
```

```
i = (op_id_msg[0] == NULL) ?   15    : 9 + strlen(op_id_msg[0]);
sccurset(0,(80 - i) / 2);
printf("SCRIPT - %s",op_id_msg[0]);

ses_file = fopen("SPN.DP","wb");
if (ses_file == NULL)
    perror("open failed");

err_file = fopen("SPN.ERR","w");
if (err_file == NULL)
    perror("error open failed");

serial_port_setup(number_of_ports);
for (i=0;i<number_of_ports;i++)
    {
    sccurset(i%16 + 4,(i/16) * 40);
    printf("%2d ",i+1);
    if (!good_port[i+020])
        printf("(no port)");
    } timer_init();                       /* change clock to 20 ticks/second */ targv = &argv[3];                   /* setup argv pointer for tasks */ first_task(&tcb[32]);               /* init ourselves as a task */
stack_size = (_memavl() / number_of_ports - 2) & 0xFFFE;
sccurset(1,26);
printf("Stack size for tasks is %d\n",stack_size);
for (i=0;i<number_of_ports;i++)
    {
    if (good_port[i+020])
        {
        stack_ptr = (int) _nmalloc(stack_size);    /* get a new stack */
        if (stack_ptr == NULL)
            {
            printf("Not enough stack memory for %d\n",i);
            continue;
            }
        create_task(&tcb[i],stack_ptr,stack_size,task,i);
        }
    else
        tcb[i].task_status = TASK_STATUS_EXIT;
    } reschedule();                       /* let everyone init com before ints */ for (i=0;i<number_of_ports;i++)     /* enable only needed interrupts */
    if (good_port[i+020])
        serial_init_interrupt(020+i,0);

sccurset(24,0);
printf("press Esc to exit:");

do {                                /* wait for tasks to complete */
    if (!_bios_keybrd(_KEYBRD_READY))
        if ((char)_bios_keybrd(_KEYBRD_READ) == 0x1b)
            break;                  /* break from 'do' loop */
    reschedule();
    flag = FALSE;
    for (i=0;i<number_of_ports;i++)
        if ( !tcb[i].task_status )
            {
            flag = TRUE;
            break;                  /* break from for loop */
            }
```

```
        }
    while (flag);

for (i=0;i<number_of_ports;i++)    /* disable only needed interrupts */
        if (good_port[i+020])
            serial_init_interrupt(020+i,1);

for (i=0;i<number_of_ports;i++)
        fprintf(err_file,"performance %d %d\n",i+1,performance_check[i+020]);
    timer_undo();
    fclose(ses_file);
    fclose(err_file);
    sccurset(22,0);
    }

/* TASK routine is here. We hope it is re-entrant. */ task(task_id)
    int task_id;
    {
    struct t_str trans;
    char *rx_buffer;

rx_buffer=malloc(2048);
    if (rx_buffer == NULL) {
        puts("Not enough memory for rx_buffer!");
        exit(6);
        } memset(rx_buffer,0,2048);
    serial_init(task_id + 020,9600,0x03,0x0B,0x1,rx_buffer,2048,IGNORE_NULL);

trans = gtrans;
    do_script(task_id + 020,script,length,targv,rx_buffer + 9,&trans);
    }

/* Terminal routines here replace communication to master */ void process(comx,numb)
    int comx, numb;
    {
    comx -= 020;
    sccurset(comx%16 + 4,(comx/16) * 40 + 3);
    printf("%-10.10s",op_id_msg[numb]);
    } int report(comx,numb)
    int comx, numb;
    {
    char c;

comx -= 020;
    sccurset(comx%16 + 4,(comx/16) * 40 + 14);
    printf("%-20.20s",status_msg[numb]);
    if(numb == 2)
        {
        /*  sccurset(21,0);
            printf("A = abort, anything to continue ?"); */
        c = 'A';  /* toupper((char) _bios_keybrd(_KEYBRD_READ)); */
        /*  scclrmsg(21,0,80); */
        if (c == 'A')
            {
            sccurset(comx%16 + 4,(comx/16) * 40 + 34);
            printf("ABORT");
            return TRUE;
```

```
            }
       return FALSE;
       } void check_point(comx,op_id,op_time,wall_time)
     int comx, op_id;
     long op_time, wall_time;
     {
     TimingRec t;
     int port;

port = comx - 020;
     sccurset(port%16 + 4,(port/16) * 40 + 14);

if (op_id == 0) printf("TRANS-tm %5ld %5ld",op_time,wall_time);
     else printf("\xFB %-6.6s %5ld %5ld",op_id_msg[op_id],op_time,wall_time);

t.termno = comx;
     t.opid = op_id;
     t.stopwatch = op_time;

t.wallticks = wall_time;
     fwrite(&t, sizeof(TimingRec), 1, ses_file);
     } int get_data(var)
     char var[10][80];
     {
     int i;
     char *back;

for (i=1;i<10;i++)
        {
        sccurset(21,0);
        printf("getvar:");
        back = gets(var[i]);
        scclrmsg(21,0,80);
        if (back == NULL) return EOF;
        if (strcmp(var[i],"END") == 0) return EOF;
        if (strcmp(var[i],"") == 0) break;
        }
     return NULL;
     } int wait_for_operator()
     {
        /* sccurset(21,0);
           printf("Waiting for operator. Press any key:");
           _bios_keybrd(_KEYBRD_READ);
           scclrmsg(21,0,80);                */
     } int do_exit(comx)
     int comx;
     {
     comx -= 020;
     sccurset(comx%16 + 4,(comx/16) * 40 + 35);
     printf("ExIT");
     return TRUE;
     }

TASK.C struct {
     char far *next;
     char far *stack;
```

```
        int stack_limit;
        int task_status;
        }
        tcb[33];

long length;
char *script;
char **targv;

int task(int);

main()
    {
    int i,j,number_of_ports, flag;
    unsigned stack_size, stack_ptr;

trans_init(>rans,&global);

number_of_ports = 32;

script = get_script(argv[2],&length,op_id_msg);

scpclr();
    i = (op_id_msg[0] == NULL) ?   15   : 9 + strlen(op_id_msg[0]);
    sccurset(0,(80 - i) / 2);
    printf("SCRIPT - %s",op_id_msg[0]);

ses_file = fopen("SPN.OP","wb");
    if (ses_file == NULL)
        perror("open failed");

err_file = fopen("SPN.ERR","w");
    if (err_file == NULL)
        perror("error open failed");

serial_port_setup(number_of_ports);
    for (i=0;i<number_of_ports;i++)
        {
        sccurset(i%16 + 4,(i/16) * 40);
        printf("%2d ",i+1);
        if (!good_port[i+020])
            printf("(no port)");
        } timer_init();                       /* change clock to 20 ticks/second */ targv = &argv[3];                   /* setup argv pointer for tasks */ first_task(&tcb[32]);               /* init ourselves as a task */
    stack_size = (_memavl() / number_of_ports - 2) & 0xFFFE;
    sccurset(1,26);
    printf("Stack size for tasks is %d\n",stack_size);
    for (i=0;i<number_of_ports;i++)
        {
        if (good_port[i+020])
            {
            stack_ptr = (int) _nmalloc(stack_size);   /* get a new stack */
            if (stack_ptr == NULL)
                {
                printf("Not enough stack memory for %d\n",i);
                continue;
                }
            create_task(&tcb[i],stack_ptr,stack_size,task,i);
            }
        else
```

```
            tcb[i].task_status = TASK_STATUS_EXIT;
        } reschedule();                          /* let everyone init com before ints */ for (i=0;i<number_of_ports;i++)        /* enable only needed interrupts */
        if (good_port[i+020])
            serial_init_interrupt(020+i,0);

sccurset(24,0);
    printf("press Esc to exit:");

do {                                   /* wait for tasks to complete */
        if (_bios_keybrd(_KEYBRD_READY))
            if ((char)_bios_keybrd(_KEYBRD_READ) == 0x1b)
                break;                     /* break from 'do' loop */
        reschedule();
        flag = FALSE;
        for (i=0;i<number_of_ports;i++)
            if ( !tcb[i].task_status )
            {
                flag = TRUE;
                break;                     /* break from for loop */
            }
        }
    while (flag);

for (i=0;i<number_of_ports;i++)        /* disable only needed interrupts */
        if (good_port[i+020])
            serial_init_interrupt(020+i,1);

for (i=0;i<number_of_ports;i++)
        fprintf(err_file,"performance %d %d\n",i+1,performance_check[i+020]);
    timer_undo();
    fclose(ses_file);
    fclose(err_file);
    sccurset(22,0);
    }

/* TASK routine is here. We hope it is re-entrant. */ task(task_id)
    int task_id;
    {
    struct t_str trans;
    char *rx_buffer;

rx_buffer=malloc(2048);
    if (rx_buffer == NULL) {
        puts("Not enough memory for rx_buffer!");
        exit(6);
        } memset(rx_buffer,0,2048);
    serial_init(task_id + 020,9600,0x03,0x0B,0x1,rx_buffer,2048);
    trans = gtrans;
    do_script(task_id + 020,script,length,targv,rx_buffer + 9,&trans);
    }

/* Terminal routines here replace communication to master */ void process(comx,numb)
    int comx, numb;
    {
    comx -= 020;
```

```c
        sccurset(comx%16 + 4,(comx/16) * 40 + 3);
        printf("%-10.10s",op_id_msg[numb]);
        } int report(comx,numb)
    int comx, numb;
    {
    char c;

comx -= 020;
    sccurset(comx%16 + 4,(comx/16) * 40 + 14);
    printf("%-20.20s",status_msg[numb]);
    if(numb == 2)
        {
        /* sccurset(21,0);
           printf("A = abort, anything to continue ?"); */
           c = 'A';  /*  toupper((char) _bios_keybrd(_KEYBRD_READ));   */
        /* scclrmsg(21,0,80);  */
        if (c == 'A')
            {
            sccurset(comx%16 + 4,(comx/16) * 40 + 34);
            printf("ABORT");
            return TRUE;
            }
        }
    return FALSE;
    } void check_point(comx,op_id,op_time,wall_time)
    int comx, op_id;
    long op_time, wall_time;
    {
    TimingRec t;
    int port;

port = comx - 020;
    sccurset(port%16 + 4,(port/16) * 40 + 14);

if (op_id == 0) printf("TRANS-tm %5ld %5ld",op_time,wall_time);
    else printf("\xFB %-6.6s %5ld %5ld",op_id_msg[op_id],op_time,wall_time);

t.termno = comx;
    t.opid = op_id;
    t.stopwatch = op_time;
    t.wallticks = wall_time;
    fwrite(&t, sizeof(TimingRec), 1, ses_file);
    } int get_data(var)
    char var[10][80];
    {
    int i;
    char *back;

for (i=1;i<10;i++)
        {
        sccurset(21,0);
        printf("getvar:");
        back = gets(var[i]);
        scclrmsg(21,0,80);
        if (back == NULL) return EOF;
        if (strcmp(var[i],"END") == 0) return EOF;
        if (strcmp(var[i],"") == 0) break;
        }
    return NULL;
    } int wait_for_operator()
```

```
        {
    /*  sccurset(21,0);
            printf("Waiting for operator. Press any key:");
            _bios_keybrd(_KEYBRD_READ);
        scclrmsg(21,0,80);                  */
        } int do_exit(comx)
    int comx;
    {
    comx -= 020;
    sccurset(comx%16 + 4,(comx/16) * 40 + 35);
    printf("EXIT");
    return TRUE;

}

TESTPORT.C

/*  Test comx port to see if it exists and works properly (C) copyright 1988 Dynix, Inc.
        written by: J. Wayne Schneider
            date:   2 September 1988 test_port(comx) where comx is 1 to 77 octal and
                    An error code is returned, 0 means it passed.
*/ define FALSE   0
define TRUE    1 include "\rhobot\serial.h"
include <bios.h>

/*
    Set and check a single register in the 8250
*/
reg_check(com,val,error)
    int com, val, error;
    {
    outp(com,val);
    if (inp(com) == val)
        return FALSE;
    else
        return error;
    }

/*
    Test the com port to see if it exists and functions
*/
test_port(comx)
    int comx;
    {
    int i, baudlo, baudhi, ier, lcr, mcr, flag, com, in, out;
    long tm1, tm2;

com = get_com_adr(comx);        /* translate to a port address */
    enable_i();                     /* get_com_adr disables int, we enable */ if (! com)
        return 1;                   /* give up immediately on port 0 */ flag = FALSE;                   /* test for PCSS-8 card */
```

```
for ( i = 0 ; i < 256 ; i++)
    flag != reg_check(com+SCR,1,0x0002);
if ( ((comx < 010) && flag) || ((comx > 7) && !flag) )
    return 0x0004;                      /* standard port #, scratch bad */
                                        /* or PCSS port #, scratch good */
                                        /* either means failure */ get_com_adr(comx);                      /* reset scratch on PCSS-8 */ ier = inp(com+IER);                     /* preserve the old reg values */
lcr = inp(com+LCR);
mcr = inp(com+MCR);

flag = FALSE;                           /* assume good until proven otherwise */ flag != reg_check(com+LCR,0xFF,0x0008); /* check the line control register */
flag != reg_check(com+LCR,0x00,0x0008); /* be sure divisor latch is cleared */
flag != reg_check(com+IER,0x00,0x0010); /* leave interrupts disabled */
flag != reg_check(com+MCR,0x1F,0x0020); /* check the modem control register */
flag != reg_check(com+MCR,0x00,0x0020); /* turn off the loop for now */ flag != reg_check(com+LCR,0x80,0x0008); /* set the baud rate divisor latch */
baudlo = inp(com+LSD);                  /* preserve the old baud rate */
baudhi = inp(com+MSD);

flag != reg_check(com+LSD,0xFF,0x0040); /* check out the divisor regs */
flag != reg_check(com+MSD,0xFF,0x0080);
flag != reg_check(com+LSD,0x0C,0x0040); /* set to 9600 baud */
flag != reg_check(com+MSD,0x00,0x0080);
flag != reg_check(com+LCR,0x1F,0x0008); /* set even parity, 8 data, 2 stop */
flag != reg_check(com+MCR,0x10,0x0020); /* set loop back */ outp(com+THR,0xA5);                     /* test for rx by sending a char */
sleep(2);                               /* this enables interrupts */
get_com_adr(comx);                      /* reset scratch on PCSS-8 & DI */
if ( ! (inp(com+LSR) & DR))             /* check for data ready */
    flag = 0x0100;
if (inp(com+RBR) != 0xA5)               /* compare the data */
    flag = 0x0200;
flag != reg_check(com+IER,0x00,0x0010); /* disable 8250 ints again */ inp(com+MSR);                           /* test the Modem control lines */
flag != reg_check(com+MCR,0x1F,0x0020);
if (inp(com+MSR) != 0xF0)
    flag = 0x0400;
flag != reg_check(com+MCR,0x10,0x0020);
if (inp(com+MSR) != 0x0F)
    flag = 0x0400;
if (inp(com+MSR) != 0x00)
    flag = 0x0400;

if (!flag)                              /* don't do timed loop if bad already */
{
    _bios_timeofday(_TIME_GETCLOCK,&tm1);  /* loop data through for a time */ for ( in=48 , out=48 ; in < 80 ; )
    {
        enable_i();                     /* enable interrupts */
        _bios_timeofday(_TIME_GETCLOCK,&tm2);  /* check the time */
        if (tm2 > (tm1 + 2))            /* allow enough time */
        {
            flag = 0x0800;
```

```
            break:
            }
        get_com_adr(comx);                      /* reset scratch on PCSS-8 & DI */
        if (out < 80)
            if (inp(com+LSR) & THRE)
                outp(com+THR,out++);
        if (inp(com+LSR) & DR)
            if (inp(com+RBR) != in++)
                flag = 0x0200;
        }
    } get_com_adr(comx);                          /* reset scratch on PCSS-8 & DI */
    flag |= reg_check(com+LCR,0x80,0x0008);     /* set all back as it was */
    flag |= reg_check(com+MSD,baudhi,0x0080);
    flag |= reg_check(com+LSD,baudlo,0x0040);
    flag |= reg_check(com+LCR,lcr,0x0008);
    flag |= reg_check(com+MCR,mcr,0x0020);
    flag |= reg_check(com+IER,ier,0x0010);
    enable_i();                                 /* return with interrupts enabled */ return flag;                                /* return flag */
    }

/*
    Use external wiring to loop back signals and data.  This routine
    tests that loop back capability.  Only DTR & CTS signals are tested.
    We expect to use interrupts to test the data coming back.
    Return an error code, 0 means it passed.

It is absolutely necessary to have called serial_init and
        serial_init_interrupt, prior to this test.  Enable Rx interrupts
        and prepare to run at a minimum of 9600 baud and 512 byte buffer.
    It is best to call 'test_port' prior to this test.
*/ loop_test_port(comx)
    int comx;
    {
    int c, i, mcr, flag, com, in, out;
    long tm1, tm2;

com = get_com_adr(comx);            /* translate to a port address & DI */ if (! com)
        {
        enable_i();
        return 0x0001;                  /* give up immediately on port 0 */
        } flag = FALSE;                       /* assume good until proven otherwise */ if (!flag)                          /* don't do timed loop if bad already */
        {
        s_clear(comx,0);                        /* clear the buffer & status */
        rx_status(comx);
        enable_i();                             /* enable interrupts */
        _bios_timeofday(_TIME_GETCLOCK,&tm1);   /* loop data through for a time */ for ( in=1 , out=1 ; in < 255 ; )
            {
            _bios_timeofday(_TIME_GETCLOCK,&tm2);  /* check the time */
            if (tm2 > (tm1 + 7))                   /* allow just enough time */
                {
                flag = 0x0800;
```

```
            break;
            }
        if (out < 256)
            if (spushc(comx,out))
                out++;
        if ( (c = spullc(comx)) != -1)
            if (c != in++)
                flag = 0x0200;
        }
    } flag |= rx_status(comx);        /* check for rx errors */
if (flag)
    flag |= 0x1000;             /* set special error code */
enable_i();                     /* return with interrupts enabled */
return flag;                    /* invert & return flag */
}
```

TIMER.C

```
/*  Timer routines are located here.

(C) copyright 1988 Dynix, Inc.
        written by: J. Wayne Schneider
            date:   23 August 1988

*/ include "sp.h"
include "sp_data.h"
#include <conio.h>
#include <bios.h>

/*
    Timer_init resets the count in timer 2 of the 8253 so that a clock
    pulse is exactly 1/20th of a second instead of the goofy value used
    by PCs. We also initialize the system clock to 0 so we never have
    to worry about running over midnight. At the end of the session,
    we fix the clocks back to normal.

*/ void timer_init()
    {
    long t = 0;
    _bios_timeofday(_TIME_GETCLOCK,&day_time);
    outp(0x40,0x0B);                        /* set divisor to 59659 */
    outp(0x40,0xE9);
    _bios_timeofday(_TIME_SETCLOCK,&t);     /* reset rtc to zero */
    }

/*
    Timer_undo fixes up what happened in timer_init to return the clock
    to normal.

*/ timer_undo()
    {
    long t;
    _bios_timeofday(_TIME_GETCLOCK,&t);
    outp(0x40,0);       /* reset count to 65536 */
    outp(0x40,0);
    day_time += (t * 1092) / 1200;      /* adjust the clock */
    _bios_timeofday(_TIME_SETCLOCK,&day_time);
    }
```

TRAFFIC.C

```c
/*****************************************************************
                    procedure TRAFFIC_PACKETS All data, between the slave tasks and the master, travels in packets.  The
packets are routed to the appropriate tasks by this task.

*****************************************************************/

/* #define DEBUG */ extern int const MASTER_PORT;

include "sp.h"
include "\rhobot\sp_data.h"
#include "sp_gdata.h"

#include <bios.h>
include <stdio.h>
include <malloc.h>

/*****************************************************************
                    packet structures & data
*****************************************************************/ struct s_chain
    {
    struct s_packet *head;
    struct s_packet *tail;
    };

struct s_chain rx_chain[32];            /* allocate 32 chain ptrs */
struct s_chain tx_chain;                /* and 1 tx chain ptr */

/*****************************************************************
                    procedure prototypes
*****************************************************************/ void do_rx_traffic(void);
void do_tx_traffic(void);
void add_packet(struct s_packet *, struct s_chain *);
struct s_packet *remove_packet(struct s_chain *);
struct s_packet *rx_packet(int);
void packet_answer(struct s_packet *,int);

/*****************************************************************
                    procedure TRAFFIC_PACKETS
*****************************************************************/ void traffic_packets()
    {
    for(ever=TRUE;ever;)                        /* do forever */
        {
        reschedule();                /* give everyone a chance to run */ if (_bios_keybrd(_KEYBRD_READY))   /* give up, when commanded */
            if ((char)_bios_keybrd(_KEYBRD_READ) == 0x1b)
                break;                          /* break from 'do' loop */ do_rx_traffic();                        /* receive data */
        do_tx_traffic();                        /* transmit data */
        }
    }
```

```
/************************************************************************* procedure DO_TX_TRAFFIC

If any task has a packet to transmit, we do our best to get it out as soon
as possible. We expect the longitudinal parity to already be calculated
and stored in the last position. It is included in the count.

*************************************************************************/ void do_tx_traffic()
    {
    static tx_check = 0;
    static int tx_length;
    static struct s_packet *tx;
    static char far *tx_ptr;

switch (tx_check)
        {
        case 0:                             /* look for a packet to send */
            {
            tx = remove_packet(&tx_chain);
            if (tx != NULL)
                tx_check = 1;               /* setup to send the packet */
            break;
            } case 1:                             /* send the TYPE code */
            {
            if (!spushc(MASTER_PORT, tx->packet[TYPE]))
                break;
#ifdef  DEBUG
            printf("TX %2x",tx->packet[TYPE]);
#endif
            tx_check = 2;
            break;
            } case 2:                             /* send the LENGTH */
            {
            if (!spushc(MASTER_PORT, tx->packet[LEN]))
                break;
#ifdef  DEBUG
            printf("%3x",tx->packet[LEN]);
#endif
            tx_check = 3;

tx_length = tx->packet[LEN];
            tx_ptr = &tx->packet[DEST];
            break;
            } case 3:                             /* send the bulk of the DATA */
            {
            if (!spushc(MASTER_PORT, *tx_ptr))
                break;
#ifdef  DEBUG
            printf("%3x",*tx_ptr);
endif tx_ptr++;
            --tx_length;
            if (tx_length)
                break;
#ifdef  DEBUG
            printf("\n");
#endif
```

```c
            rx_check = 0;
            if (tx->packet[TYPE] != SYN)
                _ffree(tx);              /* release acknowledge packets */
            }
        }
    }
```

```
/************************************************************************
                    procedure DO_RX_TRAFFIC If a character has been received, process it. It may be the start of a
packet, an ACK, a NAK, or a data part of one of these. Flags are kept
to tell us where we are at.

*************************************************************************/
```

```c
void do_rx_traffic()
    {
    static int rx_check = 0;
    static int rx_parity;
    static int rx_length;
    static struct s_packet *rx;
    static char far *rx_ptr;
    int c;

c = spullc(MASTER_PORT);         /* check for a character */
    if (c == EOF)
        return;
ifdef DEBUG printf("-%2x ",c);
endif
    switch (rx_check)
        {
        case 0:                      /* watch for first character */
            {
            switch (c)
                {
                case ACK:            /* collect any of these kind */
                case NAK:
                case CAN:
                case SYN:            /* start of a packet of data */
                    {
                    rx_parity = c;
                    rx_check = 3;
                    rx = _fmalloc(sizeof(S_PACK));
                    if (rx == NULL)
                        {
                        display(" fmalloc");
                        exit(1);
                        }
                    rx->packet[TYPE] = c;
                    rx_ptr = rx->packet + LEN;
                    break;
                    }
                default:             /* garbage character */
                    {
                    rx_check = 0;
                    rx_status(MASTER_PORT);   /* discard errors as well */
                    break;
                    }
```

```
                    }
                break;
                } case 3:                         /* handle a new packet - length */
                {
                *(rx_ptr++) = c;
                rx_length = c;
                rx_parity ^= c;
                rx_check = 4;
                break;
                } case 4:                         /* get the data for new packet */
                {
                *(rx_ptr++) = c;
                rx_parity ^= c;
                --rx_length;
                if (rx_length)
                    break;
                                            /* process the packet by type */
                rx_check = 0;
                if (rx->packet[TYPE] != SYN)
                    {
                    if (rx->packet[DEST] < number_of_ports)
                        tx_answer[rx->packet[DEST]] = rx->packet[TYPE];
                    _ffree(rx);
                    }
                else
                    {
                    if (rx_parity)
                        rx_parity = 0x20;   /* including error status */
                    rx->packet[STATUS] = rx_parity | rx_status(MASTER_PORT);

if (rx->packet[STATUS] == 0)    /* do we ACK or NAK or CAN ? */
                        if (rx->packet[DEST] < number_of_ports)
                            {
                            packet_answer(rx,ACK);
                            add_packet(rx,&rx_chain[rx->packet[DEST]]);
                            }
                        else
                            {
                            packet_answer(rx,CAN);
                            _ffree(rx);     /* ignore bad address packets */
                            }
                    else
                        {
                        packet_answer(rx,NAK);  /* request retransmission */
                        _ffree(rx);
                        }
                    }
                break;
                } default:                        /* rx_check default */
                {
                rx_check = 0;
                break;
                }
            }
        }
    }

/*************************************************************************
                    procedure ADD_PACKET Add a packet buffer to the chain of packets, updating head & tail pointers.
*************************************************************************/
```

```c
void add_packet(ax, chain)
    struct s_packet *ax;
    struct s_chain *chain;
    {
    ax->link = NULL;
    if (chain->tail == NULL)         /* if the list is empty */
        chain->head = ax;            /* adjust head ptr also */
    else
        chain->tail->link = ax;      /* always add on end of chain */
    chain->tail = ax;                /* always set tail to point at new one */

}

/************************************************************************
                    procedure REMOVE_PACKET Remove a packet buffer from the chain of packets, updating head & tail
pointers.  Return a pointer to the packet, or NULL if there is none.
************************************************************************/ struct s_packet *remove_packet(chain)
    struct s_chain *chain;
    {
    struct s_packet *mx;

if (chain->head == NULL)         /* if the list is empty */
        return NULL;                 /* return NULL */ if ((*chain->head).link == NULL) /* if this is the last item in chain */
        chain->tail = NULL;          /* set tail to NULL */ mx = chain->head;                /* Get ptr to packet */
    chain->head = mx->link;          /* Unlink the packet */
    return mx;                       /* Return the packet */
    }

/************************************************************************
                    procedure RX_PACKET Receive a packet if there is one.  It returns a NULL if there is no
packet, or a ptr to a packet.
************************************************************************/ struct s_packet *rx_packet(task_id)
    int task_id;
    {
    return remove_packet(&rx_chain[task_id]);
    }

/************************************************************************
                    procedure PACKET_ANSWER Remove a packet buffer from the chain of packets, updating head & tail
pointers.  Return a pointer to the packet, or NULL if there is none.
************************************************************************/ void packet_answer(rx,answer)
    struct s_packet *rx;
    int answer;
    {
    struct s_packet *ax;

ax = _fmalloc(sizeof(S_PACK));   /* get space for answer */
    if (ax == NULL)
        {
```

```
        display("_fmalloc");
        exit(1);
        }
    ax->packet[TYPE] = answer;
    ax->packet[LEN] = 2;
    ax->packet[DEST] = rx->packet[SRC];
    ax->packet[SRC] = rx->packet[DEST];
    add_packet(ax,&tx_chain);
    }

/************************************************************************
                      procedure TX_PACKET Build and transmit a packet.  We must wait for an answer before continuing.
We can get back ACK, NAK, CAN, or timeout.
*************************************************************************/ int tx_packet(dest,task_id,cmd,len,data)
    int dest,task_id,cmd,len;
    char *data;
    {
    struct s_packet *tx;
    int parity, i;
    long tm,new_tm;

tx = _fmalloc(sizeof(S_PACK));
    if (tx == NULL)
        {
        display("_fmalloc");
        exit(1);
        } if ( (len+4) > PACKET_BUFFER_SIZE )
        return CAN;
    tx->packet[TYPE] = SYN;          /* build up the packet */
    tx->packet[LEN] = len + 4;
    tx->packet[DEST] = dest;
    tx->packet[SRC] = task_id;
    tx->packet[CMD] = cmd;
    parity = SYN ^ (len + 4) ^ dest ^ task_id ^ cmd;
    for (i=0;i<len;i++)
        {
        tx->packet[DATA+i] = data[i];
        parity ^= data[i];
        }
    tx->packet[DATA+i] = parity;

for (i=0;i<8;i++)                /* try to transmit 8 times at most */
        {
        tx_answer[task_id] = 0;
        add_packet(tx,&tx_chain);     /* hand it off for transmission */

_bios_timeofday(_TIME_GETCLOCK,&tm); /* watch the clock while we wait */
        do {
            reschedule();
            if (tx_answer[task_id])
                break;
            _bios_timeofday(_TIME_GETCLOCK,&new_tm);
            } while ( (tm + 200) > new_tm );

switch(tx_answer[task_id])
            {
            case ACK:  return ACK; /* good transmit */
            case NAK:  break;      /* retry */
            case CAN:  return CAN; /* give up */
            default:   return -1;  /* retry on timeout */
            }
        }
    }
```

TRANS_IT.C

```c
/* Trans_init is used to read the data file called "SP.DAT" and
   initialize some system parameters. If the file is not found,
   the parameters are set to a default.

*/ include "sp.h"
include "sp_data.h"
include <stdio.h> void trans_init(trans,global)
    struct t_str *trans;
    struct g_str *global;
    {
    FILE *stream;
    char buff[100];

trans->rate = 100;       /* one every 5 seconds = 12 per minute */
    trans->abort = FALSE;    /* don't start by quitting (not in file)*/
    trans->loop_count = 0;   /* unlimited transactions */
    global->think = 40;      /* think time is 2 seconds */
    global->timeout = 600;   /* don't timeout for 30 seconds */
    global->throttle = 5;    /* assume 50 wpm typing rate */ stream = fopen("SP.DAT","r");
    if (stream == NULL)
        goto give_up;

if (fgets(buff,100,stream) == NULL)
        goto give_up;
    trans->rate = atoi(buff);
    if (fgets(buff,100,stream) == NULL)
        goto give_up;
    trans->loop_count = atoi(buff);
    if (fgets(buff,100,stream) == NULL)
        goto give_up;
    global->think = atoi(buff);
    if (fgets(buff,100,stream) == NULL)
        goto give_up;
    global->timeout = atoi(buff);
    if (fgets(buff,100,stream) == NULL)
        goto give_up;
    global->throttle = atoi(buff);

give_up:
    fclose(stream);
    }
```

SERIAL.H

```c
/* Serial port definitions (C) copyright 1988 Dynix, Inc.
        written by: J. Wayne Schneider
            date:   2 September 1988

*/ define RX_BUFFER_SIZE  2048 define THR 0
define RBR 0
#define IER 1
#define IIR 2
```

```
#define LCR 3
#define MCR 4
#define LSR 5
#define MSR 6
#define SCR 7
#define LSD 0
define MSD 1 define ERDAI  0x01       /* enable receive data available interrupt */ define _8_DATA 0x03      /* 8 data bits */ define DTR    0x01       /* data terminal ready */
define RTS    0x02       /* request to send */
define OUT2   0x08       /* ibm master interrupt enable */ define DR   0x01
define BI   0x10
define THRE 0x20 define IGNORE_NULL 0x01  /* buffer control register values */ void com_break(int,int);   /* (comx,mask)  mask=1 means set, 0=reset */
int rx_status(int);        /* (comx) returns LSR and buffer status */
int spullc(int);           /* (comx) returns char or -1 if none */
int spushc(int,char);      /* (comx,c) returns FALSE if failed */
int tx_status(int);        /* (comx) returns FALSE if not ready */
int s_clear(int,int);      /* (comx,flag) zeroes rx buffer. If (flag)
                                       then buffer must be empty 1st */
char far *s_buffer(int);   /* return rx buffer pointer */ void serial_init(int,unsigned,int,int,int,char far *,unsigned,int);
                /* args in order are:
                     comx - com port address
                     baud - baud rate desired
                     lcr  - line control register value
                     mcr  - modem control register value
                     ier  - interrupt enable register value
                     buff - FAR buffer pointer
                     size - buffer size in bytes
                     bcr  - buffer control register value */ void serial_init_interrupt(int,int);    /* (comx,mask) mask=0 enables int */

SP.H

/*
    sp.h contains definitions for general purpose things and functions (C) copyright 1988 Dynix, Inc.
        written by: J. Wayne Schneider
            date:   10 August 1988

*/ define FALSE  0
define TRUE   1

/* Function definitions help prevent programmer errors */ int tx_packet(int,int,int,int,char *);

struct s_packet *rx_packet(int);
```

```c
void slave(int);                    /* main task routine */ int test_port(int);

void reschedule(void);

void process(int, int);

void putvarg(int, unsigned char, char [10][80], char *[]);

int report(int, int);

void check_point(int, int, long, long);

int getvar(char [10][80]);

unsigned char *get_script(unsigned char *, long *, char *[]);

void sputc(int, int);

void sputs(int, char *);

char sgetc(int);

char *m_circ(char *);

void sflush(int);

void clear_input_window(int);

void monitor(int);

void do_script(int, char *, long, char *[], char *, struct t_str *);

void sleep(unsigned int);

void com_break(int, int);

int rx_status(int);

int spullc(int);

int spushc(int, char);

int tx_status(int);

int s_clear(int, int);

char far *s_buffer(int);

int wait_for_operator(void);

void timer_init(void);

void trans_init(struct t_str *, struct g_str *);

int do_exit(int);

int rand_norm(int, int);

int rx_error(int);

void check_out(void);               /* do_script calls to see if done */
```

SP_DATA.H

```
/* Global data declarations for SP.C (C) copyright 1988 Dynix, Inc.
    written by: J. Wayne Schneider
        date:   29 July 1988

*/ extern int performance_check[060];

extern int monitor_port[060];

define m_buff_size 2048 extern char m_buff[m_buff_size];
extern int m_buff_cnt;
extern char *m_buff_in, *m_buff_out;

extern long day_time;

extern char *op_id_msg[50];
extern char *process_id_msg[50];
extern char status_msg[4][15];

struct t_str (
    unsigned rate;
    int abort;
    unsigned loop_count;
    );

struct g_str (
    unsigned int think;
    unsigned int timeout;
    unsigned int throttle;
    );

extern struct g_str global;

extern unsigned stack_size;

extern char *signature;

#define PACKET_BUFFER_SIZE  260     /* packet + TYPE + LEN */

/* error status is here */
#define STATUS  0                   /* type of packet, usually SYN */
#define TYPE    1                   /* length of packet */
#define LEN     2                   /* destination task id */
#define DEST    3                   /* source task id */
#define SRC     4                   /* packet command */
#define CMD     5                   /* data for command */
define DATA    6 typedef struct s_packet
    ( struct s_packet *link;
    char packet[PACKET_BUFFER_SIZE];
    ) S_PACK;

#define ENQ 0x05                    /* who are you? */
#define ACK 0x06                    /* good packet */
#define NAK 0x15                    /* bad packet */
#define SYN 0x16                    /* sync start of packet */
```

```
#define CAN 0x18                    /* cancel a packet */
#define ESC 0x1B                    /* escape from program */
#define ITEST    'I'                /* internal port test */
#define ETEST    'E'                /* external loopback port test */
#define PASS     'P'                /* pass through to Wyse */
define PASS_BREAK 'B'              /* pass through a break */ define CR  0x0D
```

SF_GDATA.H

```
/*  SF global data definitions for use by SF routines (C) copyright 1988 Dynix, Inc.
        written by: J. Wayne Schneider
            date:   1 September 1988

*/ extern int good_port[32];

extern int *curtcb;

extern int number_of_ports;

extern struct s_tcb tcb[33];

extern char tx_answer[32];

extern int ever;
```

DISPLAY.ASM

```
;   To:   Dynix, Inc.
;   Attn: Wayne Schneider
;   From: Terry Bell  (415) 683-3710
;         Everex Systems, Inc
;   Ref:  LED Display listing
;
                        page        58,80
                        title       display 8 characters to front panel LED
                        .286c
;------------------------------------------------------------------------
;
;       Name:       Display.asm
;
;       03-07-88    CYL     1.00 -- file created
;------------------------------------------------------------------------
;
cseg                    segment     word        public       'code'
                        assume      cs:cseg, ds:dseg, ss:sseg
;------------------------------------------------------------------------
;
;               Equate Values
;------------------------------------------------------------------------
;
PmtPrt                  equ         080h                ;pointer to start of parameters
PmtLmt                  equ         040h                ;parameters limit
DisCmd                  equ         0b0h                ;display command for 8042
DisSize                 equ         008h                ;display message size
CmdPort                 equ         064h                ;8042 command port
DatPort                 equ         060h                ;8042 data port
StatPort                equ         064h                ;8042 status port
```

```
;-----------------------------------------------------------------
;       Display:        This program will output eight characters to the
;                       front panel display module. It will also ensure that
;                       the message is exactly eight characters and the 8042
;                       is properly functional. If not, error messages are
;                       displayed on screen.
;
;       Input:          Eight characters on command line enclosed by the
;                       character ' .
;       Output:         All registers restored
;-----------------------------------------------------------------
;
Display         proc    far
                push    ax                      ;save AX
                push    bx                      ;save BX
                push    dx                      ;save DX
                push    si                      ;save SI
                push    ds                      ;save DS
                mov     ax,seg dseg             ;set DS to data segment
                mov     ds,ax                   ;
                mov     dx,offset EvSign        ;get message address
                mov     ah,9                    ;
                int     21h                     ;print EVEREX's copyright message mov     si,PmtPrt               ;set pointer to parameter (psp)

cmp     byte ptr es:[si],00h   :check for valid parameter je      Disp1                   ;go if yes
                add     si,2                    ;set to parameter table
Disp5:          mov     al,es:[si]              ;check command line for ' character cmp     al,"'"                  :
                je      Disp4                   ;go if found
                cmp     al,0dh                  ;check for carriage return je      Disp6                   ;go if found
                inc     si                      ;
                cmp     si,PmtPrt+PmtLmt        ;max characters scan
                jb      Disp5                   ;
                jmp     short Disp6             ;print out usage message
Disp4:          mov     al,es:[si+DisSize+1]    ;check for end of message cmp     al,"'"                  ;
                jne     Disp2                   ;go if message not 8 characters long call    DispOut                 ;output characters to display module or      al,al                   ;check for 8042 error
                jnz     Disp3                   ;go if any error occured mov     dx,offset NoErr         ;get message address
                mov     ah,9                    ;
                int     21h                     ;no error message
                jmp     short DispExit          ;exit routine
Disp1:          mov     dx,offset UseMsg        ;get message address in DX
                mov     ah,9                    ;DOS print string function int     21h                     ;
                jmp     short DispExit          ;exit routine
Disp2:          mov     dx,offset MEErr         ;get message address in dx mov     ah,9                    ;DOS print string function int     21h                     ;
                jmp     short DispExit          ;exit routine
```

```
Disp3:          mov         dx,offset Err8042;get message address in DX
                mov         ah,9                    ;DOS print string function int         21h                     ;
                jmp         short DispExit          ;exit routine
Disp6:          mov         dx,offset MErr          ;get message address in DX mov         ah,9                    ;DOS print string function int         21h                     ; DispExit:
                pop         ds                      ;restore DS
                pop         si                      ;restore SI
                pop         dx                      ;restore DX
                pop         bx                      ;restore BX
                pop         ax                      ;restore AX
                mov         ax,4c00h                ;
                int         21h                     ;exit through DOS Display endp
;----------------------------------------------------------------
;
;       DispOut:    This routine will output eight characters to the
;                   display module.
;
;       Input:      SI register containing offset address of message
;                   ES register containing segment address of message
;       Output:     AL=0 - No errors
;                   AL=2 - 8042 error occured
;----------------------------------------------------------------
;
DispOut         proc        near
                push        bx                      ;save BX
                pushf                               ;save present flag status cli                                 ;ensure no interrupt
                mov         bx,1                    ;set BX count to one call        Empty8042               ;wait for 8042 not busy jnz         DispOutExit             ;go if 8042 error
                mov         al,DisCmd               ;display message command to 8042 out         CmdPort,al              ;send display command jmp         $+2                     ;i/o delay
DispOut1:
                call        Empty8042               ;wait for 8042 not busy jnz         DispOutExit             ;go if 8042 error
                mov         al,es:[bx+si]           ;get character
                out         DatPort,al              ;send to display through 8042 jmp         $+2                     ;i/o delay
                inc         bx                      ;point to next character cmp         bx,DisSize+1            ;check for end of message jb          DispOut1                ;continue til done
                xor         al,al                   ;clear error code
DispOutExit:    popf                                ;restore flag status pop         bx                      ;restore BX
                ret                                 ;return to caller
DispOut         endp
;----------------------------------------------------------------
;
;       Empty8042:      This routine waits for the 8042 input buffer
;                       to empty
```

```
;       Input:                  Nothing
;       Output:                 AL=0 - 8042 input buffer empty
;                               AL=2 - time out, 8042 input buffer full
;---------------------------------------------------------------------
;
Empty8042       proc    near
                push    cx                      ;save CX
                xor     cx,cx                   ;maximum wait time
EmptyLoop:      in      al,StatPort             ;read 8042 status port
                jmp     $+2                     ;i/o delay
                and     al,00000010b            ;check for command port full loopnz  EmptyLoop               ;continue til empty or timeout pop     cx                      ;restore CX
                ret                             ;return to callerEmpty8042
                endp
;---------------------------------------------------------------------
;
cseg            ends
;---------------------------------------------------------------------
;
;               Data Segment:           Program Messages
;---------------------------------------------------------------------
;
dseg            segment
EvSign          db      "EVEREX SYSTEMS, Inc.  System Utility V1.0.",10,13
                db      "(C) Copyright 1988.   All rights reserved.",10,13,10,13,"$"
UseMsg          db      "Usage : DISPLAY 'message'",10,13
                db      "        message : user defined message "
                db      "(must be exactly 8 characters)",10,13,10,13,"$"
NoErr           db      "Message has been sent to display module -- errors: 0",10,13
                db      "$"
MErr            db      "Error: Message not found",10,13,"$"
MEErr           db      "Error: Message must be exactly 8 characters",10,13,"$"
Err8042         db      "Error: 8042 not responding",10,13,"$"
dseg            ends
;---------------------------------------------------------------------
;
;               Stack Segment:          General Programing Stack
;---------------------------------------------------------------------
;
sseg            segment stack
                db      256 dup(0)
sseg            ends
;---------------------------------------------------------------------
;
                end     Display
```

DISPLAY.C

```
/* Display text on the Everex Step front panel leds.
   Data less than 8 bytes long will be padded with blanks.

(C) copyright 1988 Dynix, Inc.
        written by: J. Wayne Schneider
             date:  21 September 1988

*/ int display(buff)
    char buff[];
    {
    int i;
    int l;
```

```
    l = strlen(buff);                    /* set up for blank padding */ disable_i();                         /* issue display command to 8042 */
    while (inp(0x64) & 0x02)
        ;
    outp(0x64,0xb0);

for (i=0;i(8;i++)                    /* output display text */
        {
        while (inp(0x64) & 0x02)
            continue;
        if (i(l)
            outp(0x60,buff[i]);
        else
            outp(0x60,' ');              /* pad with blanks */
        }
    enable_i();
    }
```

INTERUPT.ASM

```
        TITLE   INTERRUPT_SPECIAL_FUNCTIONS

;       disable_i()
;       enable_i()

_TEXT   SEGMENT BYTE PUBLIC 'CODE'
_TEXT   ENDS
_DATA   SEGMENT WORD PUBLIC 'DATA'
_DATA   ENDS
CONST   SEGMENT WORD PUBLIC 'CONST'
CONST   ENDS
_BSS    SEGMENT WORD PUBLIC 'BSS'
_BSS    ENDS

DGROUP  GROUP   CONST, _BSS, _DATA
        ASSUME  CS: _TEXT, DS: DGROUP, SS: DGROUP, ES:DGROUP

_TEXT   SEGMENT

PUBLIC  _disable_i, _enable_i

_disable_i      PROC    NEAR
                CLI
                RET
_disable_i      ENDP
_enable_i       PROC    NEAR
                STI
                RET
_enable_i       ENDP

_TEXT   ENDS
        END
```

DO_SCRIP.C

```
/* Do a script file (C) copyright 1988 Dynix, Inc.
        written by: J. Wayne Schneider
            date:   10 August 1988

This routine will work with both SP and SP1 main programs.
    It processes the script file pointed to by 'script' on port 'comx'.
```

Start time arguments are pointed to by 'argv'.
The integer length of the script file is in 'length'.

*/ define PERFORMANCE_FENCE   5 include "sp.h"
include "sp_data.h"
include <string.h>
include <stdio.h>
include <bios.h>

```c
void do_script(comx,script,length,argv,input_window,trans)
    int comx;
    char *script;
    long length;
    char *argv[];
    char *input_window;
    struct t_str *trans;
{
int performance_count;
int t,t1;
unsigned int trans_iteration;
unsigned char c;
unsigned char *ip,*scrend,*tip;
long timer[10];
char var[10][80];
long loop_tm,tm,start_tm,trans_start_tm,trans_end_tm;

_bios_timeofday(_TIME_GETCLOCK,&start_tm);    /* init timer */

/*  srand((int)start_tm);  */
scrend = script + (int)length;

ip = script;
do {
    c = *(ip++);
    switch(c)
        {
        case  1:                                        /* PROCESS */
                    process(comx,*(ip++));
                    break;

case  2:                                        /* BREAK */
                    sleep(1);
                    com_break(comx,1);

sleep(1);
                    com_break(comx,0);
                    sleep(1);
                    break;

case  3:                                        /* SYNCHRONIZE */
                    wait_for_operator();
                    sleep(rand_norm(trans->rate,1));
                    break;

case  4:                                        /* CLEAR_INPUT_WINDOW */
                    rx_ready(comx);
                    clear_input_window(comx);
                    break;

case  5:                                        /* OUTPUT */
                    while ((c=*(ip++)) != NULL)
                        {
                        if (c < 128) sputc(comx,c);
                        else outvarg(comx,c,var,argv);
```

```
            }
            break;

case 6:                                         /* BEGIN_TIMED_LOOP */
            _bios_timeofday(_TIME_GETCLOCK,&loop_tm);
            performance_count=0;
            break;

case 7:                                         /* END_TIMED_LOOP */
            performance_count++;
            _bios_timeofday(_TIME_GETCLOCK,&tm);
            if (tm >= (loop_tm + global.timeout))
            {
                ip +=2;
                break;
            }
            ip = script + (int)*(int *)ip;
            reschedule();
            break;

case 8:                                         /* LOOK_FOR */
            tip = ip;
            while ((c=*(ip++)) != NULL);
            if(strstr(input_window,tip))
            {
                ip = script + (int)*(int *)ip;
                if (performance_count < PERFORMANCE_FENCE)
                    performance_check[comx]++;
            }
            else
                ip += 2;
            break;

case 9:                                         /* WAIT_FOR_IDLE */
            t = t1 = *(ip++);

sleep(1);       /* sync to clock tick */
            while (t1)
            {
                clear_input_window(comx);   /* clear to begin */
                sleep(1);
                if (rx_ready(comx))   /* check for errors or data */
                    t1 = t;
                else
                    t1--;
            }
            break;

case 10:                                        /* REPORT */
            trans->abort = report(comx,*(ip++));
            break;

case 11:                                        /* EXIT */
            trans->abort = do_exit(comx);
            break;

case 19:                                        /* BEGIN_TRANSACTION */
            trans_iteration = trans->loop_count;
            trans_start_tm = 0;
            trans_end_tm = trans->rate;
            break;
case 12:                                        /* repeat BEGIN_TRANSACTION */
            tm = trans_end_tm - trans_start_tm;
            t = trans->rate - (int)tm;
            if (t > 0)
                sleep((t / 2) + rand_norm(t,4));
            _bios_timeofday(_TIME_GETCLOCK,&trans_start_tm);
            break;
```

```
            case 13:                                        /* END_TRANSACTION */
                    _bios_timeofday(_TIME_GETCLOCK,&trans_end_tm);
                    check_point(comx,0,
                        (trans_end_tm - trans_start_tm),
                        trans_end_tm);
                    if (trans_iteration)
                        if (!(--trans_iteration))
                            {
                                ip += 2;
                                break;
                            }
                    ip = script + (int)*(int *)ip;
                    break;

case 14:                                        /* GET_DATA */
                    if(get_data(var) == EOF)
                        ip = script + (int)*(int *)ip;
                    else
                        ip += 2;
                    break;

case 15:                                        /* THINK_TIME */ if (global.think)
                        sleep(rand_norm(global.think,4) + (global.think / 2));
                    break;

case 16:                                        /* BEGIN_TIMER */
                    _bios_timeofday(_TIME_GETCLOCK,&timer[*ip]);
                    ip++;
                    break;

case 17:                                        /* CHECK_POINT */
                    t1 = *(ip++);
                    t  = *(ip++);
                    _bios_timeofday(_TIME_GETCLOCK,&tm);
                    check_point(comx,t,tm - timer[t1],tm);
                    break;

case 18:                                        /* GOTO */
                    ip = script + (int)*(int *)ip;
                    break;

case 253:                                       /* DEFINE_PROCESS_ID */
            case 254:                                       /* DEFINE_OP_ID */
            case 255:                                       /* DEFINE_TRANS_TYPE */
                    while(*(ip++));
                    break;

default:    display("scrpt er");

} check_out();                    /* see if we must give up now */ if (ip >= scrend)
            trans->abort = TRUE;

} while (!trans->abort);
    } void outvarg(comx,c,var,argv)
    int comx;
    unsigned char c;
    char *argv[];
    char var[10][80];
```

```
{
switch (c) {
    case 131:   sputs(comx,argv[0]);break;
    case 141:   sputs(comx,var[1]);break;
    case 142:   sputs(comx,var[2]);break;
    case 143:   sputs(comx,var[3]);break;
    case 144:   sputs(comx,var[4]);break;
    case 145:   sputs(comx,var[5]);break;
    case 146:   sputs(comx,var[6]);break;
    case 147:   sputs(comx,var[7]);break;
    case 148:   sputs(comx,var[8]);break;
    case 149:   sputs(comx,var[9]);break;
    default:    sputs(comx,"NOMATCH");
    }
}

GET_SCR.C

/*  Read in the script file and generate pointers to the text (C) copyright 1988 Dynix, Inc.
        written by: J. Wayne Schneider
            date:   10 August 1988 argv - must point to the filename to open
script - is a pointer that we will set to the script file
op_id - is an array of pointers that we set to the 'define_op_ids'
op_id[0] - is a pointer that we set to the 'transaction type'
*/ include "sp.h"
include <stdio.h>
include <malloc.h> unsigned char *get_script(argv,length,op_id)
    unsigned char *argv;
    char *op_id[];
    long *length;
    {
    FILE *stream;
    int flag,numread;
    char tc[80];
    unsigned char *mp, *script;

strcpy(tc,argv);
    strcat(tc,".SCP");
    stream = fopen(tc,"rb");
    if (stream == NULL)
        {
        puts("Can't open the script file!");
        exit(2);
        }
    *length = filelength(fileno(stream));
    if ((*length == -1L) || (*length > 32767L))
        {
        puts("File size out of range!");
        exit(3);
        }
    script = malloc((int)(*length));
    if (script == NULL)
        {
        puts("Not enough memory for script!");
        exit(4);
        }
    numread = fread(script,1,(int)(*length),stream);
    if(numread != (int)(*length))
```

```
            {
            puts("Error reading script file!");
            exit(5);
            } mp = script;
        flag = TRUE;

do {
            switch (*mp)
                {
                case 253:                                   /* define process id */
                case 254:   mp++;                           /* define op id */
                            op_id[*mp] = mp + 1;
                            while (*(mp++));
                            break;

case 255:   mp++;                           /* transaction type */
                            op_id[0] = mp;
                            while (*(mp++));
                            break;

default:    flag = FALSE;
                }
            }
        while(flag);
        return script;
        }
```

IO.C

```
/*
        (C) copyright 1988 Dynix, Inc.
        written by: J. Wayne Schneider
        date:       28 July 1988

These are the I/O routines that call the assembly level routines.
*/ include <stdio.h> include "sp.h"
include "sp_data.h"
#include "sp_gdata.h"

/*
    This routine will return a 1 if data is available or 0 otherwise.
    It also logs errors if they have occurred on the serial port.
*/ int rx_ready(comx)
    int comx;
    {
    int i;
    i = rx_status(comx);
    if (i > 1)
        {
        char buff[9];
        sprintf(buff,"rx %2d %2x",comx-017,i);
        display(buff);
        }
    return i & 1;
    }

/*
    This routine will output a single character to a serial port, throttled
```

```
*/ void    sputc(comx,c)
    int comx;
    int c;
    {
    sleep(global.throttle);
    while(!spushc(comx,c))
        reschedule();
    }

/*
    This routine will output a string to the specified port, throttled
*/ void    sputs(comx,s)
    int comx;
    char *s;

{
    while (*s != '\0')
        sputc(comx,*(s++));
    }

/*
    Get a single character from the input port.  Wait until it comes.
*/ char    sgetc(comx)
    int comx;
    {
    int c;
    while ( (c = spullc(comx)) == -1)
        reschedule();
    return c;
    }

/*
    Increment the monitor buffer pointer in a circular fashion.
*/ char *m_circ(m)
    char *m;
    {
    m++;
    if (m )= (m_buff + m_buff_size))
        m = m_buff;
    return m;
    }

/*
    While there is room in the monitor buffer, get bytes from rx_buffer
    and transfer them to the monitor buffer.
*/ void    sflush(comx)
    int comx;
    {
    int c;

while (m_buff_cnt < m_buff_size)
        {
        if ( (c=spullc(comx)) == -1)
            break;
```

```
        *m_buff_in = (char) c;
        m_buff_in = m_circ(m_buff_in);
        m_buff_cnt++;
        }
    }

/*
    Clear the input window and send characters to monitor if needed.
    If that is done or not necessary, clear the rx buffer.
*/ void    clear_input_window(comx)
    int comx;
    {
    while (!s_clear(comx,monitor_port[comx]))
        {
        sflush(comx);           /* if s-clear failed, try flushing */
        }
    }

/*
    If we are being monitored, flush what we can and continue.
*/ void    monitor(comx)
    int comx;
    {
    if (monitor_port[comx])
        sflush(comx);
    }
```

MAKEDATA.C

```
/******

MakeData.c

Make session ID file
Make random timings data files for testing reduction stuff

Rholling Stone
K. Brook Richan
(C) 1988 Dynix, Inc.

******/ include "ses_file.h"
include <stdio.h>
#include <string.h>
#include <stdlib.h>

ReadInt(i)
int *i;
{
        char s[15];
        gets(s);
        *i = atoi(s);
}

MakeTime()
{
        char fname[14];
        FILE* f;
        TimingRec t;
        unsigned int i,nterm,nopid,nrec,wall;
```

```c
        printf("Making random timing data file\n");
        printf("Enter file name to create) ");
        gets(fname);
        if (fname[0]=='\0') return;
        f = fopen(fname,"wb");
        if (f == NULL) {printf("No can create file."); return;} printf("number of records to create) "); ReadInt(&nrec);
        printf("number of terminals) "); ReadInt(&nterm);
        printf("number of op ids) "); ReadInt(&nopid);

wall = 0;
        for (i=1; i<=nrec; i++) {
                t.termno = rand()%nterm;
                t.opid = rand()%nopid;
                t.stopwatch = (rand()%40)+5;
                wall += t.stopwatch+(rand()%5);
                t.wallticks = wall;
                fwrite(&t, sizeof(TimingRec), 1, f);
                if ((i%100)==0) printf(".");
        }
        fclose(f);
}

MakeSession()
{
        char fname[14];
        FILE* f;
        SessionID s;
        int j;

printf("Making session ID file\n");
        printf("Enter file name to create (session.ID)) ");
        gets(fname);
        if (fname[0]=='\0') strcpy(fname,"session.ID");
        f = fopen(fname,"wb");
        if (f == NULL) {printf("No can create file."); return;} strcpy(s.machinename,"Tandem VLX");
        strcpy(s.memorysize,"12MB");
        strcpy(s.disksize,"3 720MB");
        strcpy(s.databasesize,"200,000 titles; 500,000 holdings; 30,000 patrons");
        strcpy(s.date,"12 Sep 88");
        strcpy(s.time,"14:00");
        s.comment[0]='\0';
        printf("number of terminals used in session) "); ReadInt(&s.nterminals);
        printf("number of trans types in session) "); ReadInt(&s.ntranstype);
        for (j=0; j<s.nterminals; j++) s.termmap[j]=1;
        for (j=0; j<s.ntranstype; j++) {
                printf("file name of trans type %d) ",j); gets(s.filename[j]);
                printf(" expected trans rate) "); ReadInt(&s.transExpRate[j]);
        }
        fwrite(&s, sizeof(SessionID), 1, f);
        fclose(f);
} writeid(f,code,idval,s)
FILE *f;
int code,idval;
char *s;
{
        fputc(code,f);
        if (code != 255) fputc(idval,f);
        fputs(s,f); fputc('\0',f);
}

MakeScript()
```

```c
{
    char fname[14],s[50];
    FILE* f;
    int nopid,i;

printf("Making script file\n");
    printf("Enter file name to create> ");
    gets(fname);

if (fname[0]=='\0') return;
    f = fopen(fname,"wb");
    if (f == NULL) {printf("No can create file."); return;} printf("transaction description> "); gets(s);
    writeid(f,255,0,s);
    printf("how many op ids> "); ReadInt(&nopid);
    for (i=1; i<=nopid; i++) {
        printf("  op %d description> ",i);
        gets(s);
        writeid(f,254,i,s);
    } fclose(f);
} main()
{
    char cmd;

printf("Size of TimingRec = %d\n", sizeof(TimingRec));
    printf("Size of SessionID = %d\n\n", sizeof(SessionID));

cmd = ' ';
    while (cmd != 'Q') {
        printf("Make: s(essionID, t(iming file, a(ssembled script, q(uit) ");
        cmd = toupper(getche());
        printf("\n");
        if (cmd == 'S') MakeSession();
        else if (cmd == 'T') MakeTime();
        else if (cmd == 'A') MakeScript();
    }
}
```

MEM.C

```c
#include <malloc.h>
main(){
    int i,news;
    int sa,hp,sz;
    char *ns;

news = (_memavl()/32 - 2) & 0xFFFE;

for (i=0;i<=32;i++) {
        sa = stackavail();
        hp = _memavl();
        sz = _memmax();
        ns = _nmalloc(news);
        printf("%d stkavl %u memavl %u memmax %u newstk %x\n",i,sa,hp,sz,ns);
    }
}
```

OBEY.C

```
/***********************************************************************

Obey the Master commands and route data from COM1 to the slave tasks.

(C) copyright 1988 Dynix, Inc.
        written by: J. Wayne Schneider
            date:   21 September 1988

Once everything gets set up, this is where the slave processor spends
    a good deal of its time. This task responds to all data from the master.
    It also handles transmission of all packets to the master.

***********************************************************************/ include "sp.h"

/***********************************************************************
                    procedure prototypes
***********************************************************************/ int process_packet(void);

/***********************************************************************

OBEY the MASTER

Process data from the master and pass packets between tasks and master.

***********************************************************************/ obey_master()
    {
    int alive = TRUE;
    char far *packet;

do  { packet = rx_packet(MASTER_ID);    /* see if we received a packet yet */
        if (packet)
            {
            alive = process_packet(packet);
            _ffree(packet);
            }

} while (alive);
    }

/*********************************************************************** procedure PROCESS_PACKET

***********************************************************************/ int process_packet()
```

REDUCE.C

```
/*  REDUCE AN OP FILE FOR SYSTAT  */ include <stdio.h>
include <stdlib.h>
```

```c
#include "ses_file.h"

FILE *stream;
FILE *out;

main (argc,argv)
    int argc;
    char *argv[];
    {
    int n;
    TimingRec t;

if (argc <3)
        {
        puts("reduce in.fil out.fil");
        exit(1);
        } stream = fopen(argv[1],"rb");
    if (stream == NULL)
        {
        puts("can't open input file");
        exit(1);
        } out = fopen(argv[2],"w");

while (! feof(stream))
        {
        n = fread(&t,sizeof(t),1,stream);
        if (n != 1)
            break;
        fprintf(out,"%d,%d,%d,%d\n",t.termno,t.opid,t.stopwatch,t.wallticks);
        } fclose(stream);
    fclose(out);
    }
```

SLAVE.C

```
/***********************************************************************

Slave - this is the slave task that is started for each port.
            It must establish communication with the serial port and
            prepare to process a script on command. Contained herein
            are all of the reporting routines called by do_script.

(C) copyright 1988 Dynix, Inc.
        written by: J. Wayne Schneider
            date:   21 September 1988

***********************************************************************/

/* #define DEBUG */ include <malloc.h>
include <stdio.h> include "sp.h"
include "\rhobot\sp_data.h"
#include "sp_gdata.h"
#include "\rhobot\serial.h"
```

```
/*****************************************************************
                    procedure prototypes
*****************************************************************/ void prepare_port(int);
struct s_packet *wait_for_packet(int);
void do_command(int,struct s_packet *);

/*****************************************************************
                    SLAVE PROCEDURE
*****************************************************************/ void slave(task_id)
    int task_id;
    {
    struct s_packet *rx;

prepare_port(task_id);              /* prepare our com port */ for (;;)                            /* do forever */
        {
        rx = wait_for_packet(task_id);
#ifdef DEBUG
        printf("task %d doing packet\n",task_id);
#endif
        do_command(task_id,rx);
        }
    }

/***************************************************************** procedure DO_COMMAND

Do the command that is specified by the packet.

*****************************************************************/ void do_command(task_id,rx)
    int task_id;
    struct s_packet *rx;
    {
    int comx = task_id + 020;
    char buffer[10];

switch (rx->packet[CMD])            /* respond to the command */
        {
        case PASS:                      /* pass data through to host */
            {
            while (pass_thru(task_id,comx))
                reschedule();
            break;
            }
        case ITEST:                     /* do an internal port test */
            {
            rx->packet[DATA] |= 0x01;   /* say it is tested */
            if (test_port(comx))
                rx->packet[DATA] &= ~0x02;  /* not found */
            else
                rx->packet[DATA] |= 0x02;   /* found */
            tx_packet(rx->packet[SRC],task_id,ITEST,2,&(rx->packet[DATA]));
            break;
            }
        case ETEST:                     /* do an external port test */
            {
            rx->packet[DATA] |= 0x04;   /* say it is tested */
            if (loop_test_port(comx))
                rx->packet[DATA] &= ~0x08;
```

```
                    else
                        rx->packet[DATA] != 0x08;
                    tx_packet(rx->packet[SRC].task_id,ETEST,2,&(rx->packet[DATA]));
                    break;
                    }
            case ESC:                           /* quit this program entirely */
                    {
                    ever = FALSE;
                    break;
                    }
            case ENQ:                           /* identify ourselves to master */
                    {
                    buffer[0] = number_of_ports;
                    strncpy(&buffer[1],signature,9);
                    tx_packet(rx->packet[SRC],task_id,ENQ,10,buffer);
                    break;
                    }
            default:
                    break;
            }
                                                /* release packet memory */
        _ffree(rx);
        }

/**************************************************************** procedure WAIT_FOR_PACKET

Very simply, wait for the flag that says we have something in our
packet buffer.

****************************************************************/ struct s_packet *wait_for_packet(task_id)
    int task_id;
    {
    struct s_packet *rx;

while ( (rx = rx_packet(task_id)) == NULL)
        reschedule();
    return rx;

}

/**************************************************************** procedure PREPARE_PORT

Test the com port to make sure it is functioning.
Allocate the receive buffer and program the uart.

****************************************************************/ void prepare_port(task_id)
    int task_id;
    {
    int i;
    char far *rx_buffer;
    int comx = task_id + 020;

for (i=0; i<8 ;i++)                         /* try several times to test port */
        if (test_port(comx))
            reschedule();
        else
            {
            good_port[task_id] = TRUE;
            break;
            }
```

```
    rx_buffer=_fmalloc(RX_BUFFER_SIZE);   /* allocate rx buffer */
    if (rx_buffer == NULL)
        {
        display("malloc");
        exit(1);
        }
    serial_init(comx,                     /* configure com port */
            9600,
            _8_DATA,
            DTR;RTS;OUT2,
            ERDAI,
            rx_buffer,RX_BUFFER_SIZE,IGNORE_NULL);

serial_init_interrupt(comx,0);
    }

/*  Terminal routines here replace communication to master */ void process(comx,numb)
    int comx, numb;
    {
    comx -= 020;
    } int report(comx,numb)
    int comx, numb;
    {
    char c;

comx -= 020;
    if(numb == 2)
        {
        c = 'A';    /*  toupper((char) _bios_keybrd(_KEYBRD_READ));   */
        if (c == 'A')
            {
            return TRUE;
            }
        }
    return FALSE;
    } void check_point(comx,op_id,op_time,wall_time)
    int comx, op_id;
    long op_time, wall_time;
    {
    int port;

port = comx - 020;

} int get_data(var)
    char var[10][80];
    {
    int i;
    char *back;

for (i=1;i<10;i++)
        {
        if (back == NULL) return EOF;
        if (strcmp(var[i],"END") == 0) return EOF;
        if (strcmp(var[i],"") == 0) break;
        }
```

```
    return NULL:
    } int wait_for_operator()
    {
    } int do_exit(comx)
    int comx;
    {
    comx -= 020;
    return TRUE;
    }

/*********        procedure pass_thru        *********/ pass_thru(task_id,comx)
    int task_id, comx;
    {
    int i, flag;
    char buffer[20];
    struct s_packet *rx;

i = rx_status(comx);                    /* check the host for data */
    if (i & DR)
        {
        for (i=0;i<20;i++)
            if ( (buffer[i] = spulc(comx)) == EOF )
                break;
        tx_packet(0,task_id,PASS,i,buffer);
        } if ( (rx = rx_packet(task_id)) != NULL)
        {
        flag = TRUE;
        switch (rx->packet[CMD])
            {
            case PASS:
                for(i=0;i<(rx->packet[LEN]-4;i++)
                    while(!spushc(comx,rx->packet[DATA+i]))
                        reschedule();
                break;
            case ~PASS:
                flag = FALSE;
                break;
            case PASS_BREAK:                /* pass a break to the host */
                sleep(1);
                com_break(comx,1);
                sleep(1);
                com_break(comx,0);
                sleep(1);

break;
            }
        _ffree(rx);
        return flag;
        }
    return TRUE;
    }

SLEEP.C

/* Sleep for "n" clock ticks.  Use sleep(1) to sync with the clock
   before beginning the actual timing.  A sleep(0) does nothing.
   We always enable interrupts to begin.

*/
```

```
#include (bios.h)

void sleep(n)
    unsigned int n;
    {
    long tm,new_tm;

enable_i();
        {
        _bios_timeofday(_TIME_GETCLOCK,&tm);
        do {
            reschedule();
            _bios_timeofday(_TIME_GETCLOCK,&new_tm);
            }
        while (new_tm ( (tm + n));
        }
    }
```

SF_DATA.C

```
/*      Global Data definitions for SF (C) copyright 1988 Dynix, Inc.
        written by: J. Wayne Schneider
        date:       29 July 1988

*/ include "\rhobot\sp_data.h"

int performance_check[060];

int monitor_port[060];

char m_buff[m_buff_size];
int m_buff_cnt = 0;
char *m_buff_in = m_buff;
char *m_buff_out = m_buff;

long day_time;

char *op_id_msg[50];
char *process_id_msg[50];
char status_msg[4][15] = (
                    ("Success"),
                    ("Failure"),
                    ("Timeout"),
                    ("End of data")
                    );

struct t_str trans;
struct g_str global = (                 /* 2 second think time */
                    40, 1200, 4         /* 1 minute time out */
                    );                  /* 50 wpm type rate */ unsigned stack_size;

char *signature = "\0";                 /* front panel display */
```

SF_GDATA.C

```
/* SF global data declarations (C) copyright 1988 Dynix, Inc.
        written by: J. Wayne Schneider
```

```
            date:  1 September 1988

*/ include <stdio.h> include "task.h"
include "sp_gdata.h"

int good_port[32];

int *curtcb;

FILE *ses_file;
FILE *err_file;

int number_of_ports = 32;

struct s_tcb tcb[33];

char tx_answer[32];

int ever;

SP_SETUP.C

/*  Serial Port Setup must look for all 33 ports;  initialize all
    33 ports, and allocate the buffers for all 33 ports.  We do our
    best to validate the functionality of the ports.  Any port that
    fails, will be ignored later. (Except COM1.  If it fails, we
    beep the beeper in desperation.)

(C) copyright 1988 Dynix, Inc.
        written by: J. Wayne Schneider
            date:  1 September 1988

*/ include "sp.h"
include "sp_gdata.h"
#include "serial.h"
#include <bios.h>

/*
    Make a cheerful tune on the beeper
*/
chirrup_tune()
    {
    sleep(1);
    utspkr(600);
    sleep(2);
    utspkr(800);
    sleep(2);
    utspkr(900);
    sleep(2);
    utspkr(0);
    }

/*
    Make a sad tune on the beeper to indicate failure
*/
sad_tune()
    {
    utspkr(200);
    sleep(10);
```

```
utspkr(100);
sleep(10);
utspkr(0);
} void serial_port_setup(n)
    int n;
    {
    int i;

for ( i = 0 ; i < 020+n ; i++ )
        {
        good_port[i] = test_port(i);
        } if (good_port[1])
        chirrup_tune();
    else
        sad_tune();

}
```

APPENDIX D

Title: Task Scheduler and Serial Driver
 Code Modules: TASK.ASM and SERIAL.ASM

TASK.ASM

```
        TITLE   TASK_SCHEDULER for MSC
        .286
        .MODEL  COMPACT
;
;       (C) copyright 1988 Dynix, Inc.
;
;       date:           June 30, 1988
;       written by:     J. Wayne Schneider
;

EXTRN   STKHQQ:WORD
        EXTRN   _curtcb:DWORD next    EQU     0               ;tcb array indexes
nexts   equ     2
spsave  EQU     4
sssave  EQU     6
slsave  EQU     8
status  EQU     10

.DATA
temp    dw      ?               ;temporary storage

.CODE

PUBLIC  _first_task, _create_task, _reschedule
;
;       FIRST_TASK(tcb_array_ptr)
;
;       This routine must be called by the main routine to create a
;       TCB for the main routine. Nothing else works until this has
;       been executed.
```

```
;
;       The tcb pointer is an array of four pointers (words).
;
_FIRST_TASK     PROC    NEAR push    bp
        mov     bp,sp mov     dx,SEG _curtcb
        mov     es,dx
        mov     ax,word ptr es:_curtcb      ;Don't allow it to happen twice
        or      ax,word ptr es:_curtcb +2
        jnz     ftdone mov     dx,[bp+6]
        mov     bx,[bp+4]                   ;Get the tcb pointer
        mov     word ptr es:_curtcb   ,bx   ;And initilize
        mov     word ptr es:_curtcb +2,dx
        mov     es,dx
        mov     ax,stkhqq
        mov     es:slsave[bx],ax
        mov     es:next[bx],bx              ;Link to self
        mov     es:nexts[bx],dx
        mov     es:sssave[bx],ss
        mov     word ptr es:status[bx],0 ftdone: mov     sp,bp
        pop     bp
        ret

_FIRST_TASK     ENDP

;
;       CREATE_TASK(tcb_array_ptr, stack_ptr, stack_size, function_ptr, task_id)
;
;       Create a new task using a new tcb, stack, and the specified
;       function as the starting point.
;
;       The long stack pointer must be both segment and offset.
;       No arguments can be passed to the function.
;
;       The task_id is an integer used to identify the task to itself.
;
_CREATE_TASK    PROC    NEAR push    bp
        mov     bp,sp
        push    si
        push    di mov     dx,SEG _curtcb              ;Make sure first_task has run
        mov     es,dx
        mov     bx,word ptr es:_curtcb
        mov     dx,word ptr es:_curtcb +2
        mov     ax,bx
        or      ax,dx
        jz      ctdone mov     es,dx
        mov     ax,[bp+4]                   ;Get tcb pointer & link it in
        mov     cx,[bp+6]
        mov     si,es:next[bx]
        mov     di,es:nexts[bx]
        mov     es:next[bx],ax
        mov     es:nexts[bx],cx
        mov     bx,ax
        mov     es,cx
```

```
            mov     es:next[bx],si
            mov     es:nexts[bx],di mov     ax,ss                       ;Get stack pointers
            mov     es:sssave[bx],ax
            mov     cx,[bp+8]
            mov     es:slsave[bx],cx
            mov     word ptr es:status[bx],0    ;Clear the status mov     dx,ss                       ;Save our own SS,SP mov     di,sp mov     si,[bp+14]                  ;Get the task_id number
            mov     temp,si
            mov     si,[bp+12]                  ;Get function address
            add     cx,[bp+10]                  ;set sp at end of area
            mov     ss,ax
            mov     sp,cx push    temp                        ;Pass his task_id
            push    offset TASK_EXIT            ;Load his stack
            push    si
            push    cx
            mov     es:spsave[bx],sp            ;Set his stack pointer
            mov     ss,dx                       ;Restore our stack pointer
            mov     sp,di ctdone:     pop     di
            pop     si
            mov     sp,bp
            pop     bp
            ret

_CREATE_TASK    ENDP

;
;   TASK_EXIT is called whenever any task except main, executes off
;       the end of the code, meaning, it does a RET.
;   When that occurs, we remove them from the tcb chain.
;
TASK_EXIT   PROC    NEAR mov     dx,SEG _curtcb              ;Get current TCB ptr
            mov     es,dx
            mov     bx,word ptr es:_curtcb
            mov     ax,bx
            mov     dx,word ptr es:_curtcb+2
            mov     cx,dx
            mov     es,dx                       ;Get link from TCB that's done
            mov     si,es:next[bx]
            mov     di,es:nexts[bx]
            mov     word ptr es:status[bx],80h  ;Flag it as done te1:        mov     dx,es:nexts[bx]             ;Get next usr TCB ptr
            mov     bx,es:next[bx]
            mov     es,dx
            cmp     ax,es:next[bx]              ; and see if we match it
            jne     te1
            cmp     cx,es:nexts[bx]
            jne     te1 te2:        mov     es:next[bx],si              ;Store the new link
            mov     es:nexts[bx],di
            jmp     short next_usr
TASK_EXIT   ENDP
```

```
;       RESCHEDULE()
;
;       This routine is called any time a task reschedule is desired.
;       It should most likely be called any time a task finds itself
;       waiting for any reason.  This buddy system of task scheduling
;       works well if all tasks comply.
;
_RESCHEDULE     PROC    NEAR push    bp
        mov     bp,sp mov     dx,SEG _curtcb
        mov     es,dx
        mov     bx,word ptr es:_curtcb
        mov     dx,word ptr es:_curtcb +2
        mov     ax,bx
        or      ax,dx
        jz      rdone mov     es,dx
        mov     es:spsave[bx],bp                ;Save current user SP next_usr:                                       ;*** entry from TASK_EXIT mov     cx,es:nexts[bx]                 ;Get next usr TCB
        mov     ax,es:next[bx]
        mov     dx,SEG _curtcb
        mov     es,dx
        mov     word ptr es:_curtcb    ,ax      ;make him current
        mov     word ptr es:_curtcb +2,cx
        mov     es,cx
        mov     bx,ax
        mov     ax,es:slsave[bx]                ;Load his stack limit
        mov     stknoo,ax
        mov     bp,es:spsave[bx]                ; and his stack
        mov     ax,es:sssave[bx]
        mov     ss,ax rdone:  mov     sp,bp
        pop     bp
        ret

_RESCHEDULE     ENDP

_TEXT   ENDS
        END

SERIAL.ASM

TITLE   SERIAL_SERVICE
        .286
        .MODEL  COMPACT,C

;       (C) copyright 1988 Dynix Inc.
;
;       written by: J. Wayne Schneider
;       date:       12 July 1988
;
;       The routines contained in this module are for serial port I/O
;

include DOS_BIOS.INC
```

```
INTCNTL         equ     20h             ;interrupt control port
INTMASK         equ     21h             ;interrupt mask port
INT2CNTL        equ     0A0h
INT2MASK        equ     0A1h DR              equ     0               ;Data register
IER             equ     1               ;Interrupt enable register
IIR             equ     2               ;Interrupt identification register
LCR             equ     3               ;Line control register
MCR             equ     4               ;Modem control register
LSR             equ     5               ;Line status register
MSR             equ     6               ;Modem status register
SCR             equ     7               ;FCSS scratch register
LSD             equ     0               ;Least significant divisor
MSD             equ     1               ;Most significant divisor
    THRE        equ     20h                 ;Transmit Holding Register Empty
    RDAI        equ     04h                 ;Rx data available interrupt IGNORE_NULL     equ     01h             ;Buffer control bits

.DATA baud_table      dw      57600,38400,28800,23040,19200,14400,12800,11520
                dw      9600,4800,2400,1200,600,300
baud_table_length equ   ($-baud_table)/2
divisor         dw      2,   3,   4,   5,   6,   8,   9,   10
                dw      12,  24,  48,  96, 192, 384 com_to_adr      dw      0000,3f8h,2f8h,3e8h,2e8h,2f0h,2e0h,3e0h
com_to_int      db      0,   4,   3,   5,   7,   9,   0,   0
int_to_com      db      0,   0,   5,   2,   1,   3,   0,   4,   0,   5 buff_table      dd      40 dup (0)
vect_save       dd      10 dup (0)      ;Storage for vectors 0-9
vect_new        dd      0               ;Vectors for int 0-9
                dd      0
                dd      FAR PTR ser_int2
                dd      FAR PTR ser_int3
                dd      FAR PTR ser_int4
                dd      FAR PTR ser_int5
                dd      0
                dd      FAR PTR ser_int7
                dd      0
                dd      FAR PTR ser_int9 buff_base       EQU     0               ;Displacements into a com buffer
buff_size       EQU     2
data_ptr        EQU     4
view_ptr        EQU     6
buff_status     EQU     8               ;This is one byte long
buff_control    EQU     9               ;Control byte
buff_header     EQU     10              ;Length of header

.CODE

;
;   com_break(comx,n)   Enables (n=1) or disables (n=0) break;
;
com_break   PROC    comx:WORD, n:WORD
            push    comx                ;Get the port address
            call    get_com_adr
            add     sp,2
            add     dx,LCR
            in      al,dx
            and     al,3Fh
            cmp     n,0
            je      @F
```

```
                or      al,40h
@@:             out     dx,al
                sti
                ret
com_break       ENDP ;
;   rx_status(comx)   Returns TRUE if a character is ready or errors.
;                     The TRUE value contains the status indicators.
;
rx_status   PROC    USES DI DS, comx:WORD
            mov     bx,comx                 ;Get the buffer address
            call    get_port_buff           ; into DI:DX
            mov     ax,data_ptr[di]
            cmp     ax,view_ptr[di]
            mov     ax,0
            je      @F
            mov     ax,1
@@:
            or      al,buff_status[di]
            mov     BYTE PTR buff_status[di],0   ;Clear the old status
            ret
rx_status   ENDP ;
;   spullc(comx)   Returns the next available character or 0xFFFF if none.
;
spullc      PROC    USES SI DI DS, comx:WORD
            mov     bx,comx                 ;Get the buffer address
            call    get_port_buff           ; into DI:DX
            mov     bx,view_ptr[di]
            cmp     bx,data_ptr[di]
            jne     @F
            mov     ax,0FFFFh               ;Return -1 if none
            ret
@@:
            mov     si,buff_base[di]
            mov     al,[bx+si]
            sub     ah,ah
            inc     bx
            cmp     bx,buff_size[di]
            jl      @F
            sub     bx,bx
@@:         mov     view_ptr[di],bx
            ret
spullc      ENDP ;
;   This routine will output a single character to the COM port.
;   If the port is not ready, 0(z) is returned, otherwise 1(nz).
;
spushc      PROC    USES DI DS,comx:WORD,char:WORD push    comx                    ;Get the uart address
            call    get_com_adr
            add     sp,2
            add     dx,LSR
            in      al,dx
            sub     ah,ah
            and     al,THRE
            jz      @F                      ;Return failure
            add     dx,DR-LSR
            mov     ax,char                 ;Output the character
            out     dx,al
            sub     ax,ax                   ;Return success
```

```
                inc     ax
@@:             sti
                ret spushc          ENDP ;
;   This routine will test the com port for output buffer ready.
;
tx_status       PROC    comx:WORD push    comx                    ;Get the uart address
                call    get_com_adr
                add     sp,2
                add     dx,LSR
                in      al,dx
                sti
                sub     ah,ah
                and     al,THRE
                ret tx_status       ENDP ;
;   This routine will clear the input buffer and reset the count.
;   If the flag is set, we must check for empty before clearing.
;       If it is not empty, we return FALSE
;   ELSE we return TRUE.
;
s_clear         PROC    USES DI DS ES, comx:WORD, flag:WORD mov     bx,comx                 ;Get the buffer stuff
                call    get_port_buff cli                             ;Disable interrupts thru this
                test    flag,0FFFFh             ;See if the flag is set
                jz      @F mov     ax,data_ptr[di]
                cmp     ax,view_ptr[di]
                je      @F
                sti                             ;Return false if not empty
                sub     ax,ax
                ret
@@:
                mov     cx,data_ptr[di]
                jcxz    @F                      ;Don't do a nothing
                mov     ax,0
                mov     data_ptr[di],ax         ;Clear the count
                mov     view_ptr[di],ax
                mov     di,buff_base[di]
                mov     bx,ds
                mov     es,bx
                rep     stosb @@:             sti
                sub     ax,ax
                inc     ax                      ;Return true
                ret s_clear         ENDP ;
;   This routine returns a far pointer in DX:AX to the ports buffer
;
s_buffer        PROC    USES DI DS, comx:WORD
```

```
                mov     bx,comx
                call    get_port_buff
                mov     dx,ds
                mov     ax,di
                ret s_buffer        ENDP ;
;   This routine sets the 8250 parameters only.
;
serial_init PROC    USES DI ES, comx:WORD,baud:WORD,line:WORD,modem:WORD,\
                    interrupt:WORD,buffer:PTR BYTE,b_size:WORD,control:WORD push    comx                ;Disable all interrupts for now
                call    get_com_adr
                add     sp,2
                add     dx,IER
                sub     al,al
                out     dx,al add     dx,LCR-IER          ;Set the baud rate first
                mov     al,80h
                out     dx,al
                mov     cx,baud_table_length
                lea     di, baud_table
                mov     ax,DGROUP
                mov     es,ax
                mov     ax,baud
                cld
                repne   scasw
                jnz     @F
                mov     ax,(baud_table_length - 1) * 2[di]
                add     dx,LSD-LCR
                out     dx,al
                add     dx,MSD-LSD
                mov     al,ah
                out     dx,al
                add     dx,LCR-MSD
@@:
                mov     ax,line             ;Set the word length, stop, etc.
                out     dx,al add     dx,MCR-LCR          ;Set DTR, RTS, OUT2, etc.
                mov     ax,modem
                out     dx,al add     dx,LSR-MCR          ;Clear pending interrupts
                in      al,dx
                add     dx,DR-LSR
                in      al,dx
                in      al,dx
                add     dx,MSR-DR
                in      al,dx add     dx,IER-MSR          ;Enable the proper interrupts
                mov     ax,interrupt
                out     dx,al
                add     dx,IIR-IER          ; and clear Tx int pending
                in      al,dx
                add     dx,SCR-IIR          ; and scratch latch
                in      al,dx
;dummy          jmp     short @F
@@:             and     al,07h
;dummy          jmp     short @F
@@:             out     dx,al
                sti                         ;Enable interrupts again
```

```
                mov     bx,comx              ;Initialize data size & pointers
                cmp     bx,7                 ;Convert for "c" to form "cu"
                jg      @F                   ; with "u" = 0
                shl     bx,3
@@:
                sub     bx,10q               ;Load ptrs to DI:ES
                shl     bx,2
                les     di,buffer
                mov     WORD PTR buff_table[bx],di    ; and then into the table
                mov     WORD PTR buff_table+2[bx],es mov     bx,buff_header       ;Buff begins just past the header
                add     bx,di
                mov     es:buff_base[di],bx
                mov     cx,D_SIZE
                sub     cx,buff_header       ; Make room for header
                dec     cx                   ;   and a null at the end
                mov     es:buff_size[di],cx
                mov     ax,control           ;   Store the control byte
                mov     es:buff_control[di],al
                xor     ax,ax                ;Clear the insert & remove pointers
                mov     es:data_ptr[di],ax
                mov     es:view_ptr[di],ax
                mov     es:buff_status[di],al mov     di,es:buff_base[di]  ;Now clear the whole buffer
                inc     cx
                rep     stosb
                ret
serial_init ENDP ;
;   This routine sets up the interrupt vector and interrupt mask
;   according to the com number passed: 1 = COM1 2 = com2, etc.
;   Com number can also be 10q for COM1, 20q for com2, etc.
;   The mask will enable interrupts if 0 and disable if 1
;   If the vector has already been saved, we don't save it again.
;   The flag returned is FALSE if the vector was not set when called.
;   The flag is returned TRUE if the vector was already set when called.
;
serial_init_interrupt   PROC    USES DS ES DI, comx:WORD, imask:WORD
                        LOCAL   flag:WORD mov     bx,comx              ;Using comx get the interrupt #
                cmp     bx,7                 ;Convert form "cu" to form "c"
                jle     @F
                shr     bx,3
@@:             and     bx,07h
                jnz     @F
                jmp     sii_4                ;Don't do com 0

@@:             mov     al,com_to_int[bx]    ;Get the storage pointer in DI
                cbw
                mov     di,ax
                shl     di,2 mov     dx,INTMASK           ;Select & setup each 8259
                add     ax,8
                cmp     ax,15                ;Adjust for 2nd set
                jle     @F
                add     ax,60h
                mov     dx,INT2MASK
@@:             push    dx test    imask,0FFFFh        ;If (mask == TRUE)
                jz      sii_1
```

```
                mov     dx,WORD PTR vect_save[di]   ;If (saved_vector != 0)
                mov     cx,WORD PTR vect_save+2[di]
                mov     bx,cx
                or      bx,dx
                mov     flag,bx         ;save flag
                jz      sii_3
                mov     ds,cx                       ;set the old vector back
                DOS     Set_Interrupt_Vector        ;DS:DX
                jmp     short sii_3 sii_1:          mov     dx,WORD PTR vect_save[di]   ;If (saved_vector == 0)
                mov     cx,WORD PTR vect_save+2[di]
                mov     bx,cx
                or      bx,dx
                mov     flag,bx         ;save flag
                jnz     sii_2

DOS     Get_Interrupt_Vector        ;Get the old vector ES:BX
                mov     WORD PTR vect_save[di],bx   ;and save it
                mov     bx,es
                mov     WORD PTR vect_save+2[di],bx sii_2:          mov     dx,WORD PTR vect_new[di]    ;Get the new vector
                mov     cx,WORD PTR vect_new+2[di]
                mov     ds,cx
                DOS     Set_Interrupt_Vector        ;DS:DX sii_3:          and     ax,07h          ;Get int number back for mask
                mov     cx,ax           ;Enable interrupts through 8259A
                mov     ax,imask
                mov     ah,01h
                shl     ax,cl
                not     ah
                mov     bl,al           ;Save the mask and set the chip pop     dx
                in      al,dx
                and     al,ah
                or      al,bl
                out     dx,al
                mov     ax,flag         ;Return flag value
sii_4:          ret
serial_init_interrupt   ENDP ;
;**************   The following routines are NOT callable by C
;

;
;   get_port_buff   Returns in DI:DS the address of the ports buffer
;                   It expects the com/uart number in BX
;
get_port_buff   PROC    NEAR USES BX cmp     bx,7                        ;Convert for "c" to form "cu"
                jg      @F                          ; with "u" = 0
                shl     bx,3
@@:
                sub     bx,10q                      ;Load ptrs to our buffer
                shl     bx,2
                lds     di,buff_table[bx]
                ret get_port_buff   ENDP
```

```
;
;   get_com_adr     Returns in DX & AX the address of COMn
;                   It expects the "n" in COMX
;                   "n" must be of form "c" or "cu"
;                   where c is com number and u is uart number
;
get_com_adr     PROC    comx:WORD mov     bx,comx
                cmp     bx,7                    ;Convert for "c" to form "cu"
                je      gcp1                    ; with "u" = 0
                shl     bx,3
gcp1:           push    bx
                shr     bx,2                    ;Get the COM port address
                and     bx,000Eh                ;index into the table
                mov     dx,com_to_adr[bx]
                pop     ax                      ;Now set the scratch register
                jz      short gcp2              ;Return zero if failed
                and     ax,7
                add     dx,SCR
                cli                             ;DISABLE INTERRUPTs so they don't
                out     dx,al                   ; cause conflicts with scratch reg
;dummy          jmp     short @F                ; The caller must enable interrupts
@@:             add     dx,DR-SCR
                jmp     short gcp2
gcp2:           mov     ax,dx
                ret get_com_adr     ENDP ;
;************** serial interrupt service routines
;

ser_int2        PROC    FAR                     ;IRQ 2 service for COM 5
                pusha                           ;Save all of the registers
                mov     bx,2                    ;Identify ourselves
                call    ser_int                 ;Service the interrupt
                popa                            ;Restore everybody
                iret                            ;And give up the ghost
ser_int2        ENDP ser_int3        PROC    FAR                     ;IRQ 3 service for COM 2
                pusha
                mov     bx,3
                call    ser_int
                popa
                iret
ser_int3        ENDP ser_int4        PROC    FAR                     ;IRQ 4 service for COM 1
                pusha
                mov     bx,4
                call    ser_int
                popa
                iret
ser_int4        ENDP ser_int5        PROC    FAR                     ;IRQ 5 service for COM 3
                pusha
                mov     bx,5
                call    ser_int
                popa
                iret
ser_int5        ENDP
```

```
ser_int7     PROC    FAR             ;IRQ 7 service for COM 4
             pusha
             mov     bx,7
             call    ser_int
             popa
             iret
ser_int7     ENDP ser_int9     PROC    FAR             ;IRQ 9 service is special
             pusha
             mov     bx,9
             call    ser_int         ; returns w/ 20h in al
             out     INT2CNTL,al
             popa
             iret
ser_int9     ENDP ser_int      PROC    NEAR            ;All ports serial service push    ds              ;Preserve user's segment register
             mov     cx,@DATA
             mov     ds,cx mov     bl,int_to_com[bx]   ;Get the com number
             shl     bx,1                ;Get the com address
             mov     dx,com_to_adr[bx]
             shl     bx,2 add     dx,SCR              ;PCSS select 8250 thru scratch
             in      al,dx
             and     al,07h
             or      bl,al
             out     dx,al
;dummy       jmp     short @F
@@:          add     dx,IIR-SCR          ;Be sure it is rx int
             in      al,dx               ;This clears tx int
             test    al,RDAI             ;Handle rx &/or status int
             jnz     RDAS
             add     dx,MSR-IIR          ;Clear the modem status int
             in      al,dx
             jmp     srint5

RDAS:        add     dx,DR-IIR           ;Point at data register
;dummy       jmp     short @F
@@:          in      al,dx               ;get the character
             jmp     short @F            ;DUMMY
;@@:         mov     al,'U'              ;DUMMY
             out     dx,al               ;DUMMY for test
             mov     ah,al
             add     dx,LSR-DR           ; and the status
             in      al,dx
             and     al,1Eh sub     bx,10q              ;Load ptrs to our buffer
             shl     bx,2
             lds     di,buff_table[bx]
             mov     bx,ds               ;Check for valid buffer
             or      bx,di
             jz      srint5 or      ah,ah               ;Check for null
             jnz     srint1
             test    BYTE PTR buff_control[di],IGNORE_NULL
             jnz     srint4              ; and ignore if necessary
```

```
srint1:
        mov     bx,data_ptr[di]         ;get 'empty' pointer
        mov     si,buff_base[di]
        mov     [bx+si],ah              ;load character into buffer
        inc     bx                      ;increment pointer
        cmp     bx,buff_size[di]        ;end of buffer?
        jl      srint2
        sub     bx,bx
        or      al,40h                  ; and set wrap around flag
srint2: cmp     bx,view_ptr[di]
        je      srint3
        mov     data_ptr[di],bx         ; update pointer
        jmp     short srint4
srint3: or      al,80h                  ;Set the buffer overflow flag
srint4: or      buff_status[di],al      ; and save the status
srint5: mov     al,20h                  ;signal an end to interrupt
        out     intcntl,al
        pop     ds
        ret ser_int ENDP

_TEXT   ENDS
        END
```

APPENDIX E

Title: Summary Statistics
      Code Module: SS.C

SS.C

```
/****** ss.c

Calculate summary statistics for response times and pacings:
    provide mean and std.dev. by op id and by terminal
    output ASCII files for graphics packages Rholling Stone
K. Brook Richan
(C) 1988 Dynix, Inc.

******/ include "ses_file.h"
include "menuwind.h"
#include <stdio.h>
#include <math.h>
#include <memory.h>
#include <string.h>

/******* G L O B A L S *******/

SessionID session;

/* file name stuff */
char *ses_dflt = "*.ID";
char sesfname[80]; /* name of session file, minus the extension */

/* response time stats by op id */
#define MaxOpid 256
```

```c
unsigned short n_opid[MaxOpid];
unsigned long  sumx_opid[MaxOpid],sumx2_opid[MaxOpid];
unsigned short max_opid[MaxOpid],min_opid[MaxOpid];

/* duration stats by terminal */
unsigned short n_term[MaxTerminal];
unsigned long  sumx_term[MaxTerminal],sumx2_term[MaxTerminal];
unsigned short max_term[MaxTerminal],min_term[MaxTerminal];

/* transaction rate stats by terminal */
unsigned short last_wall[MaxTerminal];
unsigned long  sumx_tran[MaxTerminal],sumx2_tran[MaxTerminal];
unsigned short max_tran[MaxTerminal],min_tran[MaxTerminal];

/* descriptive strings */
#define DescBufsize 3000
unsigned char desc[DescBufsize]; /* buffer for script file header */
short descIdx[MaxOpid]; /* offset into 'desc' for each op id description */

/* User interface stuff */
MENU    mainM;
WINDOW  infoW;

/****** E N D   G L O B A L S ******/ int GetSession()
/* return 1 if successful */
{
    char fname[80],*from,*to;
    FILE* f;
    int i;

GetFileName("Name of Session file",ses_dflt,fname);
    if (fname[0]=='\0') {
        DialogMsg(" -- no file found or chosen");
        return(0);
    }

/* back up to end of path, if any */
    for (i=strlen(fname)-1;
         i)=0 && fname[i]!=':' && fname[i]!='\\';
         i--);
    /* copy file name (minus the extension) */
    from = fname+i+1;
    to = ses.fname;
    while ((*from!='\0') && (*from!='.')) *to++ = *from++;
    *to = '\0';

f = fopen(fname,"rb");
    if (f==NULL) { DialogMsg(" -- error opening session file"); return(0); }
    fread(&session,sizeof(SessionID),1,f);
    fclose(f);
    return(1);
}

FILE* MakeDetFile()
{
    char detname[20];
    FILE* f;

strcpy(detname,ses.fname);
    strcat(detname,".DET");
    WriteWindow(&infoW,4,0,WHITE|INTENSITY,"Details report file:");
    WriteWindow(&infoW,4,21,WHITE,detname);

f = fopen(detname,"w");
```

```c
    if (f==NULL) {
        DialogMsg(" -- error creating details print file");
        return(NULL);
    } fprintf(f,"Machine: %s\n",session.machinename);
    fprintf(f,"================================\n");
    fprintf(f,"Memory size:    %s\n",session.memorysize);
    fprintf(f,"Disk size:      %s\n",session.disksize);
    fprintf(f,"Data base size: %s\n",session.databasesize);
    fprintf(f,"Session date:   %s\n",session.date);

fprintf(f,"Session time:   %s\n",session.time);
    fprintf(f,"Comment: %s\n",session.comment);
    fprintf(f,"\n");
    fprintf(f,"  -----\n");
    fprintf(f,"  times are given in seconds\n");
    fprintf(f,"  -----\n");
    fprintf(f,"\n");
    return(f);
}

FILE* MakeSmyFile()
{
    char smyname[20];
    FILE* f;

strcpy(smyname,sesfname);
    strcat(smyname,".SMY");
    WriteWindow(&infoW,5,0,WHITE|INTENSITY,"Summary report file:");
    WriteWindow(&infoW,5,21,WHITE,smyname);

f = fopen(smyname,"w");
    if (f==NULL) {
        DialogMsg(" -- error creating summary print file");
        return(NULL);
    } fprintf(f,"Machine: %s\n",session.machinename);
    fprintf(f,"================================\n");
    fprintf(f,"Session date:   %s\n",session.date);
    fprintf(f,"Session time:   %s\n",session.time);
    fprintf(f,"Comment: %s\n",session.comment);
    fprintf(f,"\n");
    fprintf(f,"  -----\n");
    fprintf(f,"  times are given in seconds\n");
    fprintf(f,"  -----\n");
    fprintf(f,"\n");
    fprintf(f,"      Pacing          Throughput       Response time\n");
    fprintf(f,"Expected Actual  Expected Actual  Average Std Dev  Transaction\n");
    fprintf(f,"---------------  ---------------  ---------------  ---------------\n");
    return(f);
}

FILE* MakeSmydatFile()
{
    char smyname[20];
    FILE* f;

strcpy(smyname,sesfname);
    strcat(smyname,".DAT");
    WriteWindow(&infoW,4,40,WHITE|INTENSITY,"Summary ASCII file:");
    WriteWindow(&infoW,4,60,WHITE,smyname);

f = fopen(smyname,"w");
    if (f==NULL) {
        DialogMsg(" -- error creating summary ASCII file");
```

```c
        return(NULL);
    } fprintf(f,"tran,averesp,stddev\n"); /* column labels */
    return(f);
}

SetupFile(fnum,f_op,f_durdat,f_opdat)
int fnum;
FILE **f_op,**f_durdat,**f_opdat;
{
    char fname[20],sfname[20];
    FILE *f;
    int i,opid,dtype,row,col;

strcpy(fname,session.filename[fnum]);
    strcat(fname,".OP");
    row = 7+(fnum%10); col = (fnum/10)*40;
    WriteWindow(&infoW,row,col,WHITE,fname);

strcpy(sfname,session.filename[fnum]);
    strcat(sfname,".SCP");
    f = fopen(sfname,"rb");
    if (f==NULL) {
        DialogMsg(" -- error opening script file. Proceeding with no labels");
    }
    else {
        fread(desc,DescBufsize,1,f);
        fclose(f);
        /* set up indexes to op id description strings */
        i = 0;
        while (desc[i])252) {
            dtype = desc[i++];
            if      (dtype == 255) opid = 0;
            else if (dtype == 254) opid = desc[i++];
            else {opid = -1; i++;} /* ignore dtype == 253 */
            if (opid)=0) descIdx[opid] = i;
            i += strlen(&desc[i])+1;
        }
    }

*f_op = fopen(fname,"rb");
    strcpy(fname,session.filename[fnum]);
    strcat(fname,".DUR");
    WriteWindow(&infoW,row,col+13,WHITE,fname);
    *f_durdat = fopen(fname,"w");
    fprintf(*f_durdat,"term,dur,wall\n"); /* column labels */
    strcpy(fname,session.filename[fnum]);
    strcat(fname,".DAT");
    WriteWindow(&infoW,row,col+26,WHITE,fname);
    *f_opdat = fopen(fname,"w");
    fprintf(*f_opdat,"term,opid,stop,wall\n"); /* column labels */
}

InitCounts()

{
    memset(n_opid,     '\0',sizeof(n_opid));
    memset(sumx_opid,  '\0',sizeof(sumx_opid));
    memset(sumx2_opid,'\0',sizeof(sumx2_opid));
    memset(max_opid,   '\0',sizeof(max_opid));
    memset(min_opid,   '\xFF',sizeof(min_opid));

memset(n_term,     '\0',sizeof(n_term));
    memset(sumx_term ,'\0',sizeof(sumx_term));
    memset(sumx2_term,'\0',sizeof(sumx2_term));
    memset(max_term,   '\0',sizeof(max_term));
```

```
    memset(min_term,  '\xFF',sizeof(min_term));

memset(sumx_tran ,'\0',sizeof(sumx_tran));
    memset(sumx2_tran,'\0',sizeof(sumx2_tran));
    memset(max_tran,  '\0',sizeof(max_tran));
    memset(min_tran,  '\xFF',sizeof(min_tran));

memset(descIdx   ,'\0',sizeof(descIdx));
}

Summarize(f_op,f_durdat,f_opdat)
FILE *f_op;
FILE *f_durdat;
FILE *f_opdat;
{
    TimingRec t;
    short    new_wall;
    long     tran_time;

fread(&t,sizeof(TimingRec),1,f_op);
    while (!feof(f_op)) {
        n_opid[t.opid]++;
        sumx_opid[t.opid] += t.stopwatch;
        sumx2_opid[t.opid] += (long)t.stopwatch*(long)t.stopwatch;
        if (t.stopwatch<min_opid[t.opid]) min_opid[t.opid]=t.stopwatch;
        if (t.stopwatch>max_opid[t.opid]) max_opid[t.opid]=t.stopwatch;

if (t.opid==0) { /* duration opid */
            n_term[t.termno]++;
            sumx_term[t.termno] += t.stopwatch;
            sumx2_term[t.termno] += (long)t.stopwatch*(long)t.stopwatch;
            if (t.stopwatch<min_term[t.termno])
                min_term[t.termno] = t.stopwatch;
            if (t.stopwatch>max_term[t.termno])
                max_term[t.termno] = t.stopwatch;
            new_wall = t.wallticks-t.stopwatch; /* transaction begin time */
            if (n_term[t.termno]==1) last_wall[t.termno] = new_wall;
            else {
                tran_time = new_wall - last_wall[t.termno];
                last_wall[t.termno] = new_wall;
                sumx_tran[t.termno] += tran_time;
                sumx2_tran[t.termno] += tran_time*tran_time;
                if (tran_time<min_tran[t.termno]) min_tran[t.termno]=tran_time;
                if (tran_time>max_tran[t.termno]) max_tran[t.termno]=tran_time;
            }
            fprintf(f_durdat,"%u,%u,%u\n",t.termno,t.stopwatch,t.wallticks);
        }
        else
            fprintf(f_opdat,"%u,%u,%u,%u\n",t.termno,t.opid,t.stopwatch,t.wallticks);

fread(&t,sizeof(TimingRec),1,f_op);
    }
}

Compute_Mean_SD(sx,sx2,n,mean,sd)
unsigned long sx,sx2;
unsigned short n;
double *mean,*sd;
{
    double dsx,dsx2,dn,variance;

dsx = sx;
    dsx2 = sx2;
    dn = n;
    *mean = dsx/dn;
    variance = (dsx2 - ((dsx*dsx)/dn))/dn;
    *sd = sqrt(variance);
```

```c
}

Output_Summary(fd,fs,fsd,transnum)
FILE *fd;    /* detail print file */
FILE *fs;    /* summary print file */
FILE *fsd;   /* summary ASCII file */
int transnum; /* transaction type currently processing */
{
/* NOTE: In the following, it is mathematically sound to divide the mean
   and standard deviation by a constant in order to change units. For example,
   we divide the mean and s.d. by TicksPerSec to change the units from ticks
   to seconds. However, if there becomes a need to have the 'variance' units
   changed from ticks to seconds, make sure the variance is divided by
   TicksPerSec squared, not just TicksPerSec.
*/
    int i;
    double mean,sd,dtickspersec,mean_resp_s,sd_resp_s,mean_pace_s,exp;
    unsigned long sumx_tot,sumx2_tot;
    unsigned short n_tot,max,min;

dtickspersec = TicksPerSec;

fprintf(fd,"Transaction: ");
    if (descIdx[0]==0)
        fprintf(fd,"** %s: no description **\n",session.filename[transnum]);
    else fprintf(fd,"%s\n",&desc[descIdx[0]]);
    fprintf(fd,"================================================================\n\n");

n_tot = sumx_tot = sumx2_tot = 0;
    max = 0; min = 0xffff;
    fprintf(fd,"Summary, RESPONSE TIMES by operation:\n\n");
    fprintf(fd," n resp    min     mean    max    std dev  description\n");

fprintf(fd," ------  ------- -------  -------  -------  ---------------\n");
    for (i=1; i<MaxOpid; i++)
        if (n_opid[i]>0) {
            Compute_Mean_SD(sumx_opid[i],sumx2_opid[i],n_opid[i],&mean,&sd);
            n_tot += n_opid[i];
            sumx_tot += sumx_opid[i];
            sumx2_tot += sumx2_opid[i];
            if (min_opid[i]<min) min = min_opid[i];
            if (max_opid[i]>max) max = max_opid[i];
            fprintf(fd,"%7hu ",n_opid[i]);
            fprintf(fd,"%7.2lf ",(double)min_opid[i]/dtickspersec);
            fprintf(fd,"%7.2lf ",mean/dtickspersec);
            fprintf(fd,"%7.2lf ",(double)max_opid[i]/dtickspersec);
            fprintf(fd,"%7.2lf ",sd/dtickspersec);
            if (descIdx[i]==0) fprintf(fd," ** %d: no description **\n",i);
            else               fprintf(fd," %s\n",&desc[descIdx[i]]);
        }
    if (n_tot>0) {
        Compute_Mean_SD(sumx_tot,sumx2_tot,n_tot,&mean,&sd);
        mean_resp_s = mean/dtickspersec;
        sd_resp_s = sd/dtickspersec;
        fprintf(fd," ------------------\n");
        fprintf(fd,"%7hu ",n_tot);
        fprintf(fd,"%7.2lf ",(double)min/dtickspersec);
        fprintf(fd,"%7.2lf ",mean_resp_s);
        fprintf(fd,"%7.2lf ",(double)max/dtickspersec);
        fprintf(fd,"%7.2lf ",sd_resp_s);
        fprintf(fd," TOTAL\n");
        fprintf(fsd,"%s,%.2lf,%.2lf\n",session.filename[transnum],mean_resp_s,sd_resp_s);
    }
    else {
        fprintf(fsd,"%s,-32768,-32768\n",session.filename[transnum]);
        mean_resp_s = 0.0;
        sd_resp_s = 0.0;
```

```c
}
fprintf(fd,"\n\nSummary, transaction DURATIONS by terminal:\n\n");
fprintf(fd," n tran    min     mean     max    std dev  terminal\n");
fprintf(fd," ------  -------  -------  -------  -------  --------\n");
for (i=0; i<MaxTerminal; i++)
    if (n_term[i]>0) {
        Compute_Mean_SD(sumx_term[i],sumx2_term[i],n_term[i],&mean,&sd);
        fprintf(fd,"%7hu ",n_term[i]);
        fprintf(fd,"%7.2lf ",(double)min_term[i]/dtickspersec);
        fprintf(fd,"%7.2lf ",mean/dtickspersec);
        fprintf(fd,"%7.2lf ",(double)max_term[i]/dtickspersec);
        fprintf(fd,"%7.2lf ",sd/dtickspersec);
        fprintf(fd,"%4d\n",i);
    }
if (n_opid[0]>0) {
    Compute_Mean_SD(sumx_opid[0],sumx2_opid[0],n_opid[0],&mean,&sd);
    fprintf(fd," -------------------\n");
    fprintf(fd,"%7hu ",n_opid[0]);
    fprintf(fd,"%7.2lf ",(double)min_opid[0]/dtickspersec);

fprintf(fd,"%7.2lf ",mean/dtickspersec);
    fprintf(fd,"%7.2lf ",(double)max_opid[0]/dtickspersec);
    fprintf(fd,"%7.2lf ",sd/dtickspersec);
    fprintf(fd," TOTAL\n");
} n_tot = sumx_tot = sumx2_tot = 0;
max = 0; min = 0xffff;
fprintf(fd,"\n\nSummary, transaction PACING by terminal:\n\n");
fprintf(fd," n tran    min     mean     max    std dev  terminal\n");
fprintf(fd," ------  -------  -------  -------  -------  --------\n");
for (i=0; i<MaxTerminal; i++)
    if (n_term[i]>1) {
        Compute_Mean_SD(sumx_tran[i],sumx2_tran[i],n_term[i]-1,&mean,&sd);
        n_tot += n_term[i]-1;
        sumx_tot += sumx_tran[i];
        sumx2_tot += sumx2_tran[i];
        if (min_tran[i]<min) min = min_tran[i];
        if (max_tran[i]>max) max = max_tran[i];
        fprintf(fd,"%7hu ",n_term[i]); /* show actual # of trans */
        fprintf(fd,"%7.2lf ",(double)min_tran[i]/dtickspersec);
        fprintf(fd,"%7.2lf ",mean/dtickspersec);
        fprintf(fd,"%7.2lf ",(double)max_tran[i]/dtickspersec);
        fprintf(fd,"%7.2lf ",sd/dtickspersec);
        fprintf(fd,"%4d\n",i);
    }
if (n_tot>0) {
    Compute_Mean_SD(sumx_tot,sumx2_tot,n_tot,&mean,&sd);
    mean_pace_s = mean/dtickspersec;
    fprintf(fd," -------------------\n");
    fprintf(fd,"%7hu ",n_opid[0]);
    fprintf(fd,"%7.2lf ",(double)min/dtickspersec);
    fprintf(fd,"%7.2lf ",mean_pace_s);
    fprintf(fd,"%7.2lf ",(double)max/dtickspersec);
    fprintf(fd,"%7.2lf ",sd/dtickspersec);
    fprintf(fd," TOTAL\n\n\n");
}
else {
    mean_pace_s = 0.0;
} if (session.transExpRate[transnum]==0) exp = 0.0;
else exp = (double)session.actdur/(double)session.transExpRate[transnum];
fprintf(fs,"%7.2lf %7.2lf  %7.2lf %7hu  %7.2lf %7.2lf  %s\n",
    (double)session.transExpRate[transnum]/dtickspersec,mean_pace_s,
    exp,n_opid[0],mean_resp_s,sd_resp_s,&desc[descIdx[0]]);
```

```
}

DoSession()
{
    FILE* f_op;
    FILE* f_smy;
    FILE* f_smydat;
    FILE* f_det;
    FILE* f_durdat;

FILE* f_opdat;
    int i;

ClearWindow(&infoW);
    if (!GetSession()) return;

WriteWindow(&infoW,0,0,WHITE|INTENSITY,"Machine:");
    WriteWindow(&infoW,1,0,WHITE|INTENSITY,"   Date:");
    WriteWindow(&infoW,2,0,WHITE|INTENSITY,"   Time:");
    WriteWindow(&infoW,0,9,WHITE,session.machinename);
    WriteWindow(&infoW,1,9,WHITE,session.date);
    WriteWindow(&infoW,2,9,WHITE,session.time);

f_smy = MakeSmyFile();
    if (f_smy==NULL) return;
    f_det = MakeDetFile();
    if (f_det==NULL) { fclose(f_smy); return; }
    f_smydat = MakeSmydatFile();
    if (f_smydat==NULL) { fclose(f_smy); fclose(f_det); return; }

WriteWindow(&infoW,6, 0,INTENSITY|UNDERLINE,"Timings       Transactions Operations"
);
    WriteWindow(&infoW,6,39,INTENSITY|UNDERLINE,"Timings       Transactions Operations"
);

for (i=0; i<session.ntranstype; i++) {
        InitCounts();
        SetupFile(i,&f_op,&f_durdat,&f_opdat);
        if (f_op==NULL) {
            DialogMsg(" -- error opening timings file. No stats computed.");
        }
        else {
            Summarize(f_op,f_durdat,f_opdat);
            fclose(f_op);
            fclose(f_durdat);
            fclose(f_opdat);
            Output_Summary(f_det,f_smy,f_smydat,i);
        }
    } fclose(f_smy);
    fclose(f_smydat);
    fclose(f_det);
} main()
{
    char cmd;
    int cur_off,cur_row,cur_col,cur_high,cur_low;

InitMenuWind();
    scpclr(); /* clear screen */

/* save state of cursor */
    cur_off = sccurst(&cur_row,&cur_col,&cur_high,&cur_low);
```

```
MakeMenu(&mainM,
    "File:Load a session ID file",
    "Quit",
    "");
MakeWindow(&infoW,17,72," Summary Stats File Information ",7,1);
DisplayWindow(&infoW);

cmd = ' ';
DisplayMenu(&mainM);
while(cmd != 'Q') {
    cmd = GetMenu(&mainM);
    if (cmd=='F') {
        RemoveMenu(&mainM);
        DoSession();
        DisplayMenu(&mainM);
    }
}

/* restore cursor */
scpclr(); /* clear screen */
sccurset(cur_row,cur_col);
scpgcur(cur_off,cur_high,cur_low,CUR_NO_ADJUST);
}
```

Appendix F

Title:   Diagnostic Software
Code Module:   WORM.C

```
/*
    WORM is the hardware configuration diagnostics for Rhobot.

(C) copyright 1988 Dynix, Inc.
        written by: J. Wayne Schneider
            date:   7 October 1988

Worm is to be run at the master.  It expects a WYSE 50 terminal
    to be on COM1 and the slaves to be connected on PCSS-8 ports 20 - 57.

The internal loopback test does not test interrupts.
    The external loopback test tests receive interrupts and must have
    Txd connected to Rxd and DTR or RTS connected to CTS.

*/

/* #define DEBUG              for monitoring com output */ include "\rhobot\sp_data.h"
include "ses_file.h"
#include "\rhobot\serial.h"
#include "menuwind.h"
#include <bvideo.h>
#include <bscreens.h>
#include <bkeybrd.h>
#include <malloc.h>
include <string.h>
#include <stdlib.h>
include <stdio.h>
include <bios.h>

/********          procedure prototypes           ********/ char *StatusMessage(int);
int rx_from(int,char *);
int get(int,int);
char send(int,char);
int tx_to(int,int,int,int,int,char *);
void DisplayPortStatus(int,int);
void DisplaySlaveID(int);
```

```c
void PortDisplay(char *);
void Select(int,int,int);
void LocalTest(void);
void DisplayComPort(void);
int external(int,int);
int internal(int,int);
void Comtest(void);
void save_data(void);
void init_data(void);
void RemoteTest(void);
void SlaveTest(int);
void remote(int,int,int);

#define FALSE 0
define TRUE  1
MENU mainM, localM, remoteM;

static char rx_buffer[512];

static int com1_status = 0;
static int master_status[32];
static char slave_id[32][9];
static int slave_port_count[32];
static int slave_port_status[32][32];

main()
    {
    char cmd;
    int cur_off,cur_row,cur_col,cur_high,cur_low;

init_data();              /* read the data file and init */
    scpclr(); /* clear screen */

/* save state of cursor */
    cur_off = sccurst(&cur_row,&cur_col,&cur_high,&cur_low);

/* initialize data */
    InitMenuWind();

MakeMenu(&mainM,
        "COM1:Test COM1 on Master",
        "Local:Test ports on Master",
        "Remote:Test ports on the Slaves",
        "Quit",
        "");

MakeMenu(&localM,
        "Internal:Test ports using internal loopback",
        "External:Test ports using External loopback connector",
        "Up:Select next port up the screen",
        "Down:Select next port down the screen",
        "Clear:Clear the recorded status",
        "Type-through:Takeover a slave port with the Wyse terminal",
        "Quit",
        "");

MakeMenu(&remoteM,
        "Request:Request the slave ID",
        "Slave:Test the slave ports",
        "Up:Select next slave up the screen",
        "Down:Select next slave down the screen",
        "Clear:Clear the slave status",
        "Quit",
        "");

DisplayMenu(&mainM);

do  {
        switch (cmd = GetMenu(&mainM))
```

```
            {
        case 'C':
            RemoveMenu(&mainM);
            ComTest();
            scpclr(); /* clear screen */
            DisplayMenu(&mainM);
            break;
        case 'L':
            RemoveMenu(&mainM);
            LocalTest();
            scpclr(); /* clear screen */
            DisplayMenu(&mainM);
            break;
        case 'R':
            RemoveMenu(&mainM);
            RemoteTest();
            scpclr(); /* clear screen */
            DisplayMenu(&mainM);
            break;
            }
        } while (cmd != 'Q');

save_data();
    /* restore cursor */
    scpclr(); /* clear screen */
    sccurset(cur_row,cur_col);
    scpgcur(cur_off,cur_high,cur_low,CUR_NO_ADJUST);
    }

/********        procedure RemoteTest        ********/ void RemoteTest()
    {
    int i, direction = 1;
    char cmd;
    int comx = 0;
    char packet[260];
    char far *buff[32];

DisplayMenu(&remoteM);
    PortDisplay("Slave Identification");
    for (i=0;i<32;i++)
        {
        DisplaySlaveID(i);
        buff[i] = _fmalloc(512);
        if (buff[i] == NULL)
            {
            puts("malloc error");
            return;
            }
        serial_init(i+020,9600,0x03,0x0b,0x01,buff[i],512,0);
        serial_init_interrupt(i+020,0);
        } do  {
        Select(comx, BLACK, WHITE);
        switch (cmd = GetMenu(&remoteM))
            {
            case 'R':
                master_status[comx] != 0x100;
                switch (tx_to(comx,0,0,END,0,NULL))
                    {
                    case -1:
                        master_status[comx] != 0x20;   /* set timeout flag */
                        break;
                    case NAK:
```

```
                    master_status[comx] |= 0x40;    /* set bad line flag */
                    break;
                case CAN:
                    master_status[comx] |= 0x80;    /* set cancel flag */
                    break;
                case ACK:
                    master_status[comx] &=0x10F;
                    if (rx_from(comx,packet) == -1)
                        master_status[comx] |= 0x10;/* set timeout flag */
                    else
                        {
                        slave_port_count[comx] = packet[DATA];
                        strncpy(slave_id[comx],&packet[DATA+1],8);
                        }
                    break;
                }
                break;

case 'S':
                if ((master_status[comx] & 0x1F0) != 0x100)
                    {
                    utalarm();
                    break;
                    }
                RemoveMenu(&remoteM);
                SlaveTest(comx);
                scpclr(); /* clear screen */
                DisplayMenu(&remoteM);
                PortDisplay("Slave Identification");
                for (i=0;i<32;i++)
                    DisplaySlaveID(i);
                break;
            case 'U':
                direction = -1;
                break;
            case 'D':
                direction = +1;
                break;
            case 'C':
                slave_port_count[comx] = 0;
                master_status[comx] &= 0x0F;
                slave_id[comx][0] = 0;
                break;
            }
        DisplaySlaveID(comx);
        Select(comx,WHITE,BLACK);
        comx += direction;
        if (comx < 0)
            comx = 31;
        if (comx > 31)
            comx = 0;
        } while (cmd != 'Q');

for (i=0;i<32;i++)
        {
        serial_init(i+020,9600,0x03,0,0,buff[i],512,0);
        serial_init_interrupt(i+020,1);
        _ffree(buff[i]);
        }
    RemoveMenu(&remoteM);
    }

/**********          procedure SlaveTest
**********/
```

```c
void SlaveTest(slave)
    int slave;
    {
    char title[40];
    char cmd;
    int i, direction = 1;
    int comx=0;

DisplayMenu(&localM);
    strcpy(title," Slave ");
    strcat(title,slave_id[slave]);
    strcat(title," port test ");
    PortDisplay(title);
    for (i=0;i<32;i++)
        DisplayPortStatus(i,slave_port_status[slave][i]);
    do {
        Select(comx, BLACK, WHITE);
        switch (cmd = GetMenu(&localM))
            {
            case 'I':
                remote(slave,comx,ITEST);
                break;
            case 'E':
                remote(slave,comx,ITEST);
                if (slave_port_status[slave][comx] & 0x02)
                    remote(slave,comx,ETEST);
                break;
            case 'U':
                direction = -1;
                break;
            case 'D':
                direction = +1;
                break;
            case 'C':
                slave_port_status[slave][comx] = 0;
                break;
            case 'T':
                serial_init(1,9600,0x03,0x0b,0x01,rx_buffer,512,0);
                serial_init_interrupt(1,0);
                tx_to(slave,comx,0,PASS,0,NULL);
                vidspmsg(3,5,WHITE,BLACK,
                    "***   Wyse to Host PASS THROUGH   ***");
                vidspmsg(4,11,WHITE,BLACK,
                    "(return) to terminate");
                do pass_thru(slave,comx);
                while (kbd() != CR);
                tx_to(slave,comx,0,"PASS,0,NULL);
                scclrmsg(3,5,50);
                scclrmsg(4,11,50);
                serial_init(1,9600,0x03,0,0,rx_buffer,512,0);
                serial_init_interrupt(1,1);
                break;
            }
        DisplayPortStatus(comx,slave_port_status[slave][comx]);
        Select(comx,WHITE,BLACK);
        comx += direction;
        if (comx < 0)
            comx = 31;
        if (comx > 31)
            comx = 0;
        } while (cmd != 'Q');
    RemoveMenu(&localM);
    }

/********        procedure kbd        ********/ kbd()
```

```c
    {
    if (_bios_keybrd(_KEYBRD_READY))
        return (_bios_keybrd(_KEYBRD_READ) & 0xFF);
    }

/********          procedure pass_thru          ********/ pass_thru(slave,port)
    int slave,port;
    {
    int i;
    int comx = slave + 020;
    char packet[PACKET_BUFFER_SIZE];

i = rx_status(1);                    /* check the Wyse for data */
    if (i & BI)
        {
        spullc(1);                       /* on BREAK clear the null */
        tx_to(slave,port,0,PASS_BREAK,0,NULL);
        }
    else if (i & DR)
        {
        for (i=0;i<250;i++)
            if ( (packet[i] = spullc(1)) == EOF )
                break;
        tx_to(slave,port,0,PASS,i,packet);
        }
    if (rx_status(comx) & DR)
        {
        if (rx_from(slave,packet) == ACK)
            for(i=0;i<packet[LEN]-4;i++)
                while(!spushc(1,packet[DATA+i]))
                    continue;
        }
    }

/********          procedure remote          ********/ void remote(slave,port,cmd)
    int slave, port, cmd;
    {
    char packet[PACKET_BUFFER_SIZE];

slave_port_status[slave][port] &=0x0F;              /* clear the status */ switch (tx_to(slave,port,0,cmd,2,(char *)&slave_port_status[slave][port]))
        {
        case -1:
            slave_port_status[slave][port] |= 0x20;     /* set timeout flag */
            break;
        case NAK:
            slave_port_status[slave][port] |= 0x40;     /* set bad line flag */
            break;
        case CAN:
            slave_port_status[slave][port] |= 0x80;     /* set cancel flag */
            break;
        case ACK:
            if (rx_from(slave,packet) == -1)
                slave_port_status[slave][port] |= 0x10;/* set timeout flag */
            else
                slave_port_status[slave][port] = (int) packet[DATA];
            break;
        }
    }

/*****
```

```
/*****
                    procedure init_data
*****/ void init_data()
    {
    FILE *stream;

stream = fopen("WORM.DAT","rb");
    if (stream == NULL)
        return;
    if (fread(&com1_status,sizeof(int),1,stream) < 1)
        return;
    if (fread(master_status,sizeof(int),32,stream) < 32)
        return;
    if (fread(slave_id,sizeof(char),32*9,stream) < 32*9)
        return;
    if (fread(slave_port_count,sizeof(int),32,stream) < 32)
        return;
    if (fread(slave_port_status,sizeof(int),32*32,stream) < 32*32)
        return;
    fclose(stream);
    }

/*****
                    procedure save_data
*****/ void save_data()
    {
    FILE *stream;

stream = fopen("WORM.DAT","wb");
    fwrite(&com1_status,sizeof(int),1,stream);
    fwrite(master_status,sizeof(int),32,stream);
    fwrite(slave_id,sizeof(char),32*9,stream);
    fwrite(slave_port_count,sizeof(int),32,stream);
    fwrite(slave_port_status,sizeof(int),32*32,stream);
    fclose(stream);
    }

/*****
                    procedure ComTest
*****/ void Comtest()
    {
    char cmd;

DisplayMenu(&localM);

do {
        DisplayComPort();
        switch (cmd = GetMenu(&localM))
            {
            case 'I':
                com1_status = internal(com1_status,1);
                break;
            case 'E':
                com1_status = internal(com1_status,1);
                if (com1_status & 0x02)
                    com1_status = external(com1_status,1);
                break;
            case 'C':
                com1_status = 0;
                break;
            }
```

```c
        } while (cmd != 'Q');
    RemoveMenu(&localM);
    }

/**********
                    procedure internal

Internal loopback test on com port.
**********/ int internal(status,comx)
    int status, comx;
    {
    int err;

status |= 0x01;         /* say it is tested */
    err = test_port(comx);
    if (err)
        status &= ~0x02;    /* not found */
    else
        status |= 0x02;     /* found */
    return status;
    }

/**********
                    procedure external

External loopback test on com port.
**********/ int external(status,comx)
    int status, comx;
    {
    status |= 0x04;         /* say it is tested */
    serial_init(comx,9600,0x03,0x0b,0x01,rx_buffer,512,0);
    serial_init_interrupt(comx,0);
    if (loop_test_port(comx))
        status &= ~0x08;
    else
        status |= 0x08;
    serial_init_interrupt(comx,1);
    return status;
    }

/**********
                    procedure DisplayComPort
**********/ void DisplayComPort()
    {
    char *status;

scclrmsg(5,5,50);
    vidspmsg(5,5,BLACK,WHITE,"COM1: ");
    status = StatusMessage(com1_status);
    vidspmsg(5,11,BLACK,WHITE,status);
    }

/**********
                    procedure StatusMessage
**********/ char *StatusMessage(status)
```

```c
int status;
{
static char msg[25];

switch (status & 0x03)
    {
    case 2:
    case 0: strcpy(msg,"(not tested)");break;
    case 1: strcpy(msg," NOT FOUND ");break;
    case 3: strcpy(msg,"   FOUND   ");break;
    } switch (status & 0x0C)
    {
    case 8:
    case 0: strcat(msg,"(not tested)");break;
    case 4: strcat(msg,"  failure  ");break;
    case 12:strcat(msg,"   GOOD    ");break;
    } switch (status & 0xF0)
    {
    case 0x10:  strcat(msg," NO ANSWER");break;
    case 0x20:  strcat(msg," ?TIMEOUT");break;
    case 0x40:  strcat(msg," ?NAK");break;
    case 0x80:  strcat(msg," ?CANCEL");break;
    }
return msg;
}

/**********
                        procedure LocalTest
**********/ void LocalTest()
    {
    char cmd;
    int i, direction = 1;
    int comx=0;
    DisplayMenu(&localM);
    PortDisplay("Local Ports");
    for (i=0;i<32;i++)
        DisplayPortStatus(i,master_status[i]);
    do {
        Select(comx, BLACK, WHITE);
        switch (cmd = GetMenu(&localM))
            {
            case 'I':
                master_status[comx] = internal(master_status[comx],comx+020);
                break;
            case 'E':
                master_status[comx] = internal(master_status[comx],comx+020);
                if (master_status[comx] & 0x02)
                    master_status[comx] = external(master_status[comx],comx+020);
                break;
            case 'U':
                direction = -1;
                break;
            case 'D':
                direction = 1;
                break;
            case 'C':
                master_status[comx] &= 0xFF00;
                break;
            }
        DisplayPortStatus(comx,master_status[comx]);
        Select(comx,WHITE,BLACK);
```

```c
        comx += direction;
        if (comx > 31)
            comx = 0;
        if (comx < 0)
            comx = 31;
        } while (cmd != '0');
    RemoveMenu(&localM);
    }

/*******            procedure Select              *******/ void Select(comx,fore,back)
    int comx, fore, back;
    {
    int row,col;

char buff[4];
    sprintf(buff,"%2d ",comx);
    row = comx%16 + 8;
    col = (comx/16) * 40;
    vidspmsg(row,col, fore, back, buff);
    }

/*********
                    procedure PortDisplay
Show the status of the ports.
*********/ void PortDisplay(msg)
    char *msg;
    {
    int i;
    char string[4];

i = 40-(strlen(msg)/2);
    vidspmsg(5,i,BLACK,WHITE,msg);
    for (i=0;i<32;i++)
        {
        Select(i,WHITE,BLACK);
        }
    }

/*******         procedure DisplaySlaveID         *******/ void DisplaySlaveID(comx)
    int comx;
    {
    int row, col;
    char buff[24];
    char *msg;

switch (master_status[comx] & 0x1F2)
        {
        default:
        case 0x00:  msg = "no port!";break;
        case 0x02:  msg = "request?";break;
        case 0x102:
            sprintf(buff,"%8s  with %2d ports",
                slave_id[comx],slave_port_count[comx]);
            msg = buff;
            break;
        case 0x112: msg = "NOANSWER";break;
        case 0x122: msg = "?TIMEOUT";break;
        case 0x142: msg = "  ?NAK  ";break;
        case 0x182: msg = "?CANCEL ";break;
```

```
        }
        row = comx%16 + 8;
        col = (comx/16) * 40 + 3;

scclrmsg(row,col,30);
        vidspmsg(row,col,WHITE,BLACK,msg);
        }

/*******        procedure DisplayPortStatus        ********/ void DisplayPortStatus(comx,status)
        int comx, status;
        {
        int row, col;
        char *msg;

row = comx%16 + 8;
        col = (comx/16) * 40 + 3;
        msg = StatusMessage(status);
        scclrmsg(row,col,36);
        vidspmsg(row,col,WHITE,BLACK,msg);
        }

/*******        Dummy routines to fool other procedures        ******/ reschedule()
        {
        }

/*******        procedure tx_to        ********/ int tx_to(comx,dest,src,cmd,len,buff)
        int comx, dest, src, cmd, len;
        char *buff;
        {
        int try, i, rx_parity, answer;
        long tm, new_tm;

comx += 020;                    /* make it a PCSS 8 number */ for (try=0;try<8;try++)         /* try to send it 8 times */
                {
#ifdef DEBUG
        printf("TX - ");
#endif
        rx_parity = send(comx,SYN);
        rx_parity ^= send(comx,len + 4);
        rx_parity ^= send(comx,dest);
        rx_parity ^= send(comx,src);
        rx_parity ^= send(comx,cmd);
        for (i=0;i<len;i++)
                rx_parity ^= send(comx,buff[i]);
        send(comx,rx_parity);
#ifdef DEBUG
        printf("\nRX - ");
#endif
        do {                            /* wait for response */
            i = TRUE;
            switch (answer = get(comx,20))
                {
                case ACK:
                case NAK:
                case CAN:
                    for (i=0;i<3;i++)                   /* get rest of answer */
                        get(comx,20);
```

```
            case -1:
                1 = FALSE;
            }
        } while (1);

#ifdef DEBUG
        printf("\n");
#endif
        if (answer == ACK || answer == CAN || answer == -1)
            break;
        }
    return answer;
    } char send(comx,c)
    int comx;
    char c;
    {
    while(!spushc(comx,c)) continue;
#ifdef DEBUG
    printf("%3x",c);
#endif
    return c;
    } int get(comx,time)
    int comx, time;
    {
    int c;
    long tm, new_tm;

_bios_timeofday(_TIME_GETCLOCK,&tm);
    do {
        c = spullc(comx);
        if (c != -1)
            break;
        _bios_timeofday(_TIME_GETCLOCK,&new_tm);
        } while ( (tm + time) > new_tm );
#ifdef DEBUG
    printf("%3x",c);
#endif
    return c;
    }

/*******           procedure rx_from           ********/ int rx_from(slave,packet)
    int slave;
    char packet[];
    {
    int i, rx_parity, len;
    int c;
    int comx = slave + 020;              /* make this a port address */
repeat:
#ifdef DEBUG
    printf("rx - ");
#endif
    do {                                 /* wait for the sync byte */
        c = get(comx,60);
        if (c == -1)
            return c;
        } while (c != SYN);

rx_parity = c;
    packet[TYPE] = c;
    c = get(comx,20);                    /* get the length */
```

```c
        if (c == -1)
            return c;
        rx_parity ^= c;
        len = c;
        packet[LEN] = c;
        for (i=0;i<len;i++)            /* get the rest of the packet */
        {
            c = get(comx,20);
            if (c == -1)
                return c;
            rx_parity ^= c;
            packet[DEST+i] = c;
        } ifdef DEBUG
        printf("\ntx - ");
#endif
        if (rx_parity == 0)            /* acknowledge a good packet */
        {
            send(comx,ACK);
            send(comx,2);
            send(comx,packet[SRC]);
            send(comx,packet[DEST]);
            return ACK;
        } send(comx,NAK);                /* negative acknowledge */
        send(comx,2);
        send(comx,packet[SRC]);
        send(comx,packet[DEST]);
#ifdef DEBUG
        printf("\n");
#endif
        goto repeat;
    }
```

APPENDIX G

Title:  Script Definitions
Code Modules:  SCRIPT.INC
               AUTHOR.ASM (sample script)

```
        .XLIST
        .XCREF

;   Command Macros for the Script Processor
;
;   This file is to be included in all script files for MASM
;
;   (C) copyright 1988 Dynix, Inc.
;       written by: J. Wayne Schneider
;       date:       8 July 1988

.MODEL  SMALL
        .CODE

;
;   Ascii Constants
;

NULL    EQU     0
CR      EQU     13

;
;   DEFINE_TRANS_TYPE   text
;
```

```
;   The define_trans_type macro is used to give a name to the transaction we are
;   running.  It is better than using just the filename.  Only the MASTER
;   has any real use for this.
;

define_trans_type  macro   text
        db      255,text,NULL
        endm

;
;   define_op_id  name, text
;
;   The define_op_id macro is used at the beginning of all script files
;   to define the mneumonics and their associated descriptions for
;   checkpoints only.  The SLAVES never
;   actually use the description but do use the name.  The DEFINEs must
;   be at the beginning of the script file or the MASTER will not find them.
;
;   The macro will use $$DNUM to assign numbers in order beginning with 1.

$$DNUM  =    1

DEFINE_OP_ID    macro    name,text
name      =       $$DNUM
          db      254,name,text,NULL
$$DNUM    =       $$DNUM + 1
          endm
;
;   define_process_id  name, text
;
;   The define_process_id macro is used at the beginning of all script files
;   to define the mneumonics and their associated descriptions.  The
;   MASTER uses the descriptions for user interface.  The SLAVES never
;   actually use the description but do use the name.  The DEFINEs must
;   be first in the script file or the MASTER will not find them.  These
;   are used by the PROCESS command.
;
;   The macro will use $$DNUM to assign numbers with define_op_id.

DEFINE_PROCESS_ID   macro    name,text
name      =       $$DNUM
          db      253,name,text,NULL
$$DNUM    =       $$DNUM + 1
          endm ;
;   PROCESS (id)    sends the ID to the master for identification purposes
;                   The master can use this for real time identification
;                   of a process within a script.
;

PROCESS MACRO   A1
        DB      01,A1
        ENDM

;
;   BREAK
;
;   This will send a break to the com port for 55 msecs and the wait for
;   55 msecs before returning.
;

BREAK   MACRO
        DB      02
        ENDM
```

```
;
;       WAIT_FOR_OPERATOR
;
;       This command allows the master to control synchronization of the
;       transactions in the slaves.  Only one response is required from the
;       operator to start all of the suspended processes.
;       A random delay, based
;       on the transaction rate, is inserted after the operator responds.
;

WAIT_FOR_OPERATOR   MACRO
                    DB      03
                    ENDM

;
;       The CLEAR_INPUT_WINDOW command is used to clear the serial receive
;       buffer of stored data.  It should be used after a search for a prompt
;       is completed, or just before an output that will generate a new screen
;       of data.  If it is not used enough, the receive buffer may overflow
;       or a LOOK_FOR may find data from a previous screen.
;

CLEAR_INPUT_WINDOW  MACRO
                    DB      04
                    ENDM

;
;       OUTPUT (string list)    will output to the serial port the string
;                               and system variables; termination on null
;                               Character throttling is done here.
;                               In order to have multiple items in the list,
;                               surround them with angle brackets.
;                               System variables are VAR1 thru VAR9 and
;                               ARG1 thru ARG9.
;

OUTPUT      MACRO   A1
            DB      05
            DB      A1
            DB      NULL
            ENDM

;
;       BEGIN_TIMED_LOOP
;       END_TIMED_LOOP
;               These serve to give a timed loop when searching for
;               various strings.  Usually used with LOOK_FOR.  The time
;               is a constant controlled by the master.
;               BEGIN_TIMED_LOOP starts the timer
;               and END_TIMED_LOOP checks the timer.
;               This timer is never reported.
;
;               NOTE:  These cannot be nested!
;

BEGIN_TIMED_LOOP    MACRO
            DB      06
@@:
            ENDM

END_TIMED_LOOP      MACRO
            DB      07
            DW      @B
@@:
            ENDM
```

```
;   LOOK_FOR    text,label
;
;   This statement is used to scan the input window for the "text".
;   If it is found, transfer is made to "label", otherwise, it falls
;   through to the next statement.  These do NOT clear the input window
;   in either case.  You must explicitly clear the input window.
;

LOOK_FOR    MACRO   A1,L1
            DB      08
            DB      A1
            DB      NULL
            IFB     (L1)
                DW      @F
            ELSE
                DW      L1
            ENDIF
            ENDM

;
;   WAIT_TIL_IDLE (n)   This command waits for the
;                       incoming serial line to be quiet.
;                       As long as data continues to come in, we wait.
;                       When no data has arrived for n clock ticks, proceed.
;                       The numeric argument represents the number of
;                       clock ticks to wait for idle line.  If not included,
;                       the default is one.
;

WAIT_TIL_IDLE   MACRO   N
            DB      09
            IFB     (N)
                DB      1
            ELSE
                DB      N
            ENDIF
            ENDM

;
;       REPORT status       Sends a status report to the master
;                           Status types are defined later in the file.
;                           The status definitions are hard coded.
;                           The master can use it
;                           for real time process following and exception
;                           reporting, ex. timeout.
;

REPORT  MACRO   S1
        DB      10,S1
        ENDM
;
;       EXIT                Tells the program we have reached the end.
;                           Processing will be suspended until the master
;                           requests a new script file to process.
;

EXIT    MACRO
        DB      11
        ENDM

;
;   BEGIN_TRANSACTION
;   END_TRANSACTION
```

```
;   These are similar to a TIMED_LOOP but they are indefinite. Exit from
;   this loop occurs only on a GOTO, an implied GOTO, or the transaction count
;   going to zero.
;   These commands report to the master the transaction ID and check point
;   the time to the transaction file. Transaction throttling is done here,
;   based on the cumulative transaction time and desired rate.
;
;                       NOTE: There can only be one set of these per
;                             script file.
;

BEGIN_TRANSACTION   MACRO
                    DB      19              ;Start cumulative timer
$BEGIN_TRANSACTION  EQU     $
                    DB      12              ;Start single timer
                    ENDM ;
;   END_TRANSACTION
;
;           is just a go to the top of the repeat loop.
;           The number of transactions per session is
;           controlled by this command. It can be set from
;           1 - 65535 or 0 which means indefinite.
;

END_TRANSACTION     MACRO
                    DB      13
                    DW      $BEGIN_TRANSACTION
                    ENDM

;
;   GET_DATA    label
;
;   This will read into the VARn variables a single record of data.
;   The variables are limited to VAR1 through VAR9.
;   The data for an entire transaction must be contained in a single record
;   for this command to function. The items in the record are assigned to
;   the variables in order. Data is delimited by CR. Records are delimited
;   by a double CR. (or null item).
;   If an end of file is encountered, it will transfer control to label.
;

GET_DATA    MACRO   L1
            DB      14
            IFB     (L1)
                DW  @F
            ELSE
                DW  L1
            ENDIF
            ENDM

;
;   THINK_TIME will simply give the "user" time to think about the
;           data on the screen. It delays an amount specified
;           by a global constant modified by a random number.
;           The actual time delayed is the think_time +/-
;           1/2 of the think_time.
;

THINK_TIME  MACRO
            DB      15
            ENDM
```

```
;
;   BEGIN_TIMER n
;
;   This will start the clock running specified by n, where n is 0 to 9.
;   All it really does, is read the current clock tick counter for later
;   comparison by the CHECK_POINT.
;

BEGIN_TIMER     MACRO   n
                IF2
                IF n GT 9
                    .ERR
                    %OUT ? BEGIN_Timer number out of range!
                ENDIF
                ENDIF
                DB      16,n
                ENDM ;
;   CHECK_POINT n,op_id
;
;   This will send the time from timer n and op_id to the master for logging.
;   The time is calculated by subtracting the value in timer n from the
;   current time.  The value is in clock ticks, 1/20th
;   of a second. (4.772720mhz / 4) / 59659 = 20
;

CHECK_POINT     MACRO   n,L1
                IF2
                IF n GT 9
                    .ERR
                    %OUT ? CHECK_POINT Timer number out of range!
                ENDIF
                ENDIF
                DB      17,n,L1
                ENDM ;
;   GOTO label      transfer of control (sorry Nicholas)
;

GOTO            MACRO   L1
                DB      18
                DW      L1
                ENDM

;
;   WAIT_FOR string
;
;   This will wait for the string.  If it doesn't appear in proper time,
;   a time_out is reported.  If it does appear,
;   the input window is cleared and execution continues.
;

WAIT_FOR        MACRO   S1
                LOCAL   WAIT_END, WAIT_OVER
WAIT_OVER:      BEGIN_TIMED_LOOP
                    LOOK_FOR S1,WAIT_END
                END_TIMED_LOOP
                REPORT  TIME_OUT
                GOTO    WAIT_OVER
WAIT_END:       CLEAR_INPUT_WINDOW
                ENDM

;   Constants for the Script Processor
```

```
;
;   This file is to be included in all script files for MASM
;
;   (C) copyright 1988 Dynix, Inc.
;   written by: J. Wayne Schneider
;   date:       8 July 1988

;
;   REPORT STATUS constants
;

SUCCESS      EQU     00
FAILED       EQU     01
TIME_OUT     EQU     02
END_OF_DATA  EQU     03

;
;   SYSTEM VARIABLE constants
;

ARG1    EQU 131
VAR1    EQU 141

.CREF
        .LIST
;       Script file for LOOPING in Author.Browse
;
;       (C) copyright 1988 Dynix, Inc.
;       written by: J. Wayne Schneider
;       date:       11 July 1988
;
INCLUDE SCRIPT.INC define_trans_type   "Loop through data doing author search"

define_process_id PAC_AUTHOR_BROWSE,"PAC author search"

define_op_id AUTHOR_TO_BIB,"Author to bib"
        define_op_id PAC_AUTHOR_LAST,"PAC time to last data"

PROCESS PAC_AUTHOR_BROWSE

OUTPUT  CR
        WAIT_FOR ")"
        OUTPUT  ("PUBLIC",CR)
        WAIT_FOR "RETURN"
        OUTPUT  CR
        WAIT_FOR "RETURN"
        OUTPUT  ("2",CR)

BEGIN_TRANSACTION
            GET_DATA    $END_TRANSACTION
            WAIT_FOR    "first):"
            OUTPUT      (VAR1,CR)
            BEGIN_TIMER 1
            WAIT_FOR    "(Return)"
            THINK_TIME
            OUTPUT      ("1",CR)
            BEGIN_TIMED_LOOP
```

```
                LOOK_FOR     "number",D01
                LOOK_FOR     "Works",D02
            END_TIMED_LOOP
            REPORT     TIME_OUT
            EXIT
D01:        CLEAR_INPUT_WINDOW
            THINK_TIME
            OUTPUT     ("1",CR)
            WAIT_FOR   "Quit"
D02:        CLEAR_INPUT_WINDOW
            THINK_TIME
            OUTPUT     CR
            WAIT_FOR   "Quit"
            CHECK_POINT 1,PAC_AUTHOR_LAST
            THINK_TIME
            OUTPUT     ("Q",CR)
        END_TRANSACTION AUTHOR_TO_BIB
$END_TRANSACTION:

REPORT  END_OF_DATA
        WAIT_FOR    "first):"
        OUTPUT      CR
        WAIT_FOR    "RETURN"
        OUTPUT      ("7",CR)
        WAIT_FOR    "RETURN"
        OUTPUT      ("LATER",CR)
        WAIT_FOR    ")"

EXIT

END
```

APPENDIX H

```
Title:  Miscellaneous
Code Modules:  SPKR.C
               T.C
               WHATCOM.C
               MK.BAT
               SP1L.BAT
               SPL.BAT
               SPNL.BAT
               SP.DAT
               MENUWIND.H
               SES_FILE.H
               SPN.LNK
               MENUWIND.C
               SP1.C
               TUNES.C
```

```
/* Here are routines for giving audio response. The chirrup tune
   is a positive signal that may be used to indicate success. The
   sad tune is used to indicate failure.

(C) copyright 1988 Dynix, Inc.
       written by: J. Wayne Schneider
           date:   21 September 1988

*/

/*
    Make a cheerful tune on the beeper
*/
chirrup_tune()
    {
    sleep(1);
    utspkr(600);
    sleep(2);
```

```
        utspkr(800);
        sleep(2);
        utspkr(900);
        sleep(2);
        utspkr(0);
        }

/*
    Make a sad tune on the beeper to indicate failure
*/
sad_tune()
    {
    utspkr(200);
    sleep(10);
    utspkr(100);
    sleep(10);
    utspkr(0);
    }
#include (stdlib.h)
#include (butil.h)

main ()
    {
    int i,j,k;
    do {
    puts("number:");
    scanf("%d",&i);
    utspkr(i);
    } while (i != 999);
}
#include (stdio.h)

main ()
    {
    int i;

se
    for (i=0;i(32;i++)
        sputc(020,i+48);
    sputc(020,0x0D);
    goto lab;
    }
/*      (C) copyright 1988 Dynix, Inc.
        written by:     J. Wayne Schneider
        date:           6 July 1988

This program looks for COM ports and tells you what it finds

Update
        July 19, 1988   -   Readjusted ports 1 2 3 4 5 6 7
                            Added startup message
        Sept  1, 1988   -   Fixed com5 & 6 to match "special" PCSS-8
        Sept  2, 1988   -   Totally revised to see PCSS-8 ports
        Sept 16, 1988   -   Added external loopback test.  Invoke
                            with a command line port number.
        Oct  17, 1988   -   Removed DTR-CTS from external loopback test.
*/ include (bios.h)

define FALSE 0
#define TRUE (!FALSE)

main (argc,argv)
    int argc;
    char *argv[];
    {
```

```c
int comx;
char rx_buffer[512];

puts(" WhatCom v.5 10/17/88");
puts("");
if (argc == 1)
    {
    for ( comx = 1 ; comx < 010 ; comx++)
        if (!test_port(comx))
            printf("I found COM%1d\n",comx);
    for ( comx = 010 ; comx < 0100 ; comx++)
        if (!test_port(comx))
            printf("I found a PCSS port %2o\n",comx);
    puts("");
    puts(" That's All Folks!");
    }
else
    {
    sscanf(argv[1],"%o",&comx);
    if (comx < 1 || comx > 077 || argc > 2)
        {
        puts("whatcom (n)\n\n(n) must be in range of 1 to 77 (octal)");
        exit(1);
        }
    if (!test_port(comx))
        {
        printf("Loop back test of %o - ",comx);
        serial_init(comx,9600,0x03,0x0b,0x01,rx_buffer,512,0);
        serial_init_interrupt(comx,0);

if (!loop_test_port(comx))
                puts("PASSED");
            else
                puts("FAILED");

serial_init_interrupt(comx,1);
            }
        else
            {
            printf("Verification of port %o FAILED\n",comx);
            puts("Loop back test was not even tried");
            }
        }
    } int sleep(n)
    int n;
    {
    long tm1, tm2, i;

_bios_timeofday(_TIME_GETCLOCK,&tm1);
    for ( i = 0 ; i < n ; i++ )
        {
        do
            _bios_timeofday(_TIME_GETCLOCK,&tm2);
        while (tm1 == tm2);
        tm1 = tm2;
        }
    }
masm %1;
if errorlevel 1 goto end
link %1;
exe2bin %1 %1.scp
del %1.obj
del %1.exe
:end
```

```
link sp1+ get_scr+ do_scrip+ sleep+ timer+ trans_it+ io+ rnd+ sp_data+ serial:
link sp+ sp_setup+ testport+ sleep+ sp_pdata+ task+ serial,,.CT5_MSC;
link @spn.lnk
100     transaction rate in ticks, 1 transaction every n ticks
10      number of transactions
10      think time
200     timeout
1       throttle back to 200 wpm (assuming 6 characters/word)

/****** menuwind.h

Menu and Window types

Rholling Stone
K. Brook Richan
(C) 1988 Dynix, Inc.

******/

/* bmenu includes bwindow, which includes bscreens */
include <bmenu.h> define MaxMenuOptions 10 typedef struct {
        BMENU   *pmenu;
        int     cols[MaxMenuOptions];
        char    chars[MaxMenuOptions];
        int     lastColumn;
} MENU;

typedef struct {
        BWINDOW *wnd;
        WHERE   loc;
        BORDER  bord;
} WINDOW;

/* function prototypes */ void cdecl InitMenuWind();              /* must be called once at beginning */ void cdecl MakeMenu(MENU *,char *,...); /* build a menu structure */
void cdecl DisplayMenu(MENU *);         /* display a menu */
char cdecl GetMenu(MENU *);             /* input a menu option */
void cdecl RemoveMenu(MENU *);          /* remove a menu from the display */ void cdecl MakeWindow(WINDOW *,int,int,char *,int,int);
                                        /* build a window structure */
void cdecl DisplayWindow(WINDOW *);     /* display a window */
void cdecl WriteWindow(WINDOW *, int, int, int, char *);
                                        /* write a string at a row,col */
void cdecl ClearWindow(WINDOW *);       /* clear a window to all spaces */
void cdecl ClearRect(WINDOW *,int,int,int,int); /* clear rect. in window */
void cdecl AttribRect(WINDOW *,int,int,int,int,int,int);
                                        /* change screen attr of an area */
void cdecl RemoveWindow(WINDOW *);      /* remove a window */
void cdecl CursorOn(WINDOW *);          /* turn cursor on within window */
void cdecl CursorOff(WINDOW *);         /* turn cursor off within window */
```

```c
void cdecl DialogPrompt(char *, char *, char *, int);
                                        /* prompt for a response */
void cdecl DialogMsg(char *);           /* write message to dialog window */
void cdecl DialogRemove();              /* remove dialog window */ void cdecl GetFileName(char *, char *, char *);
                                        /* prompt for a file name */

/*****************************************/

Rholling Stone
        (C) 1988 Dynix, Inc.

Session data file definitions: ses_file.h

K. Brook Richan
        Aug 1988

******************************************/

/*  Constants  */ define  MaxTerminal  600
define  MaxTransType 20
#define  TicksPerSec  20

/*  Timings Record  */ typedef struct {
        short           termno;     /* terminal number */
        char            opid;       /* operation id     */
        unsigned short  stopwatch;  /* n clock ticks for the response time */
        unsigned short  wallticks;  /* n clock ticks since session began */
} TimingRec;

/*  Session Description  */ typedef struct {
        char    machinename[64],memorysize[64],disksize[64],databasesize[64],
                date[10],time[10],comment[236]; /* 512 bytes, null terminated strings */
        short   nterminals;   /* no. of terminals used in session */
        short   ntranstype;   /* no. of transaction types in session */
        short   thinktime;    /* ave. no. of ticks for inter-operation think time */
        short   charthrottle; /* no. of ticks between characters sent */
        short   timeout;      /* no. of ticks before signaling timeout */
        unsigned char   termmap[MaxTerminal];
                /* this tells the transaction type that each terminal is running.
                   For example, if termmap[117] is 3, this means terminal 117 is
                   running transaction type 3. */
        short   transExpRate[MaxTransType];
             /* this tells how many clock ticks should be between the start of
                each transaction. For example, if transExpRate[4] is 1200, the
                transaction rate for transaction type 4 should be one transaction
                every 1200 clock ticks (i.e. 1 minute if 20 ticks per second). */
        short   maxTransactions[MaxTransType];
                /* maximum transactions to process in the session for each type */
        char    filename[MaxTransType][9];
             /* name of disk file for the transaction (minus extension).
                Indicates where the script and timing data are stored:
                   filename.SCP is assembled script
                   filename.OP  is operation timings
```

```
                filename.TRN is transaction duration timings
                For example, if filename[2] is "CKO", then CKO.SCP, CKO.OP and
                CKO.TRN are the assembled script, operation timings and
                transaction duration timings, respectively, for transaction
                type 2. */
) SessionID;
spn+
get_scr+
do_scrip+
sleep+
timer+
trans_it+
io+
rnd+
sp_setup+
testport+
sp_data+
sp_qdata+
task+
interupt+
serial
,
,
ct5_m5c
;
/****** menuwind.c

Menu and Window handling

Rholling Stone
K. Brook Richan
(C) 1988 Dynix, Inc.

******/ include <stddef.h>
include <stdarg.h>
#include <ctype.h>
#include <string.h>
#include <dos.h>
#include <stdlib.h>
#include <search.h>
#include "menuwind.h"

static WINDOW   dialogW;
static WHERE    menuL;
static BORDER   menuB;
static int      dev,active_page;

/***** M E N U   S T U F F ****/ void cdecl InitMenuWind()
{
int mode,columns;

menuB.type = BBRD_NO_BORDER;
        menuB.attr = BLACK;
        menuL.dev = dev = scmode(&mode,&columns,&active_page);
        menuL.page = active_page;
        menuL.corner.row = 0;
        menuL.corner.col = 0;
        MakeWindow(&dialogW,2,78," Dialog Window ",3,1);
}
```

```
void cdecl MakeMenu(MENU *ms,char *mi,...)
/* ms is a pointer to a menu struct to be used by GetMenu
   pass a variable number of menu items in the form:
      "Label:Descriptive message"
   Each Label should start with a unique upper case letter
   The last parameter should be ""
*/
{
        int col = 0, sz, mnum = 0;
        va_list arg_marker;
        char label[50],key[3];

ms->pmenu = mncreate(2,80,WHITE,REVERSE,WHITE,WHITE|INTENSITY);

va_start(arg_marker,mi);
        while (*mi!='\0') {
                sz = 0;
                /* get the label; leave mi pointing to description */
                while ((*mi!=':') && (*mi!='\0')) label[sz++] = *mi++;
                label[sz] = '\0';
                if (*mi == ':') mi++;
                /* set key to the upper and lower case of first letter of label */
                key[0] = label[0]; key[1] = tolower(label[0]); key[2] = '\0';
                /* add menu item to menu */
                mnlitkey(ms->pmenu,0,col,MN_NOPROTECT,label,1,0,mi,key,
                        MN_TRANSMIT|MN_SELECT);
                ms->cols[mnum] = col;
                ms->chars[mnum] = key[0];
                mnum++;
                col += sz+2;
                mi = va_arg(arg_marker,char*);
        } mnkey(ms->pmenu,0,0,32,57,MN_NEXT,MN_ADD); /* set <SPACE> to right arrow */
        ms->lastColumn = 0;
} void cdecl DisplayMenu(MENU *ms)
{
        mndsplay(ms->pmenu,&menuL,&menuB);
} char cdecl GetMenu(MENU *ms)
/* returns the menu item character */
{
        int row,key,i;
        int ch;

mnlread(ms->pmenu,0,ms->lastColumn,&row,&(ms->lastColumn),&ch,&key,
                MN_KEEP_DESCRIPTION);
        if (ch==13) { /* <RETURN> */
                for (i=0; ms->cols[i]!=ms->lastColumn; i++);
                return(ms->chars[i]);
        }
        else if (ch==27) /* <ESC> */
                return('Q');
        else
                return(toupper(ch));
} void cdecl RemoveMenu(MENU *ms)
{
        wnremove(ms->pmenu->pwin);
}
```

```
/***** W I N D O W   S T U F F *****/ void cdecl MakeWindow(WINDOW *ws,int h,int w,char *title,int row,int col)
/* ws:     pointer to WINDOW structure; gets built by this proc */
/* h,w:    height & width of data area of window */
/* title:  window title */
/* row,col: row & col of upper left corner of data area (not border) */
{
        ws->wnd = wncreate(h,w,CYAN);
        ws->bord.type = BBRD_DDDD|BBRD_TCT; /* single line border, top center title */
        ws->bord.attr = MAGENTA;
        ws->bord.ttattr = WHITE|INTENSITY;
        ws->bord.pttitle = title;
        ws->loc.dev = dev;          /* as retrieved from 'scmode' */
        ws->loc.page = active_page; /*           "                */
        ws->loc.corner.row = row;
        ws->loc.corner.col = col;
} void cdecl DisplayWindow(WINDOW *ws)
{
int dsp;

wngetopt(ws->wnd,WN_DEVICE,&dsp);
        if (dsp==-2)
                wndsplay(ws->wnd,&(ws->loc),&(ws->bord));
        else
                wnselect(ws->wnd);
} void cdecl WriteWindow(WINDOW *ws, int row, int col, int atb, char *s)
/* ws:     pointer to which window */
/* row,col: row and column to position string */
/* atb:    video display attribute for text */
/* s:      pointer to null terminated string */
{
        wnselect(ws->wnd);
        wncurmov(row,col);
        wnwrstr(s,atb,-1);
} void cdecl ClearWindow(WINDOW *ws)
{
        wnselect(ws->wnd);
        wnscroll(0,-1,-1,SCR_UP);
        wncurmov(0,0);
} void cdecl ClearRect(WINDOW *ws,int r,int c,int h,int w)
/* clear a rectangular area of a window.
   r,c: upper left row & column of area to clear
   h,w: height & width of area to clear */
{
        wnscrblk(ws->wnd,r,c,r+h-1,c+w-1,-1,-1,WNSCR_UP,0,WN_UPDATE);
} void cdecl AttribRect(WINDOW *ws,int r,int c,int h,int w,int fore,int back)
/* changes screen attribute of a rectangular area of a window.
   r,c: upper left row & column of area to clear
   h,w: height & width of area to clear
   fore,back: attribute of foreground,background (-1 for no change)
       hint - use fore=BLACK, back=WHITE for reverse */
```

```
{
        wnatrblk(ws->wnd,r,c,r+h-1,c+w-1,fore,back,WN_UPDATE);
} void cdecl RemoveWindow(WINDOW *ws)
{
        wnremove(ws->wnd);
} void cdecl CursorOn(WINDOW *ws)
{
        wnsetopt(ws->wnd.WN_CUR_OFF,0);  /* enable cursor */
        wncursor(ws->wnd);               /* set cursor to this window */
} void cdecl CursorOff(WINDOW *ws)
{
        wnsetopt(ws->wnd.WN_CUR_OFF,1);  /* disable cursor */
        wncursor(ws->wnd);               /* set cursor to this window */
}

/***** D I A L O G   S T U F F *****/ void cdecl DialogPrompt(char *prompt, char *dflt, char *response, int size)
/* display a prompt and return the users response.
   size is max size (in bytes) of response
   if user presses <RETURN> only, dflt is returned as response */
{
int key;
char resp[80];

ClearWindow(&dialogW);
        DisplayWindow(&dialogW);
        wnselect(dialogW.wnd);
        wnwrstr(prompt,WHITE|INTENSITY,-1);
        wnwrstr(" (",WHITE,-1);
        wnwrstr(dflt,WHITE,-1);
        wnwrstr(") ",WHITE,-1);
        wnwrstr(") ",WHITE|INTENSITY,-1);

CursorOn(&dialogW);
        wnquery(resp,sizeof(resp),&key);
        if (*resp=='\0') strcpy(response,dflt);
        else strcpy(response,resp);
        RemoveWindow(&dialogW);
} void cdecl DialogMsg(char *msg)
{
        ClearWindow(&dialogW);
        DisplayWindow(&dialogW);
        CursorOff(&dialogW);
        WriteWindow(&dialogW,0,0,WHITE|INTENSITY,msg);
} void cdecl DialogRemove()
{
        RemoveWindow(&dialogW);
}
```

/***** F I L E   M E N U   S T U F F *****/

```c
void cdecl GetFileName(char *prompt, char *dfltwild, char *fname)
/* prompt:    prompt to user */
/* fname:     returns the name chosen; null if none, must be at least 80 bytes*/
/* dfltwild: default path, containing wild cards; returned changed */
{
unsigned result;
struct   find_t fileinfo;
int      nfiles,nrows,i,r,c,ch,key;
char     files[50][14];  /* 100 causes stack overflow! */
BMENU    *fmenu;
WHERE    w;
BORDER   b;
char     keys[3];

DialogPrompt(prompt,dfltwild,fname,80);
        if (strchr(fname,'*')==NULL) return; /* no wild card */
        strcpy(dfltwild,fname); /* wild char input, assign new default */
        nfiles = 0;
        result = _dos_findfirst(dfltwild,_A_NORMAL,&fileinfo);
        while ((result == 0) && (nfiles<50)) {
                strcpy(files[nfiles++],fileinfo.name);
                result = _dos_findnext(&fileinfo);
        }
        if (nfiles==0) {fname[0]='\0'; return;}
        qsort(files,nfiles,14,strcmp);
        nrows = nfiles/5 + (nfiles%5>0);
        fmenu = mncreate(nrows,72,NORMAL,REVERSE,NORMAL,NORMAL);
        for (i=0; i<nfiles; i++) {
                keys[0]=files[i][0]; keys[1]=tolower(keys[0]); keys[2]='\0';

mnitmkey(fmenu,i/5,(i%5)*15,MN_NOPROTECT,
                        files[i],keys,MN_SELECT);
        }
        mnkey(fmenu,0,0,32,57,MN_NEXT,MN_ADD); /* set (SPACE) to right arrow */
        w.dev = dev; w.page = active_page; w.corner.row = 4; w.corner.col = 5;
        b.type = BBRD_DDDD|BBRD_TCT; /* single line border, toc center title */
        b.attr = MAGENTA;
        b.ttattr = WHITE|INTENSITY;
        b.pttitle = dfltwild;
        mndsplay(fmenu,&w,&b);
        mnread(fmenu,0,0,&r,&c,&ch,&key,MN_DESTROY);
        if (ch==27) fname[0]='\0';
        else { /* form full file name */
                /* get path name, if any */
                /* remember, fname is the same as dfltwild to here */
                for (i=strlen(fname)-1;
                        (i>=0) && (fname[i]!=':') && (fname[i]!='\\');
                        i--);
                fname[i+1] = '\0'; /* if : or \ not found, set fname to null */
                                /* if found, fname set to path */
                /* append file name to path */
                strcat(fname,files[(r*5)+(c/15)]);
        }
}
/*      Script Processor for only ONE port without a master (C) copyright 1988 Dynix, Inc.
        written by: J. Wayne Schneider
        date:       10 August 1988

SP1 script_file_name [script_arguments...] [<data_filename]

This program reads the script file specified on the command line
and processes it on COM1. Data entry can be specified with redirection,
<data_filename. A string argument may be passed to the script processor to
``` be recognized as ARG1, ARG2, ... ARG7. The purpose of this program is to aid
in debugging script files.

*/

```c
#include <bios.h>
include <conio.h>
#include <malloc.h>
include <stdio.h> include "sp.h"
include "sp_data.h"
#include "ses_file.h"

struct t_str trans;

FILE *ses_file;

main(argc,argv) int argc; char *argv[]; {
    char *script;
    char *rx_buffer;
    long length;

trans_init(&trans,&global);

if (argc == 1) {
        puts("Specify a script file to process!");
        exit(1);
        } script = get_script(argv[1],&length,op_id_msg);

printf("SCRIPT - %s\n",op_id_msg[0]);

rx_buffer=malloc(2048);
    if (rx_buffer == NULL) {
        puts("Not enough memory for rx_buffer!");
        exit(6);
        } ses_file = fopen("SP1.OP","wb");
    if (ses_file == NULL)
        perror("open failed");
    memset(rx_buffer,0,2048);
    serial_init(1,9600,0x03,0x0B,0x1,rx_buffer,2048,IGNORE_NULL);
    timer_init();
    serial_init_interrupt(1,0);

do_script(1,script,length,&argv[2],rx_buffer + 9,&trans);

serial_init_interrupt(1,1);
    timer_undo();
    fclose(ses_file);
    }
```

/*****************************************************************
                      procedure CHECK_OUT This routine is called by do_script to see if the operator has asked us
to exit.
*****************************************************************/

```c
void check_out()
    {
    char c;
```

```c
        if (_bios_keybrd(_KEYBRD_READY))      /* give up, when commanded */
            if ((char)_bios_keybrd(_KEYBRD_READ) == ESC)
                {
                printf("\nA = abort, anything to continue ?");
                c = toupper((char)_bios_keybrd(_KEYBRD_READ));
                puts("");
                if (c == 'A')
                    trans.abort = TRUE;
                }

}

/*   Dummy routine for scheduling is here */ void reschedule() {}

/*   Terminal routines here replace communication to master */ void process(comx,numb)
    int comx, numb;
    {
    printf("PROCESS - %d - %s\n",comx,op_id_msg[numb]);
    } int report(comx,numb)
    int comx, numb;
    {
    char c;
    printf("REPORT - %d - %s\n",comx,status_msg[numb]);

if(numb == 2)
        {
        printf("\nA = abort, anything to continue ?");
        c = toupper((char)_bios_keybrd(_KEYBRD_READ));
        puts("");
        if (c == 'A')
            return TRUE;
        }
    return FALSE;
    } void check_point(comx,op_id,op_time,wall_time)
    int comx, op_id;
    long op_time, wall_time;
    {
    TimingRec t;

if (op_id == 0) printf("TRANSACTION times %ld %ld\n",op_time,wall_time);
    else printf("CHECK POINT for %d - %s is %ld at %ld\n",
            comx,op_id_msg[op_id],op_time,wall_time);

t.termno = comx;
    t.opid = op_id;
    t.stopwatch = op_time;
    t.wallticks = wall_time;
    fwrite(&t, sizeof(TimingRec), 1, ses_file);
    } int get_data(var)
    char var[10][80];
    {
    int i;

for (i=1;i<10;i++)
        {
```

```
    printf("getvar:");
    gets(var[i]);
    puts("");
    if (strcmp(var[i],"END") == 0) return EOF;
    if (strcmp(var[i],"") == 0) break;
    }
    return NULL;
} int wait_for_operator()
{
    printf("\nWaiting for operator. Press any key:");
    _bios_keybrd(_KEYBRD_READ);
    puts("");
} int do_exit(comx)
    int comx;
{
    puts("EXIT");
    return TRUE;
}
```

What is claimed and desired to be secured by United States Letters Patent is:

1. A robot system for evaluating the performance of a host computer system having a plurality of host communication ports connectable to a plurality of user terminals prior to placing said host computer system into service with said user terminals, said robot system emulating said plurality of user terminals and emulating predefined computing tasks input to the host computer system from the user terminals, and said robot system comprising:

a plurality of first CPU means, each connected to a plurality of said host communication ports whereby each first CPU means emulates a plurality of user terminals, for inputting said computing tasks to said host computer system;

a second CPU means, connected to each said first CPU means, for coordinating and communicating to said plurality of first CPU means said computing tasks input at each said host communication port to said host computer system from said plurality of first CPU means and for monitoring and recording the host computer system's elapsed time for performing each computering task input from the plurality of first CPU means; and terminal means, connected to said second CPU means, for inputting to said second CPU means predefined user commands as to the number and type of computing tasks input to said host computer system by said plurality of first CPU means for purposes of said evaluation of the host computer system, and for displaying in real time the host computer system's elapsed time for performing the input computing tasks, whereby a single user can emulate said user terminals from a single station and can evaluate the host computer system's performance from that station.

2. A robot system as defined in claim 1 wherein each CPU means comprises a microcomputer.

3. A robot system as defined in claim 1 wherein each CPU means comprises a plurality of serial communication port means for communicating serial data.

4. A robot system as defined in claim 3 wherein each CPU means further comprises means for converting parallel data to serial data.

5. A robot system as defined in claim 3 wherein the serial communication port means of the second CPU means comprises four serial interface cards each comprising eight serial communication ports.

6. A robot system as defined in claims 3 or 5 wherein the serial communication port means of each first CPU means comprises four serial interface cards each comprising eight serial communication ports.

7. A robot system as defined in claim 6 comprising at least thirty-two of said first CPU means.

8. A robot system for evaluating the performance of a host computer system having a plurality of host communication ports connectable to a plurality of user terminals prior to placing said host computer system into service with said user terminals, said robot system emulating said plurality of user terminals and emulating predefined computing tasks input to the host computer system from the user terminals, and said robot system comprising:

a plurality of slave microprocessor means for inputting said computing tasks to said host computer system, each slave microprocessor means comprising means for converting parallel data to serial data and further comprising a plurality of serial communication port means, each connected to a host communication port, for communicating serial data to said host communication ports, whereby each said slave microprocessor means emulates a plurality of user terminals;

a master microprocessor means for coordinating and communicating to said plurality of slave microprocessor means said computing tasks input at each said host communication port to said host computer system from said plurality of slave microprocessor means, and for monitoring and recording the host computer system's elapsed time for performing each computing task input from the plurality of slave microprocessor means, said master microprocessor means comprising means for converting parallel data to serial data and further comprising a plurality of serial communication port means, each connected to a serial communication port means of a slave microprocessor means, for communicating serial data to said slave microprocessor means; and terminal means, connected to said master microprocessor means, for inputting to said master microprocessor means predefined user commands as to the number and type of computing tasks input to said host computer system by said plurality of slave microprocessor means for purposes of said evaluation of the host computer system, and for displaying in real time the host computer system's elapsed time for performing the input computing tasks, whereby a single user can emulate said user terminals from a single station and can evaluate the host computer system's performance from that station.

9. A robot system as defined in claim 8 wherein each serial communication port means comprises four serial interface cards each comprising eight serial communication ports.

10. A robot system as defined in claim 9 comprising at least thirty-two of said slave microprocessor means.

* * * * *

UNITED STATES PATENT AND TRADEMARK OFFICE
CERTIFICATE OF CORRECTION

PATENT NO. : 5,161,116

DATED : November 3, 1992

INVENTOR(S) : J. WAYNE SCHNEIDER et al.

It is certified that error appears in the above-identified patent and that said Letters Patent is hereby corrected as shown below:

```
Column 1, line 45, "effect" should be --affect--
Column 2, line 67, "effect" should be --affect--
Column 4, line 15, after "provide" insert --a--
Column 4, line 42, after "as well" insert --as--
Column 9, line 25, "Paralell" should be --parallel--
Column 11, line 37, "literary" should be --library--
Column 13, line 22, "(254A-254N)" should be --(252A-252N)--
```

Signed and Sealed this

Twenty-sixth Day of October, 1993

Attest:

BRUCE LEHMAN

Attesting Officer

Commissioner of Patents and Trademarks